United States Patent
Green, Jr. et al.

(10) Patent No.: US 10,480,734 B2
(45) Date of Patent: Nov. 19, 2019

(54) LIGHT ENGINE AND METHOD OF SIMULATING A FLAME

(71) Applicant: IDEA TECH LLC, Topeka, KS (US)

(72) Inventors: William Green, Jr., Foley, AL (US); Ninghua Wei, Guangzhou (CN)

(73) Assignee: Idea Tech LLC, Topeka, KS (US)

( * ) Notice: Subject to any disclaimer, the term of this patent is extended or adjusted under 35 U.S.C. 154(b) by 0 days.

(21) Appl. No.: 16/273,635

(22) Filed: Feb. 12, 2019

(65) Prior Publication Data
US 2019/0257487 A1 Aug. 22, 2019

Related U.S. Application Data

(60) Continuation of application No. 16/137,433, filed on Sep. 20, 2018, now Pat. No. 10,240,736, which is a (Continued)

(30) Foreign Application Priority Data

May 5, 2015 (CN) .......................... 2015 1 0152837
May 5, 2015 (CN) ..................... 2015 2 0282857 U

(51) Int. Cl.
*H05B 33/00* (2006.01)
*F21S 10/04* (2006.01)
(Continued)

(52) U.S. Cl.
CPC ............ *F21S 10/043* (2013.01); *F21K 9/232* (2016.08); *F21V 3/061* (2018.02); *F21V 19/006* (2013.01);
(Continued)

(58) Field of Classification Search
CPC . H01L 2224/48091; H01L 2924/00014; H01L 2224/48227; F21K 9/60;
(Continued)

(56) References Cited

U.S. PATENT DOCUMENTS

| 5,924,784 A | 7/1999 | Chliwnyj et al. |
| 6,685,574 B2 | 2/2004 | Hall |

(Continued)

FOREIGN PATENT DOCUMENTS

| CA | 2335401 A1 | 8/2001 |
| CN | 2639682 Y | 9/2004 |

(Continued)

OTHER PUBLICATIONS

ThingM Labs, BlinkM Datasheet for BlinkM & BlinkM MinM MaxM (2010) 50 pages, blinkm.thingm.com.

(Continued)

*Primary Examiner* — Monica C King
(74) *Attorney, Agent, or Firm* — Lathrop Gage L.L.P.

(57) ABSTRACT

An apparatus, system, and method for lighting effects, including simulating a flame. A three dimensional carrier includes an array of a plurality of light sources distributed on it. A control circuit coordinates on/off of the light sources in a manner to simulate a jumping flame. In one embodiment, the three dimensional carrier and LEDs are encapsulated in an at least partially light transmissive cover. This light modular engine includes a control circuit and an interface to electrical power. The system can include the light engine in a light fixture such as an architectural fixture. The methodology can include a sequence of on/off and brightness variations for the array of light sources.

22 Claims, 92 Drawing Sheets

Related U.S. Application Data continuation of application No. 15/583,612, filed on May 1, 2017, now Pat. No. 10,125,937, which is a division of application No. 15/090,179, filed on Apr. 4, 2016, now Pat. No. 9,689,544.

(51) Int. Cl.

| | | |
|---|---|---|
| *F21K 9/232* | (2016.01) | |
| *H05B 33/08* | (2006.01) | |
| *H05B 37/02* | (2006.01) | |
| *F21V 19/00* | (2006.01) | |
| *F21V 23/00* | (2015.01) | |
| *F21V 23/06* | (2006.01) | |
| *F21V 3/06* | (2018.01) | |
| *F21V 23/02* | (2006.01) | |
| *F21W 121/00* | (2006.01) | |
| *F21Y 107/00* | (2016.01) | |
| *F21Y 107/30* | (2016.01) | |
| *F21W 131/10* | (2006.01) | |
| *F21Y 115/10* | (2016.01) | |

(52) U.S. Cl.
CPC .......... *F21V 23/006* (2013.01); *F21V 23/026* (2013.01); *F21V 23/06* (2013.01); *H05B 33/0842* (2013.01); *H05B 33/0845* (2013.01); *H05B 37/0245* (2013.01); *H05B 37/0272* (2013.01); *H05B 37/0281* (2013.01); *H05K 999/99* (2013.01); *F21W 2121/00* (2013.01); *F21W 2131/10* (2013.01); *F21Y 2107/00* (2016.08); *F21Y 2107/30* (2016.08); *F21Y 2115/10* (2016.08)

(58) Field of Classification Search
CPC .... F21K 9/232; F21V 29/004; F21V 23/0442; F21V 25/10; F21V 29/30; F21V 29/40; F21V 29/507; F21V 29/51; F21V 29/58; F21V 29/59; F21V 29/60; F21V 29/717; F21V 29/773; F21V 29/80; F21V 29/83; F21V 29/89; F21V 3/00; H05B 33/0818; H05B 33/0857
See application file for complete search history.

(56) References Cited

U.S. PATENT DOCUMENTS

| | | |
|---|---|---|
| 6,720,745 B2 | 4/2004 | Lys et al. |
| 6,802,782 B2 | 10/2004 | Hall et al. |
| 6,953,401 B2 | 10/2005 | Starr |
| 7,201,500 B2 | 4/2007 | Mishan |
| 7,476,002 B2 | 1/2009 | Wolf et al. |
| 7,553,051 B2 | 6/2009 | Brass et al. |
| 7,762,897 B2 | 7/2010 | Starr et al. |
| 8,033,681 B2 | 10/2011 | Brass et al. |
| 8,256,935 B1 | 9/2012 | Cullimore et al. |
| 8,562,184 B2 | 10/2013 | Klipstein et al. |
| 8,789,963 B2 | 7/2014 | Whitfield et al. |
| 9,068,706 B2 | 6/2015 | Fournier et al. |
| 2008/0129226 A1 | 6/2008 | DeWitt et al. |
| 2008/0130266 A1 | 6/2008 | DeWitt et al. |
| 2009/0080871 A1 | 3/2009 | Chiu |
| 2009/0126241 A1 | 5/2009 | Asofsky |
| 2011/0255272 A1 | 10/2011 | Privas |
| 2013/0033195 A1 | 2/2013 | Liao |
| 2014/0036511 A1 | 2/2014 | Whitfield et al. |
| 2014/0104820 A1 | 4/2014 | Chiang |
| 2014/0168946 A1 | 6/2014 | Kaplan |
| 2014/0268704 A1 | 9/2014 | Yang |
| 2014/0307426 A1 | 10/2014 | Whitfield et al. |
| 2016/0327227 A1 | 11/2016 | Green, Jr. et al. |
| 2016/0377248 A1 | 12/2016 | Jagt et al. |

FOREIGN PATENT DOCUMENTS

| | | |
|---|---|---|
| CN | 201304248 Y | 9/2009 |
| CN | 201715440 U | 1/2011 |
| CN | 201944772 U | 8/2011 |
| CN | 202221029 U | 5/2012 |
| CN | 202868827 U | 4/2013 |
| CN | 203082789 U | 7/2013 |
| CN | 203771092 U | 8/2014 |
| CN | 203980133 U | 12/2014 |
| CN | 104728762 A | 6/2015 |
| CN | 204554684 U | 8/2015 |
| GB | 2462848 A | 2/2010 |
| GB | 2467008 A | 7/2010 |
| WO | 2014068440 A1 | 5/2014 |
| WO | 2016155521 A1 | 10/2016 |

OTHER PUBLICATIONS

Eastern Voltage Research, Digital LED Flame 1.0 Kit, www.easternvoltageresearch.com/digitalflame10.html, 2 pages.
Equinox, Flame Machine User Manual, Equinox RGB 1.5M DMX Flame Machine (FLAM11) 12 pages.
Website showing Realistic Flickering Flame Effect with Arduino and LED's, www.instructables.com/id/Realistic-Fire-Effect-with-Arduino-and-LEDs, 15 pages.
Parallax Inc., BlinkM Smart LED product on website, www.digikey.com/product-detail/en/parallax-inc/32325/32325-ND/3974652, 2 pages.

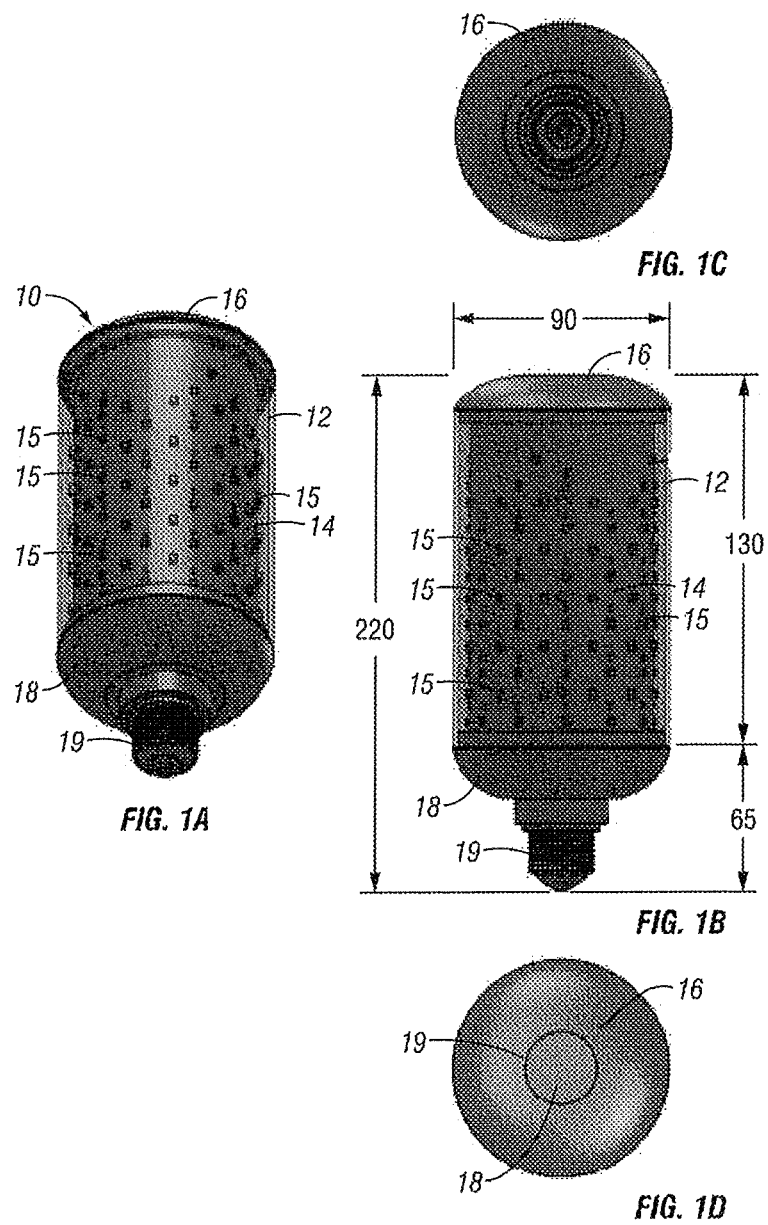

Power module

DMX module

Speed

Flame Size

Infrared/Body induction

INNER AND OUTER LED'S
OFFSET RADIALLY

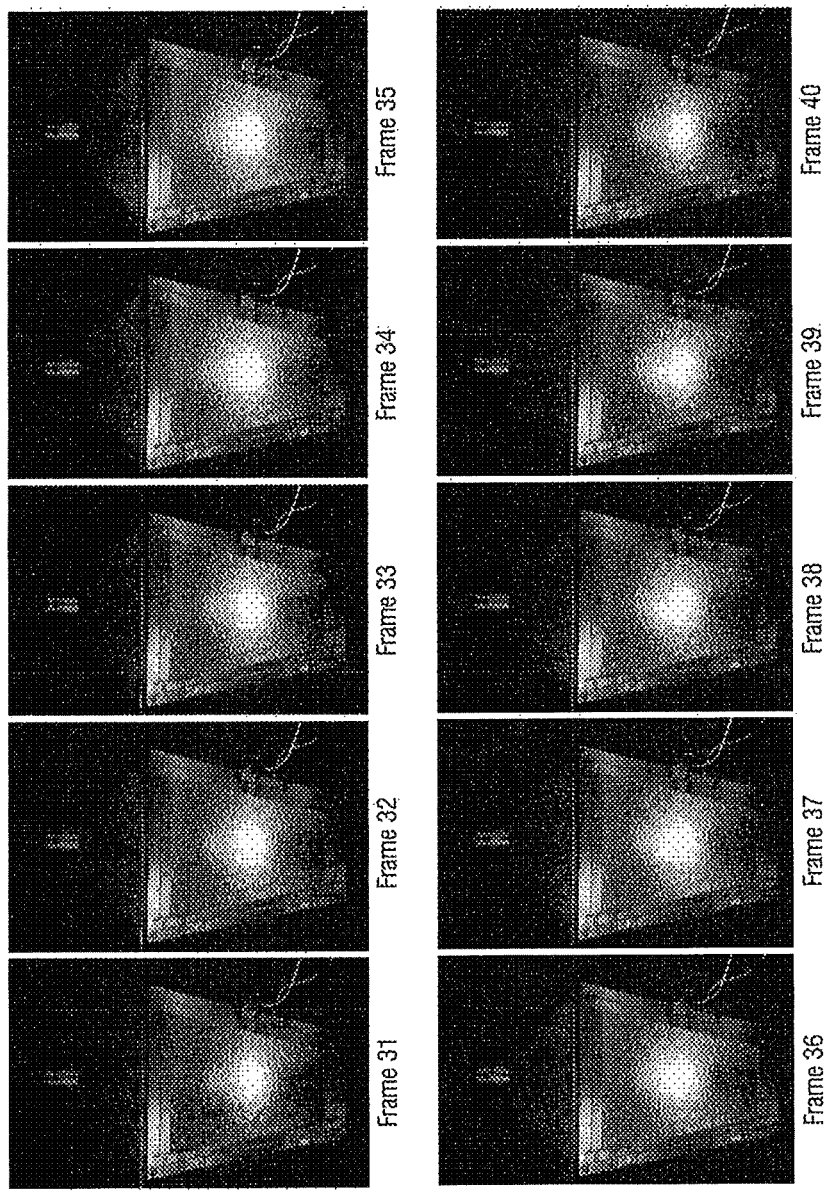

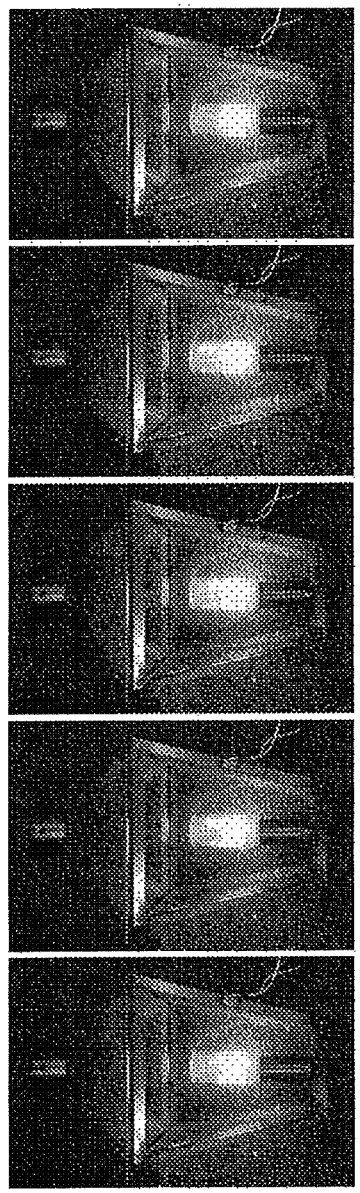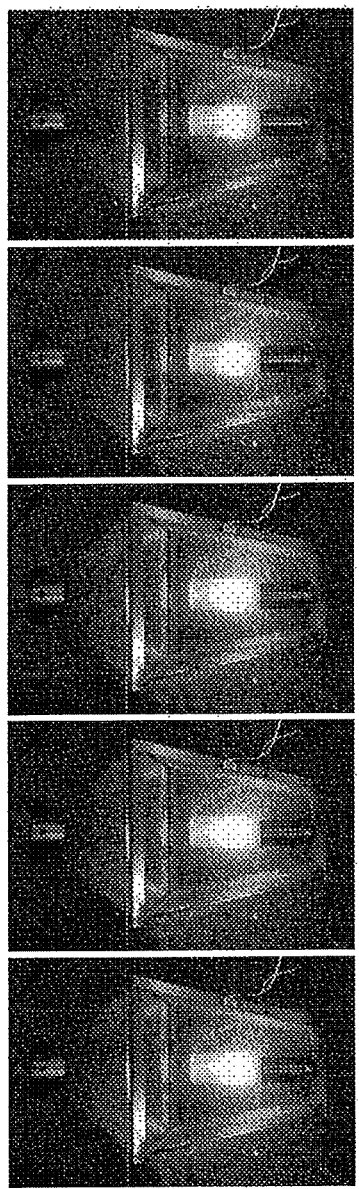
FIG. 23E

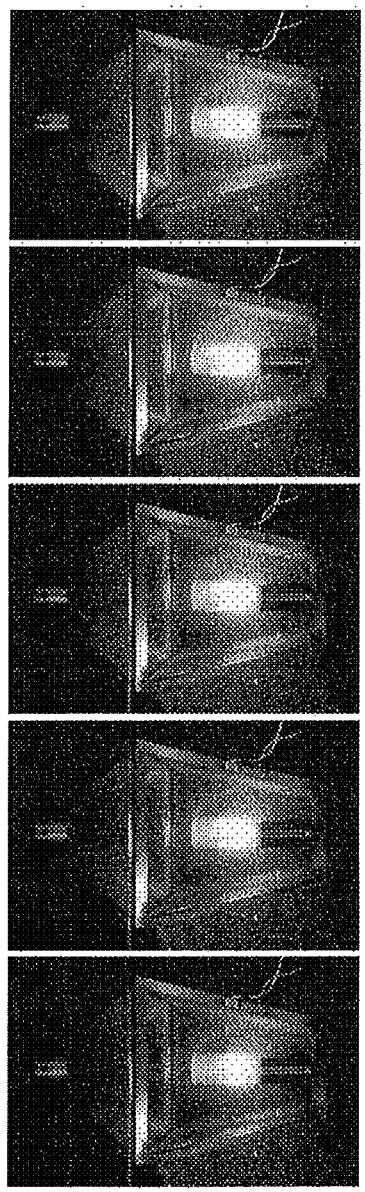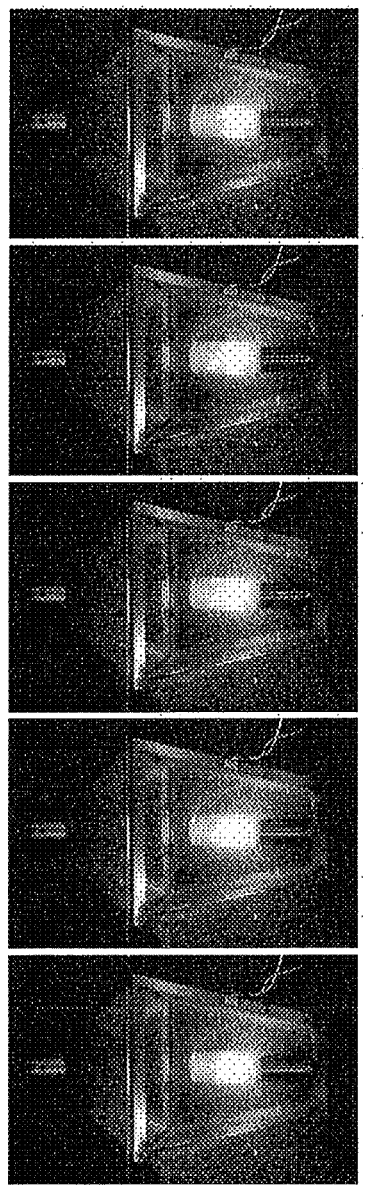
FIG. 23H

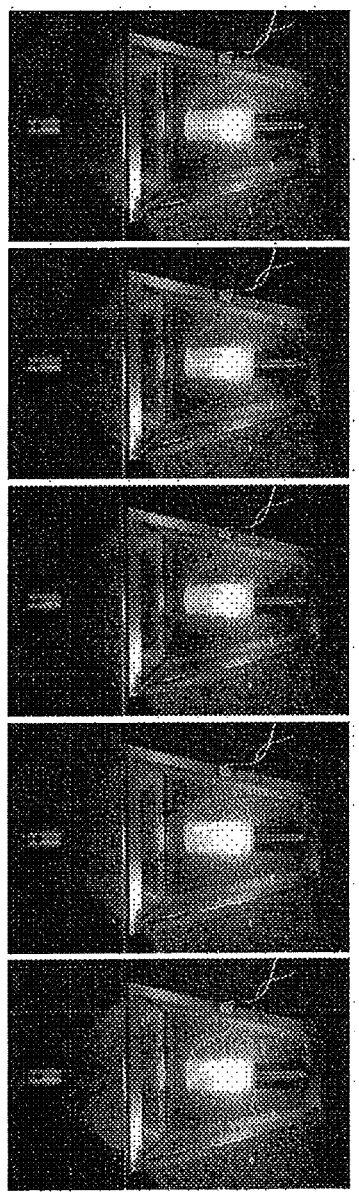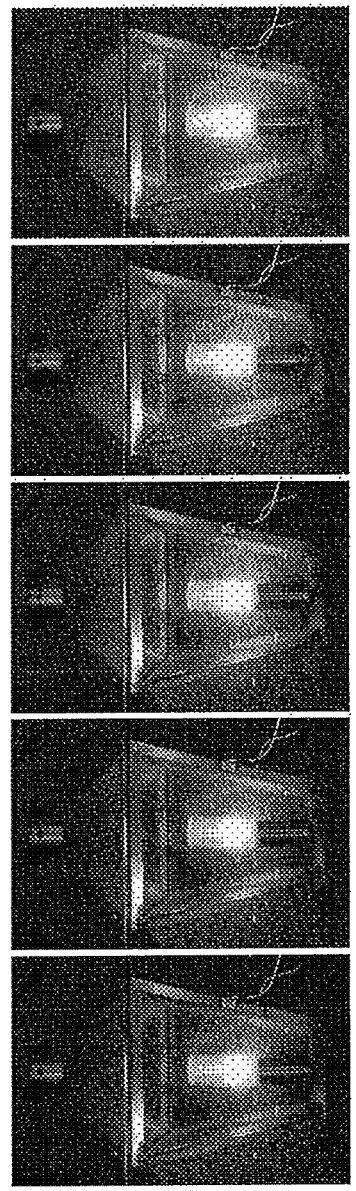
FIG. 23W

LIGHT ENGINE AND METHOD OF SIMULATING A FLAME

CROSS-REFERENCE TO RELATED APPLICATIONS

This application is a continuation of U.S. application Ser. No. 16/137,433, filed Sep. 20, 2018; which is a continuation of U.S. application Ser. No. 15/583,612, filed on May 1, 2017, now U.S. Pat. No. 10,125,937, issued on Nov. 13, 2018; which is a divisional application of U.S. application. Ser. No. 15/090,179, filed on Apr. 4, 2016, now U.S. Pat. No. 9,689,544, issued on Jun. 27, 2017; and claims priority to China patent application numbers 201510152837.2 and 201520282857.7, both filed May 5, 2015. Each of these related applications is hereby incorporated by reference in its entirety herein.

BACKGROUND OF THE INVENTION

A. Field of Invention

The present invention relates to lighting and, in particular, to apparatus, systems, and methods for producing lighting and lighting effects that simulate the appearance of a flame or flames.

B. Problems in the Art

Artificial lighting continues to advance. The advent of solid-state light sources such as LEDs has spurred further innovation.

The design of light sources for illumination purposes occupies a substantial amount of the marketplace. Use of artificial light for particular lighting effects is another major commercial area.

One particular area for lighting effects involves simulation of the appearance of flames. There has been a long-felt need for the same. This comes from both safety concerns associated with real flames in such things as candle-based fixtures, gas lamps, or wood burning or gas flame fireplaces, as well as consumer-driven desire for the aesthetic and ornamental appearance of flames.

One attempt at simulated candle flames uses an incandescent single-candle-flame-sized bulb with multiple filaments. A circuit switches between the filaments to simulate a jumping candle flame. However, they have had limited success in the marketplace. It is difficult to produce a realistic flame simulation. It is also difficult to expand the effect beyond the single bulb.

Bigger systems utilize such things as steady-state light sources but with moving or rotating mirrors, reflectors, or lenses. They are relatively complex. They involve the cost and complexity of moving parts and, again, have limited success in realistic simulation.

Attempts at using artificial light sources for log-fire flame simulation in such application as fireplaces also have limitations. Some are essentially or predominantly two-dimensional in the sense the simulation is in a vertical plane across a length and height in the fireplace. This might be deemed sufficient by some because most viewing-angles of a fireplace are towards perpendicular to that plane. Such two-dimensional solutions lack realistic simulation, particularly for shallower viewing angles relative that vertical plane. Some use lights and mechanical devices. One example is a fan to blow illuminated red and/or yellow silk ribbons vertically. The waving of the ribbons is intended to provide the flame simulation. This has limited three-dimensional effect and limited realism. It also creates noise and additional electrical power consumption over and above just lights. Some fireplace attempts utilize light sources (incandescent or LED) to illuminate or edge-light a flat panel or screen. The lights can be varied in intensity or color to try to simulate flames at or in the panel or screen. This is a two-dimensional solution which, again, works against realism in the simulation. Some solutions play either a simulation or actual video of flames on a digital display. Again, this is two dimensional.

Some flame-effect lights use solid-state sources such as LEDs which have a smaller form factor and improved effective lives over sources like incandescent sources. In some cases, they can also represent energy savings. Furthermore, driving them to different intensities that can change quickly is possible. However, again, with regard to special lighting effects such as flame simulation, the state-of-the-art has concentrates on 2D solutions or utilizing rotating optical devices relative the sources.

It can therefore be seen that a number of factors go into the design of lighting which attempts to simulate a flame or flames. Examples can include realism of simulation, cost of materials and components, operating costs, durability, and flexibility in how many forms they can take and how many different applications they can be used. Some of these factors are antagonistic with one another, making it even more difficult to reach good solutions.

For example, the combination of lights and moving parts may help simulate the look of flames, but can add capital and operating costs. It can also create noise which can be antithetical to realistic simulation or to the consumer of such devices.

The repeating patterns of most simulated flames take two dimensional forms, which allows viewers to know or perceive that they are looking at a simulated flame.

The inventor has therefore found there is room for improvement in the state-of-the-art.

SUMMARY OF THE INVENTION

It is therefore a principle object, feature, aspect, or advantage of the present invention to provide an apparatus, a system, and method which improves over or solves problems and deficiencies in the state-of-the-art. Further objects, features, aspects, and advantages of the invention include apparatus, systems, or methods which:

a. provide a more realistic flame simulation;
b. provide more of a 3D solution that provides a similar 3D and even stereoscopic effect when viewed from multiple directions;
c. can be used in a wide variety of lighting applications;
d. is relatively economical regarding both capital and operating costs over a typical effective life span;
e. provides the opportunity for a relatively long typical effective life span;
f. can be implemented in a variety of form factors;
g. can include a stand-alone light engine module that can be used in a variety of standard light fixture bulb electrical sockets, or can be integrated or built-in to a fixture;
h. can be designed to create a variety of lighting effects;
i. can be essentially silent during operation;
j. is aesthetically pleasing;
k. is relatively noncomplex without moving mechanical parts;
l. generates a relatively small amount of heat;
m. has potential for long operating life;

n. can be made durable and robust for a variety of environments of use including indoors, outdoors, and even underwater;

o. can be used alone or with surrounding optical surfaces or fixtures, and can be used in combinations.

In one aspect of the invention, an apparatus according to the present invention comprises a light engine in a self-contained housing. The light engine includes a base with an electrical interface, an interior three-dimension form factor carrier, a plurality of solid-state light sources distributed over at least a substantial portion of the carrier, a cover that at least substantially surrounds the carrier and light sources and includes at least some light transmissive portions, and a control circuit for driving the light sources according to a predetermined regimen. In some embodiments the cover may be transparent. In some it may be translucent or partially light transmissive. In some embodiments there may not be a cover. The cover can enhance optical effects of a simulated flame. Furthermore, in some cases there can be a cover over the LEDs (which could be transparent but might be translucent) and then a second cover or shroud over the first cover and LEDs (which could be translucent but might not be). In this manner the LEDs could be protected by the first cover and then their light output could be manipulated by the second cover or shroud. In one example a translucent second cover or shroud could diffuse the light output so that individual LED output would not be seen, to promote the simulation of a flame.

In one example, the light engine has a universal threaded base that can interface with standard electrical light bulb sockets. The housing is integrated to enclose the light sources and light generated from the light sources can issue in directions all around the housing. The interior carrier can be a flexible circuit board in a 3D shape. A translucent shroud covers the carrier and its light sources. The light engine and housing can occupy at least substantially on the order of the same space as mass-marketed light bulbs. However, it is to be understood it can be scaled up or down according to need or desire. In another embodiment of the apparatus, the light engine can take a variety of different three-dimensional form factors. It may or may not have an outer cover. In some possible forms, just the set of light sources, and their control lighting sequence and timing, can be utilized. In many embodiments, an outer cover can enhance the simulation of the appearance of a flame. In one form the outer cover or shroud is translucent and in the form of hammered or frosted glass.

The carrier presents a three-dimensional shape supporting a plurality of light sources distributed at least around a substantial portion of it. The light sources have the capability of being driven individually or in groups according to a certain preprogrammed regimen. The regimen actuates the light sources in a fashion that simulates jumping flames from viewing angles all around the 3D shape.

A system according to the present invention includes a light engine such as described above in combination with a light fixture. The light fixture can include a variety of form factors, including different architectural styles. A few non-limiting examples are lantern-style and pendant-light-style. The light engine can be placed inside the fixture. The fixture may or may not have light transmissive panes.

A method according to an aspect of the invention includes positioning a plurality of individual solid-state light sources in a three-dimensional array. Individual or groups of the LEDs sources are driven according to a predetermined regimen to simulate a leaping flame or flames by actuating LEDs according to a pre-programmed sequence.

Another aspect of the invention comprises simulating a flame effect with artificial lights by a particular repeating pattern of activation of a three-dimensional array of LEDs. The array has LEDs spaced apart from each other and populating most of the lower part of a three dimensional shape. Small groups of LEDs are spaced from each other around the top of the array. Sets of LEDs are sequential activated at varying levels and times between bottom and top of the array, starting more at the bottom and moving or traveling to the top to simulate the leaping of flames.

In another aspect of the invention simulation of the flame effect involves a timing and sequencing of a three-dimensional array of LEDs or other individual light sources in a manner which is repeating but gives the appearance of randomness. One way this can be done is by staggering on-off sequences in different levels from top to bottom around the three-dimensional shape but in a type of jumping up and down as it appears to rise and jump to the topmost portion. After looking at the bulb for several hours, the lighting pattern seems to be rotating around the three dimensional surface. This gives the appearance of a random nonrepeating pattern of the LEDs being turned on and off.

In another aspect more than one set of light sources in a three-dimensional configuration could be nested or distributed on the same three-dimensional shape and have independent timing and sequencing. Such a plural combination could further enhance the appearance of randomness or nonrepeating flame effect for a more realistic effect. In one embodiment this could simply involve plural sets of light sources each having its own dedicated timing circuit for on-off control but programmed to be different than the other sets in one or more of position, timing, or other parameters such as color of the light sources or output distribution patterns.

These and other objects, features, aspects and advantages of the invention will become more apparent with reference to the accompanying specification and claims.

BRIEF DESCRIPTION OF THE DRAWINGS

The patent or application file contains at least one drawing executed in color. Copies of this patent or patent application publication with color drawing(s) will be provided by the U.S. Patent Office upon request and payment of the necessary fee.

FIG. 1A is a perspective view of a light engine module according to one exemplary embodiment of the invention.

FIG. 1B is a side elevation of FIG. 1A.

FIG. 1C is a top plan view of FIG. 1A.

FIG. 1D is a bottom plan view of FIG. 1A.

DETAILED DESCRIPTION OF EXEMPLARY EMBODIMENTS

A. Overview

Figure 2A:
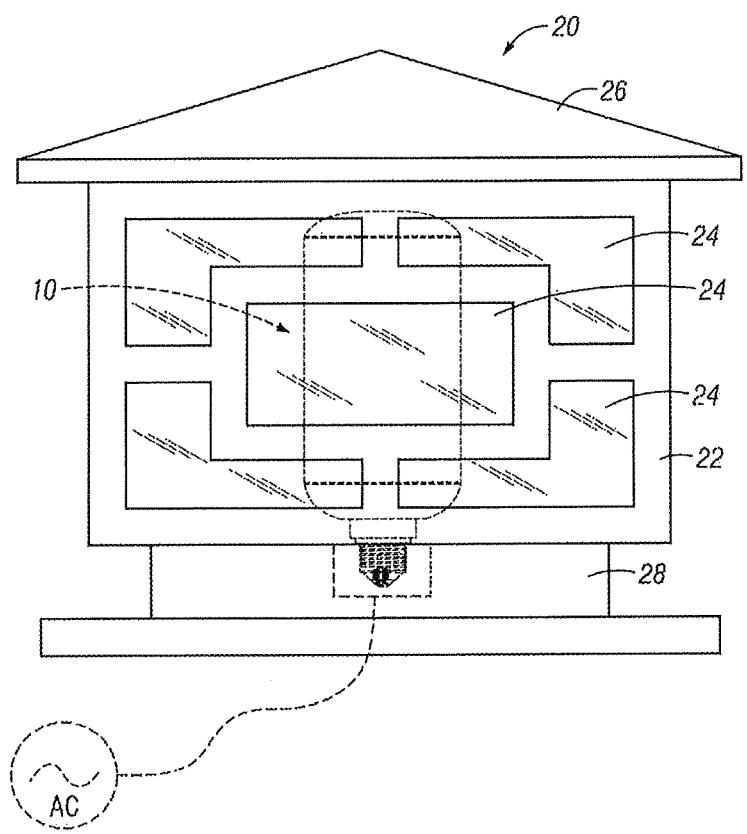
FIG. 2A is a side elevation of a light fixture according to one exemplary embodiment of a system according to the present invention that could utilize the light engine of FIG. 1A and showing its connection to standard household electricity diagrammatically.

For a better understanding of the invention, several examples of forms and embodiments the invention could take are now described in detail. These are by way of example only and neither inclusive nor exclusive of all forms and embodiments the invention can take.

Frequent reference will be taken to the drawings which have been summarized above. Reference numerals will be used to indicate certain parts and locations throughout the drawings. The same reference numerals will be used to indicate the same or similar parts or locations throughout the drawings unless otherwise indicated.

It is to be understood that many of the embodiments will be described in the context of what is called a light engine or module that essentially has the form factor of a light bulb. It has a threaded base that can be threaded into a conventional light bulb socket to provide electrical power. Therefore, it can be substituted in virtually any light fixture that has such a socket. It is to be understood, however, that the invention can take a variety of other forms. It can be scaled up or down within practical limits. It does not have to be packaged with the threaded conventional light bulb base. A different interface to electrical power and a different mount in a fixture are of course possible. But as will be taught by the specific embodiments that follow, basic features and operating principles can be applied in a variety of other form factors and applications.

It is to be further understood that the invention is not necessarily limited to solid-state light sources. Other types of sources could be driven in a similar regimen. Solid-state sources themselves can vary. Examples include LEDs, OLEDS, PLEDs, and laser diodes. They give off light by solid state electroluminescence rather than thermal radiation or fluorescence.

It is particularly to be noted that multiple light engines, or one integrated light engine of 3D carriers of the light sources can be implemented in a variety of applications which may or may not include an enclosing fixture. One example would be utilizing an embodiment of the invention to simulate leaping flames in a fireplace. One example is at FIGS. 21A-B. This would involve designing the carrier to be elongated across a good portion of the fireplace. Alternatively, plural light engines such as similar to those shown in FIG. 1A could be placed in some sort of an array across that same space.

It will be appreciated that even without a translucent cover or shroud, the light engine of FIGS. 1A-D, or other unshrouded configurations could be operated just for an aesthetically pleasing or other lighting presentation. In one embodiment, using timing and sequencing such as will be described further below, it can give the general appearance of a simulated jumping flame. The invention is not necessarily limited, however, to simulation of a flame. Again, it could simply present a light output effect.

B. Apparatus

1. Exemplary Embodiment Light Engine 10 a) Assembled Views of Light Engine 10 Self-Contained Bulb

Figure 23A:
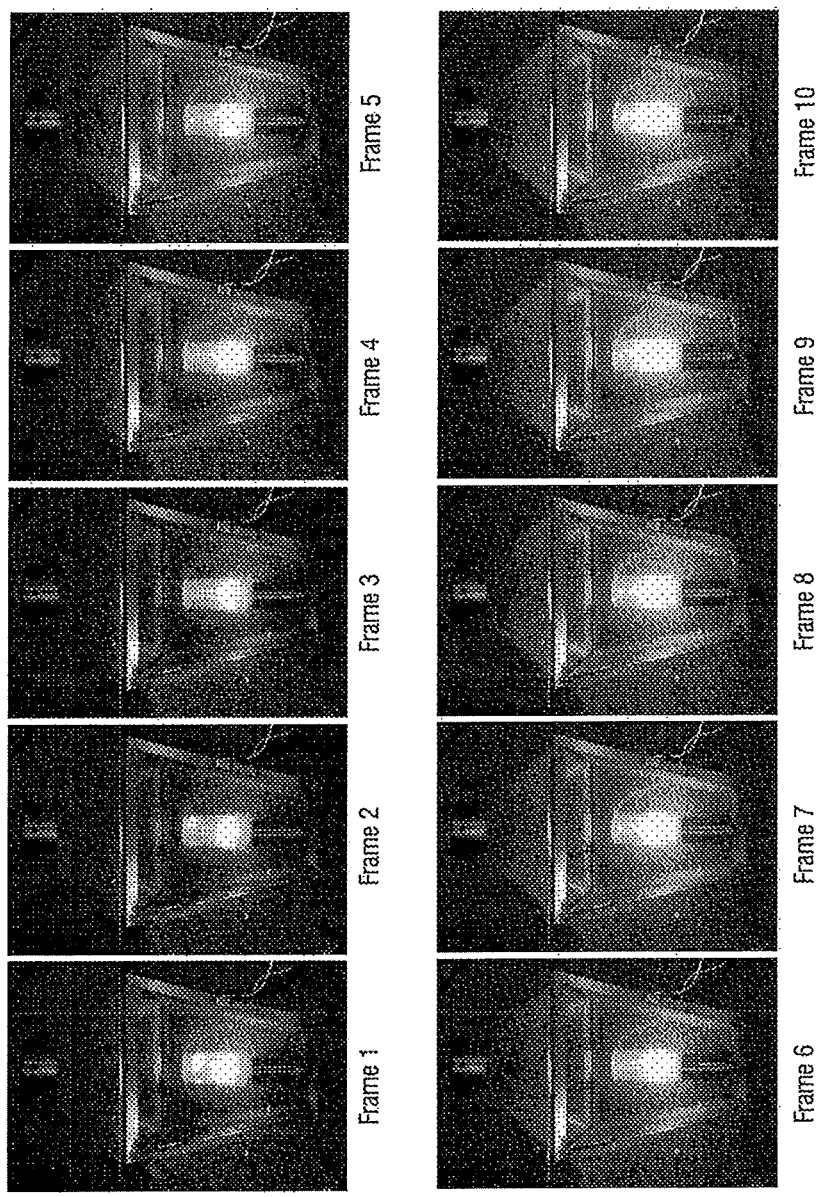
FIGS. 23A-DD are a series of still frame color stop action photos similar to FIGS. 22A-DD but with a front door to the fixture open to see the light engine operating inside.
Figure 23B:
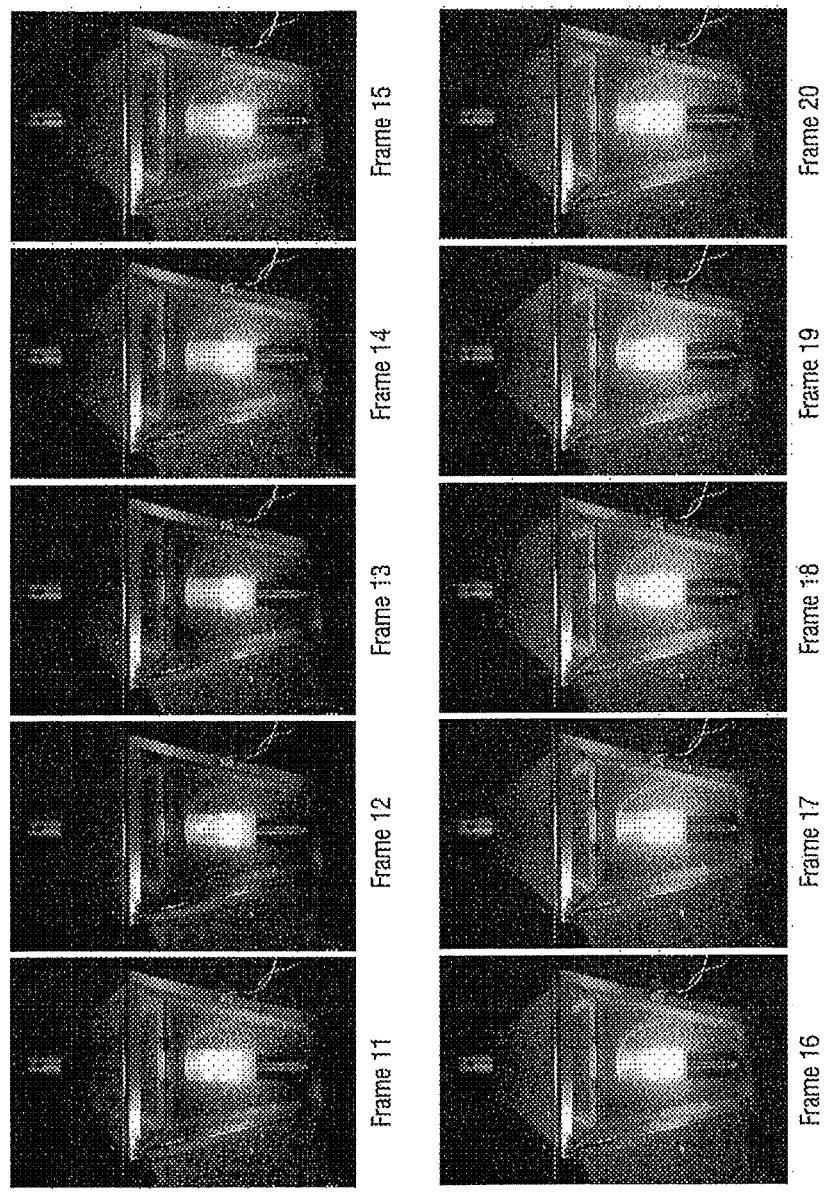
Figure 23C:
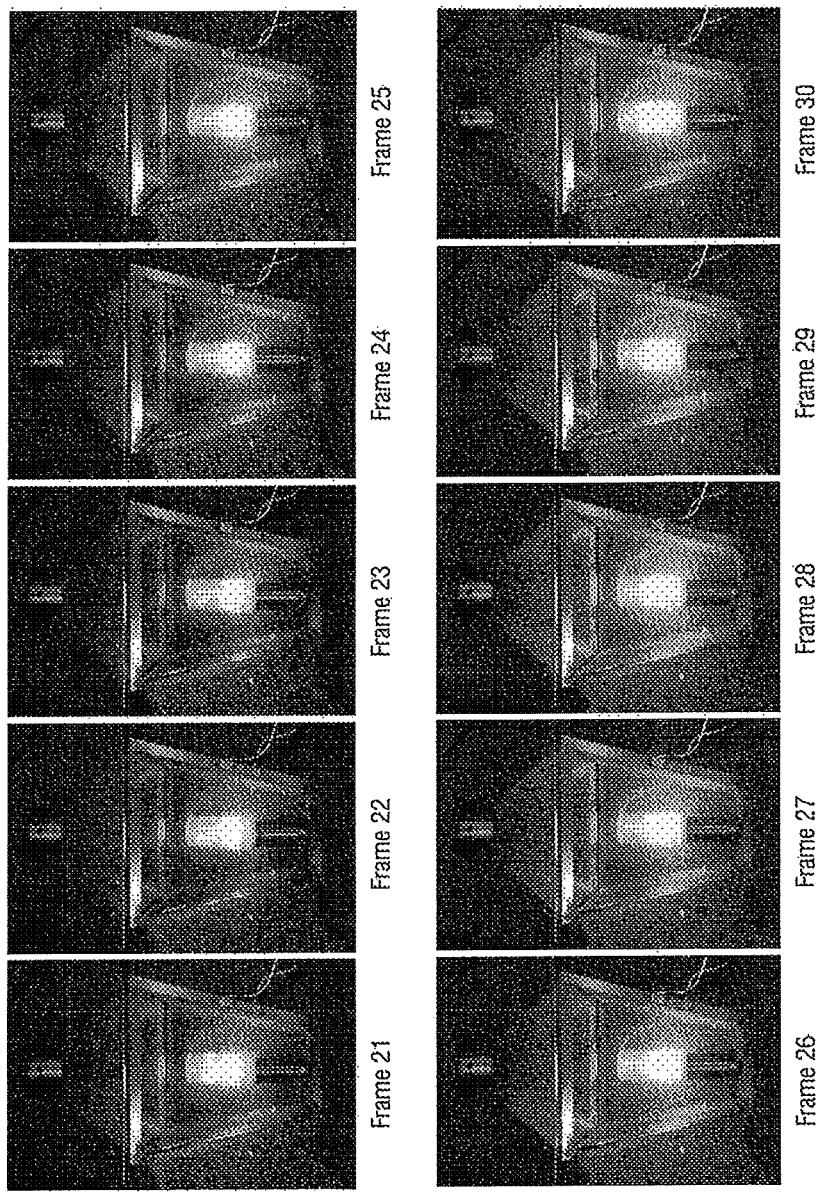
Figure 23D:
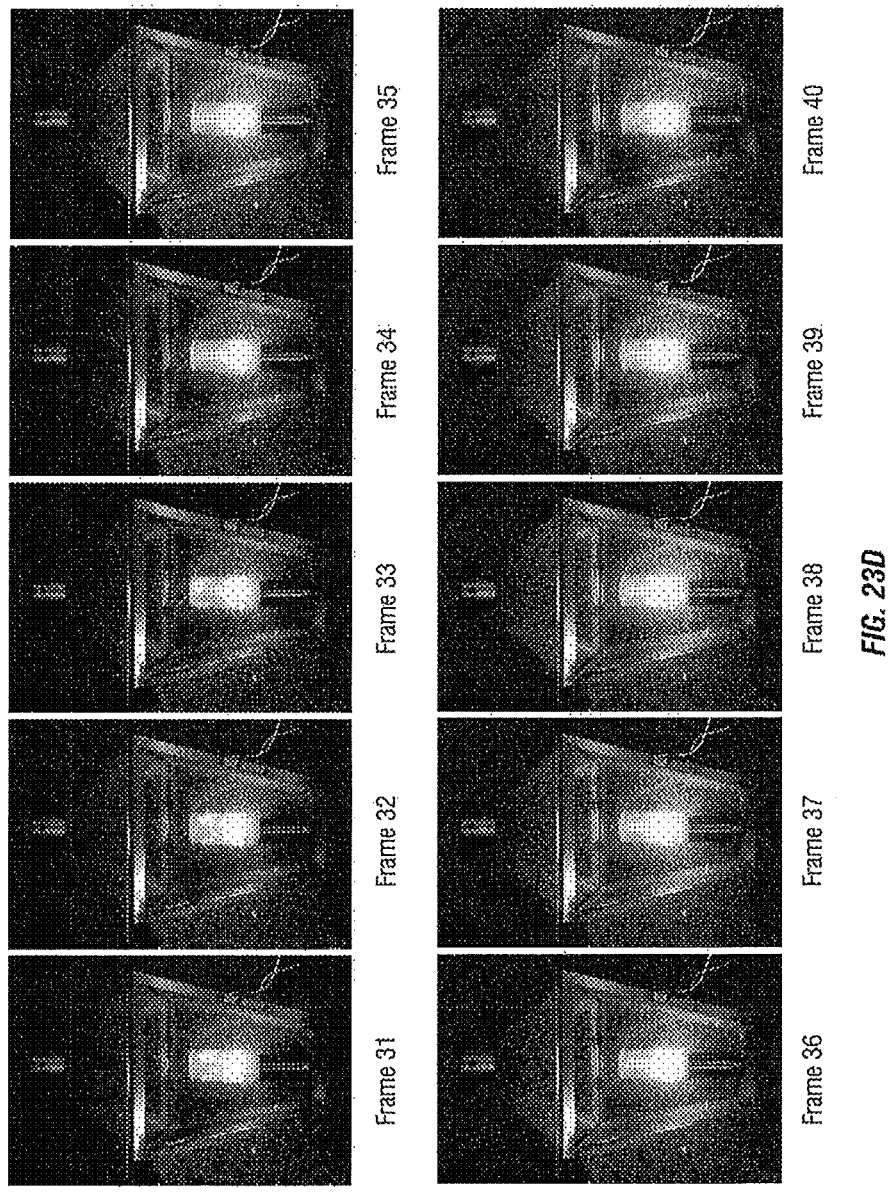
Figure 23F:
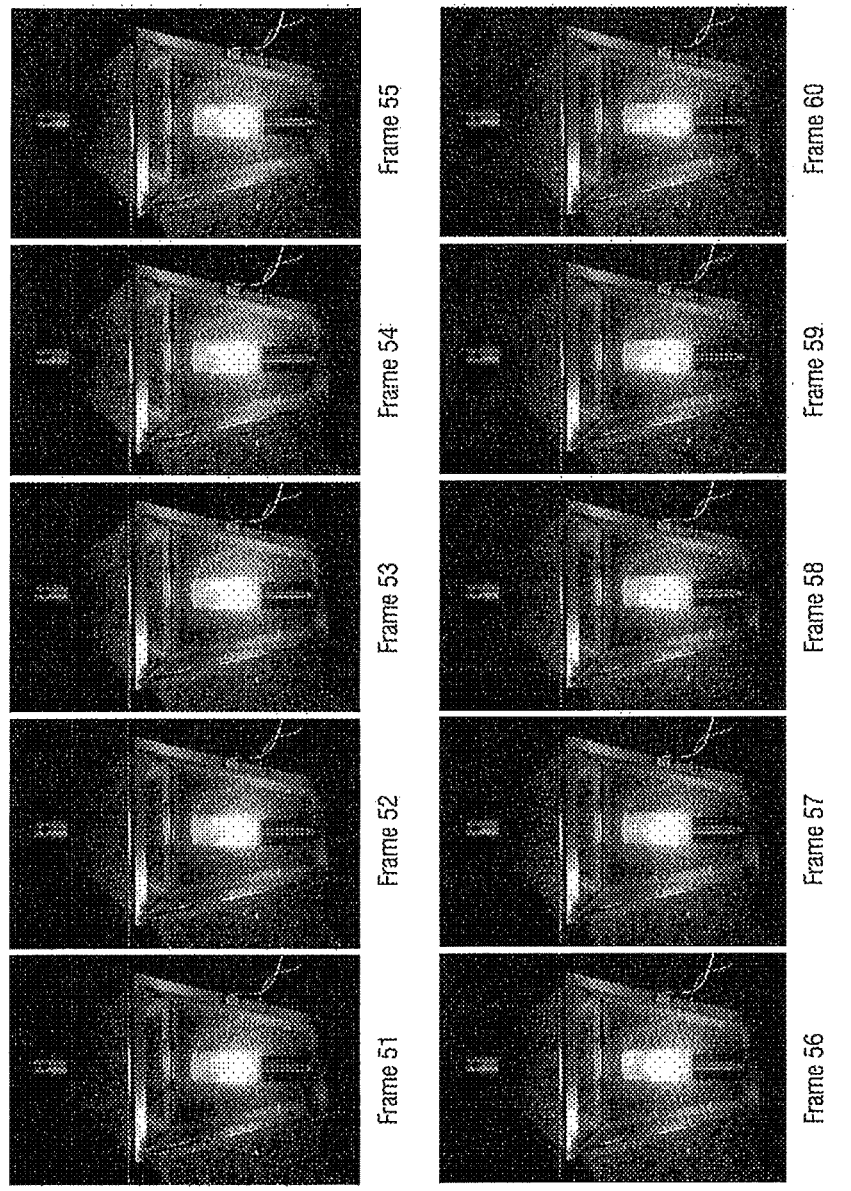
Figure 23G:
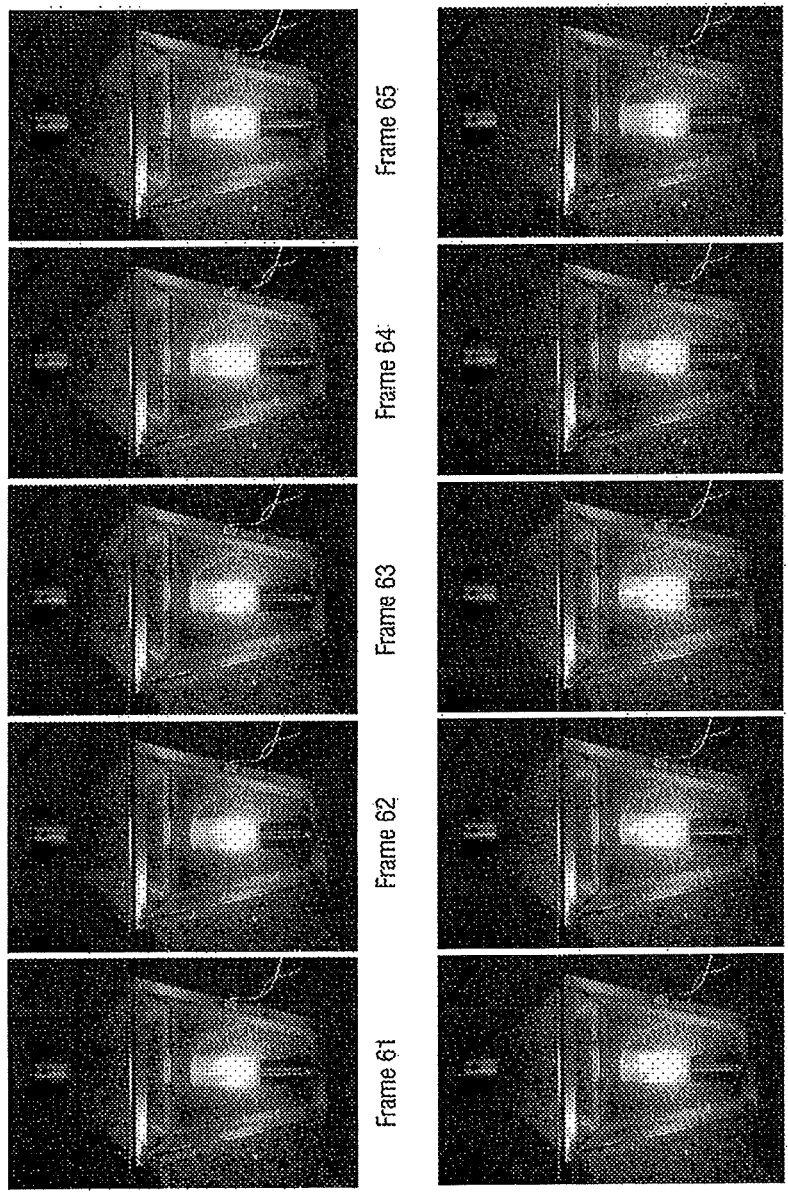
Figure 23I:
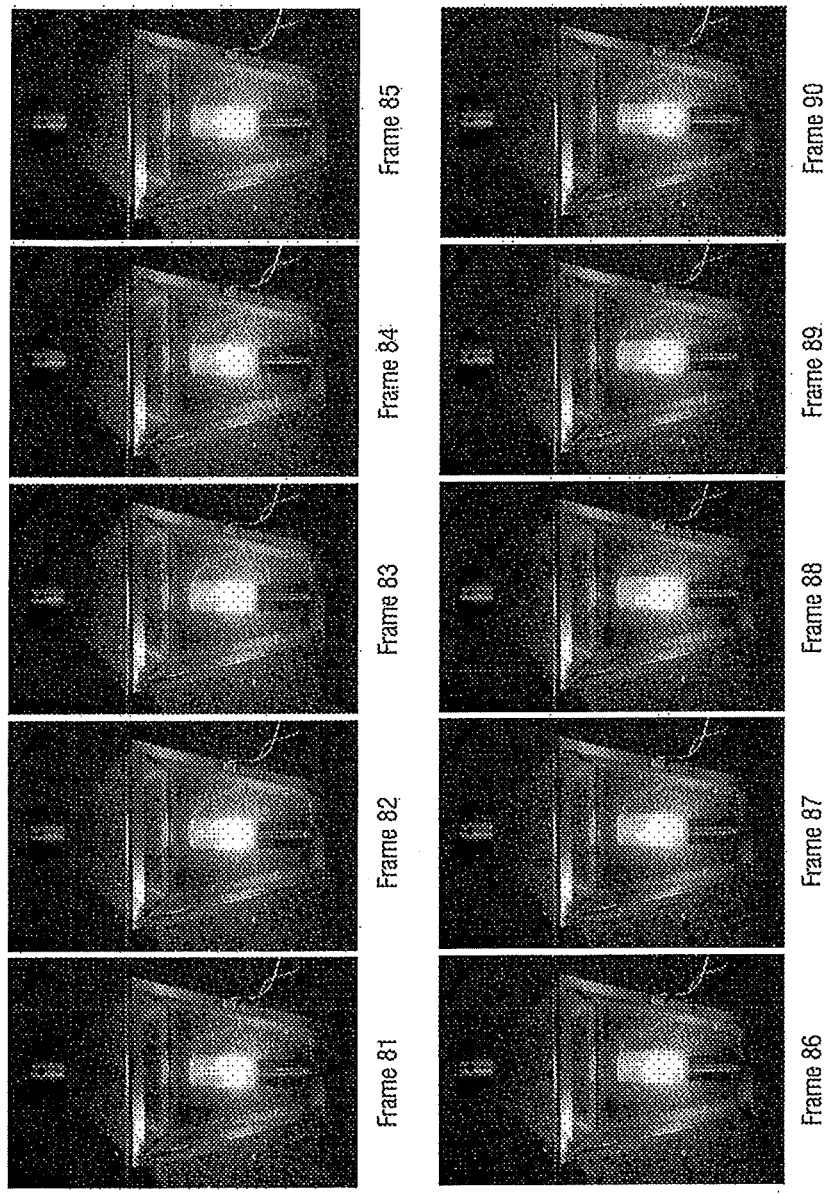
Figure 23J:
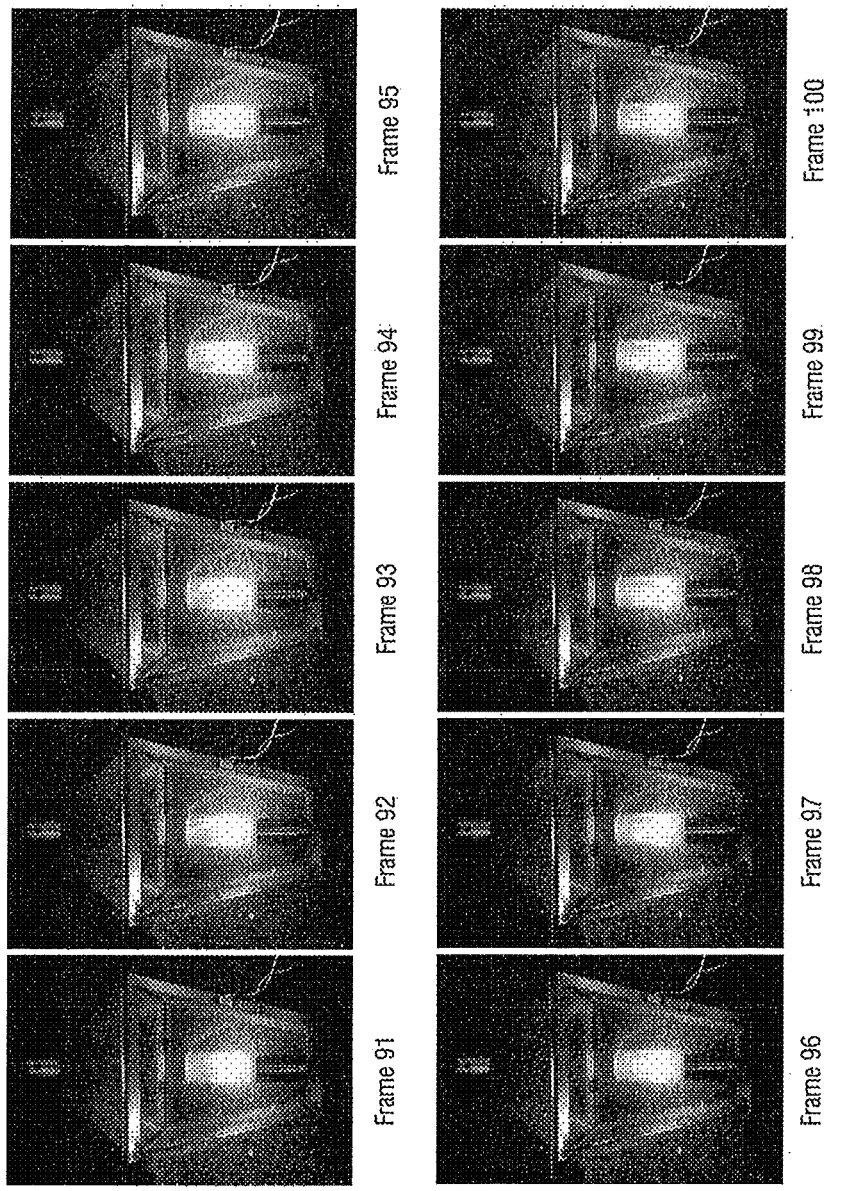
Figure 23K:
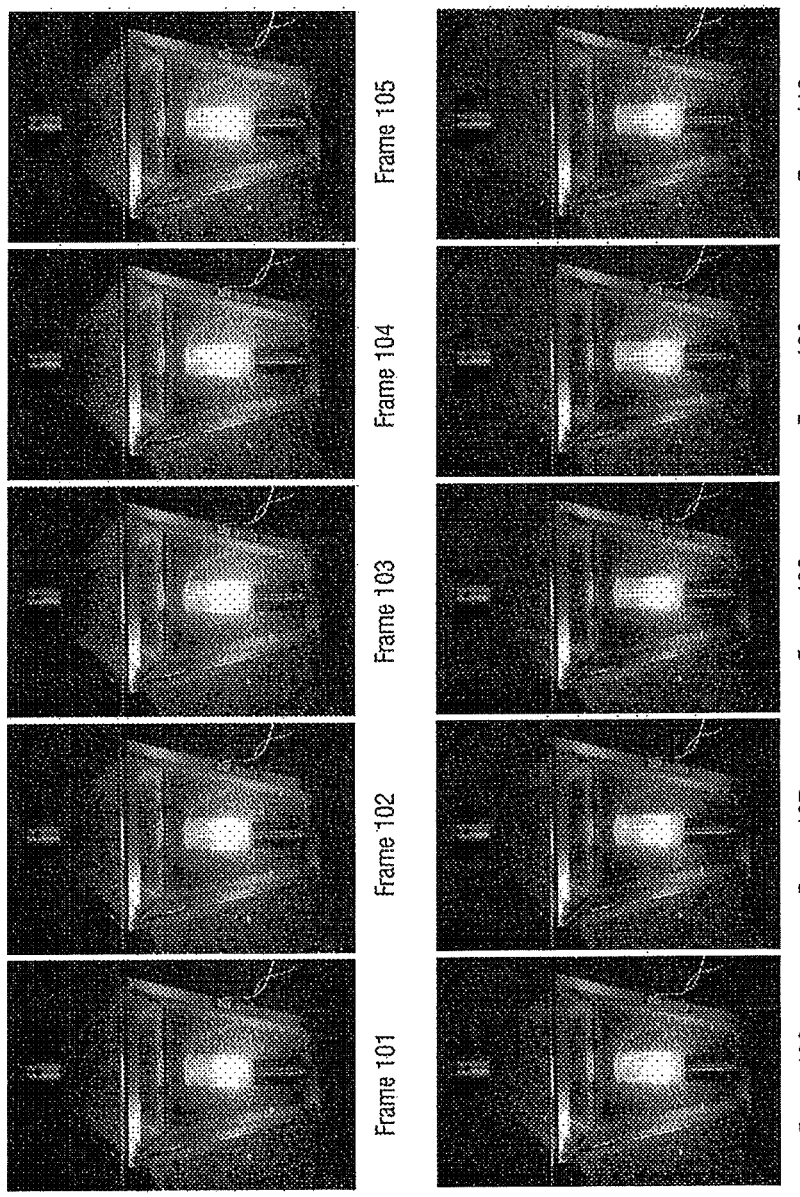
Figure 23L:
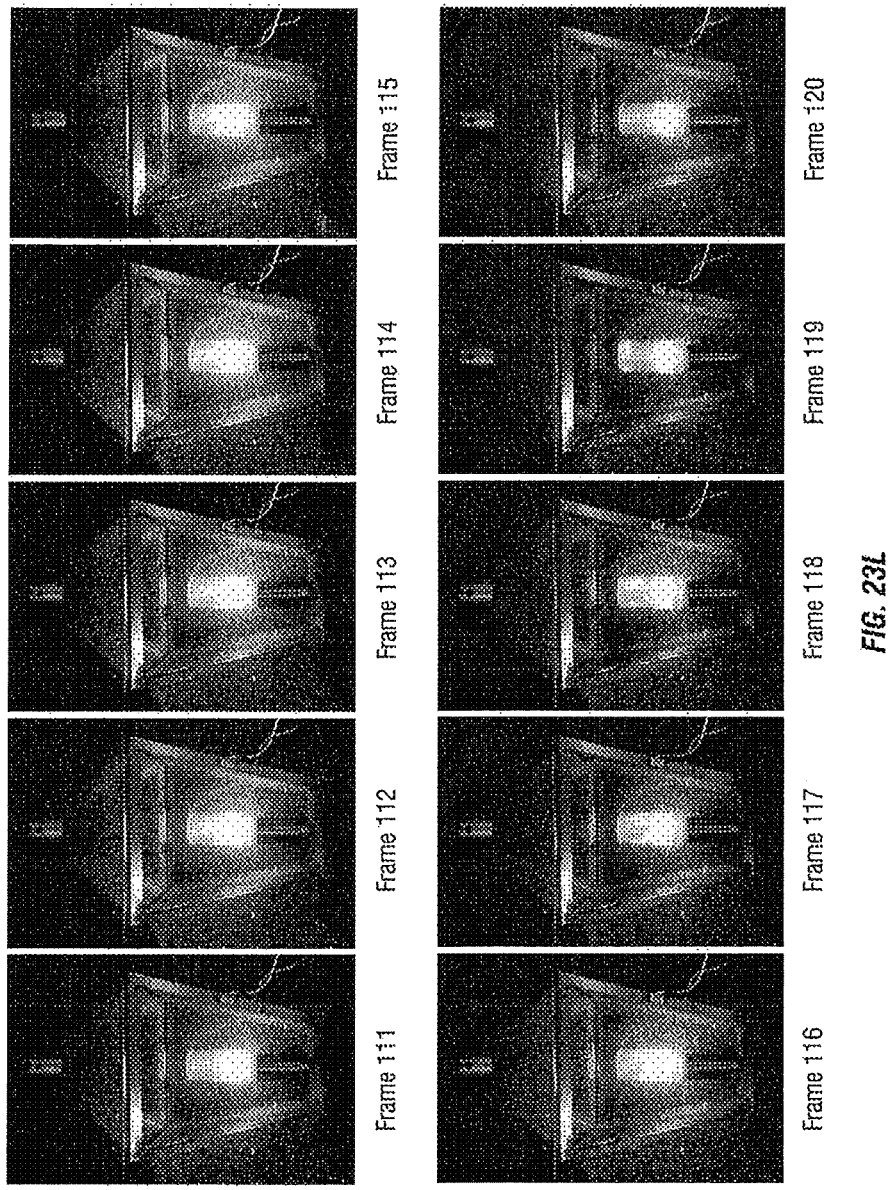
Figure 23M:
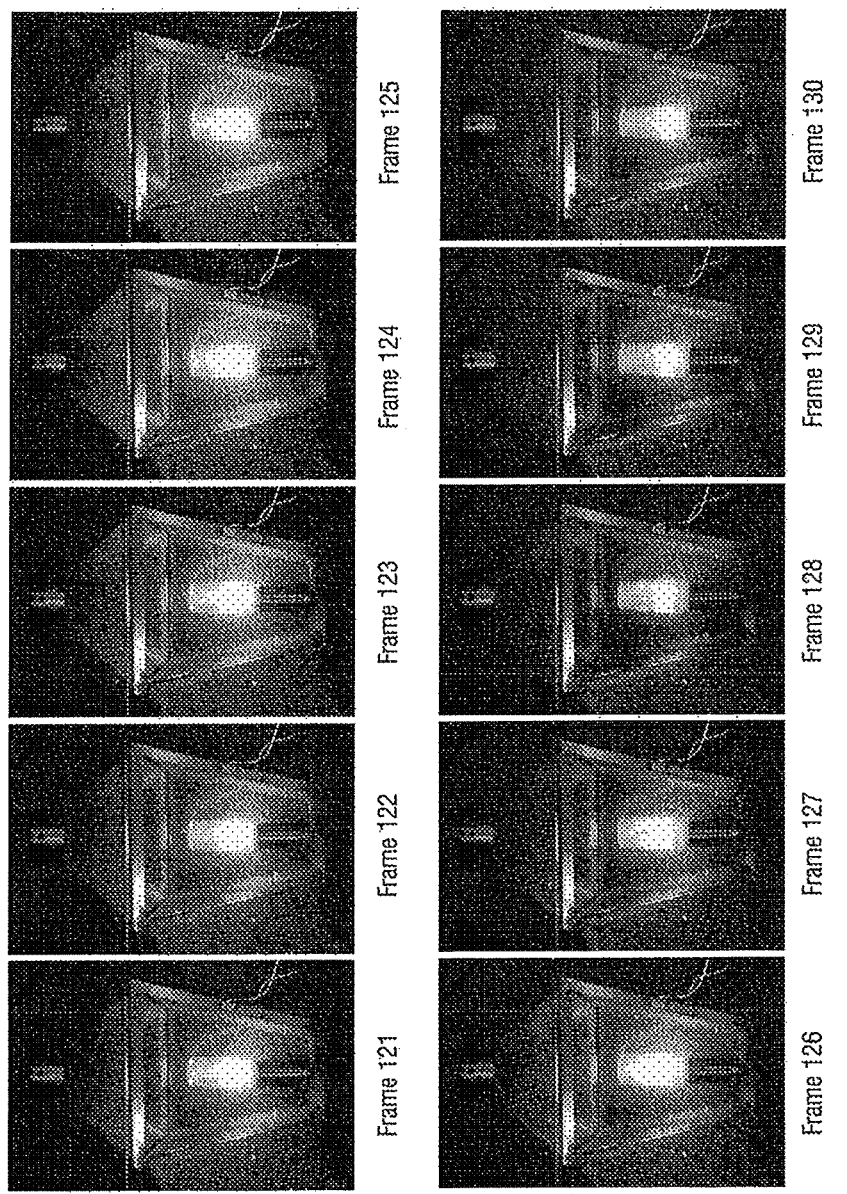
Figure 23N:
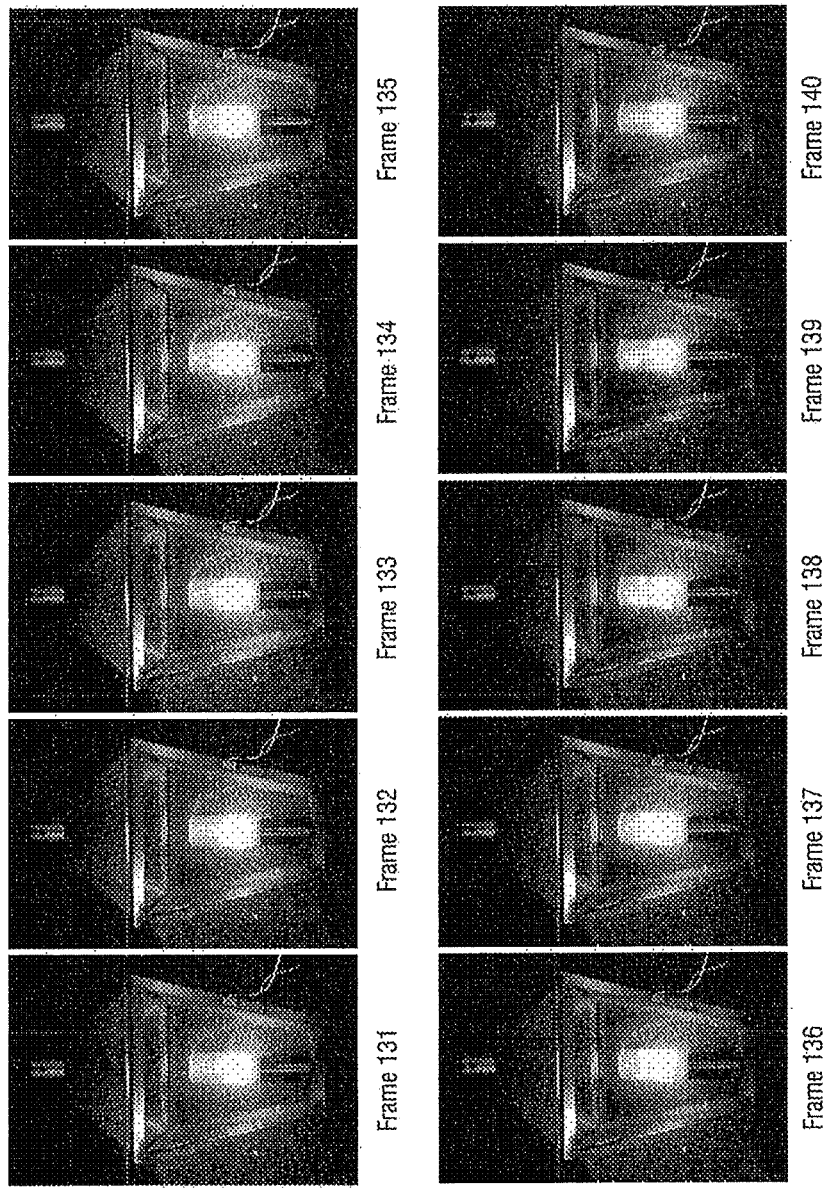
Figure 230:
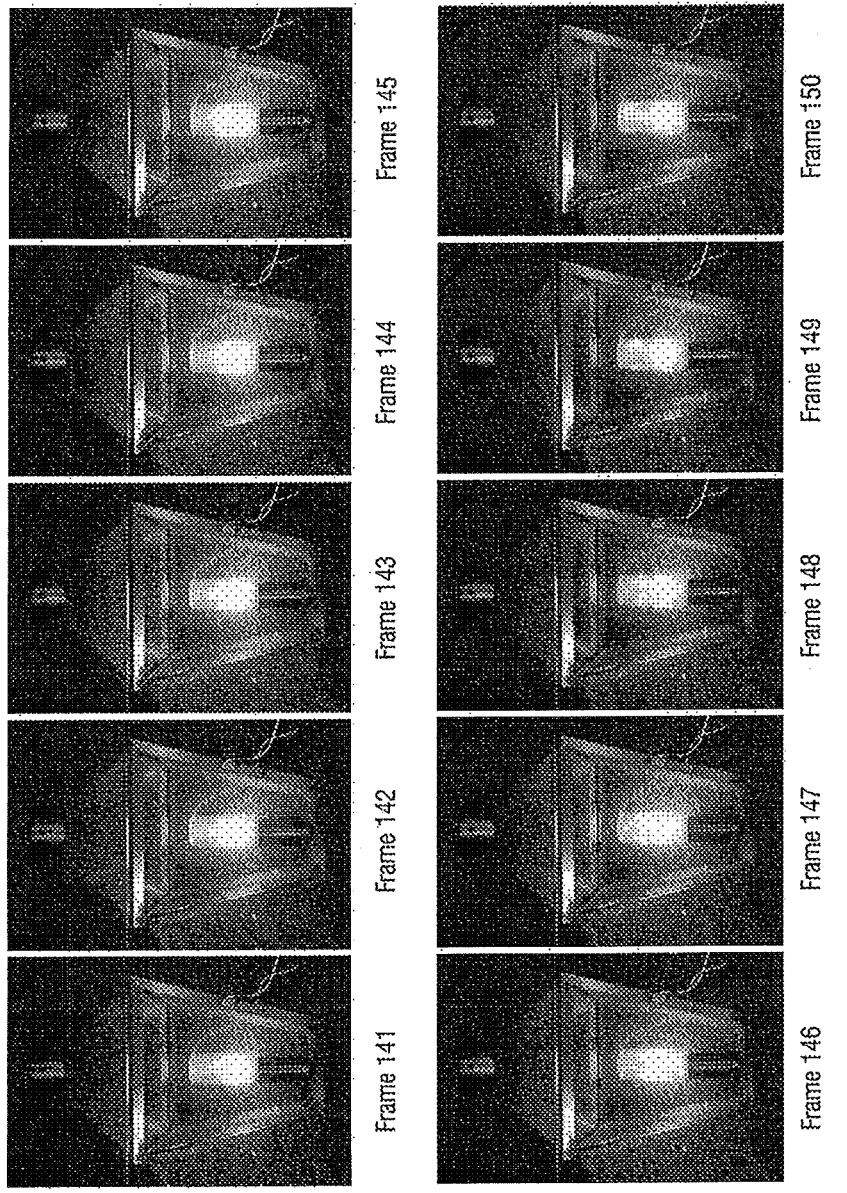
Figure 23P:
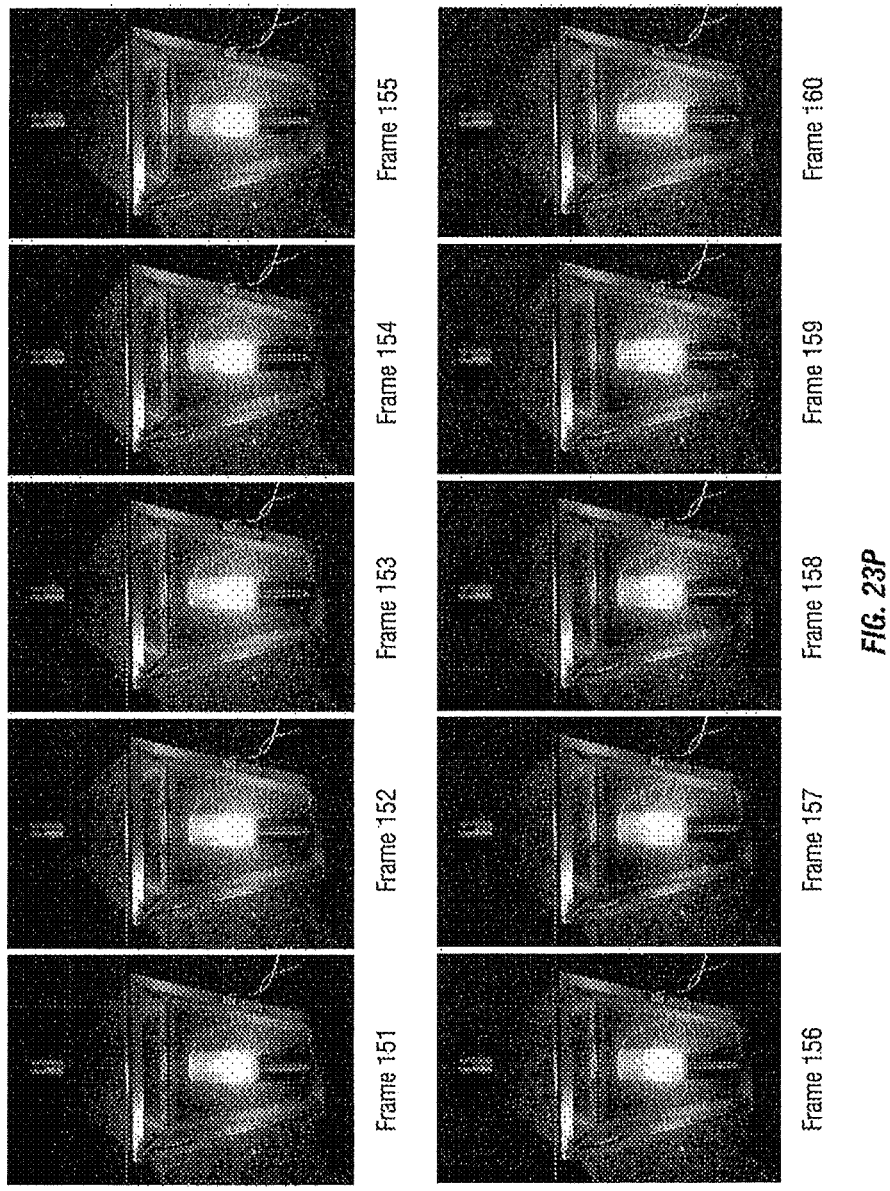
Figure 23Q:
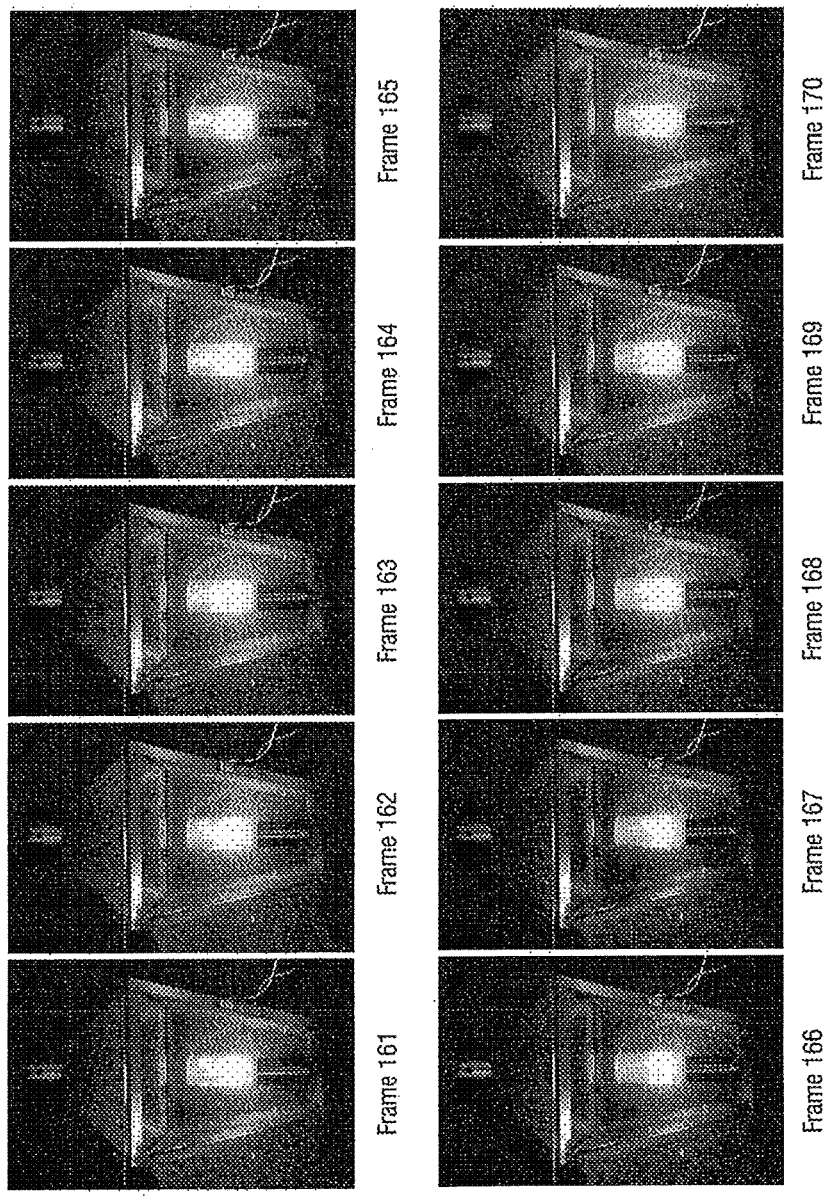
Figure 23R:
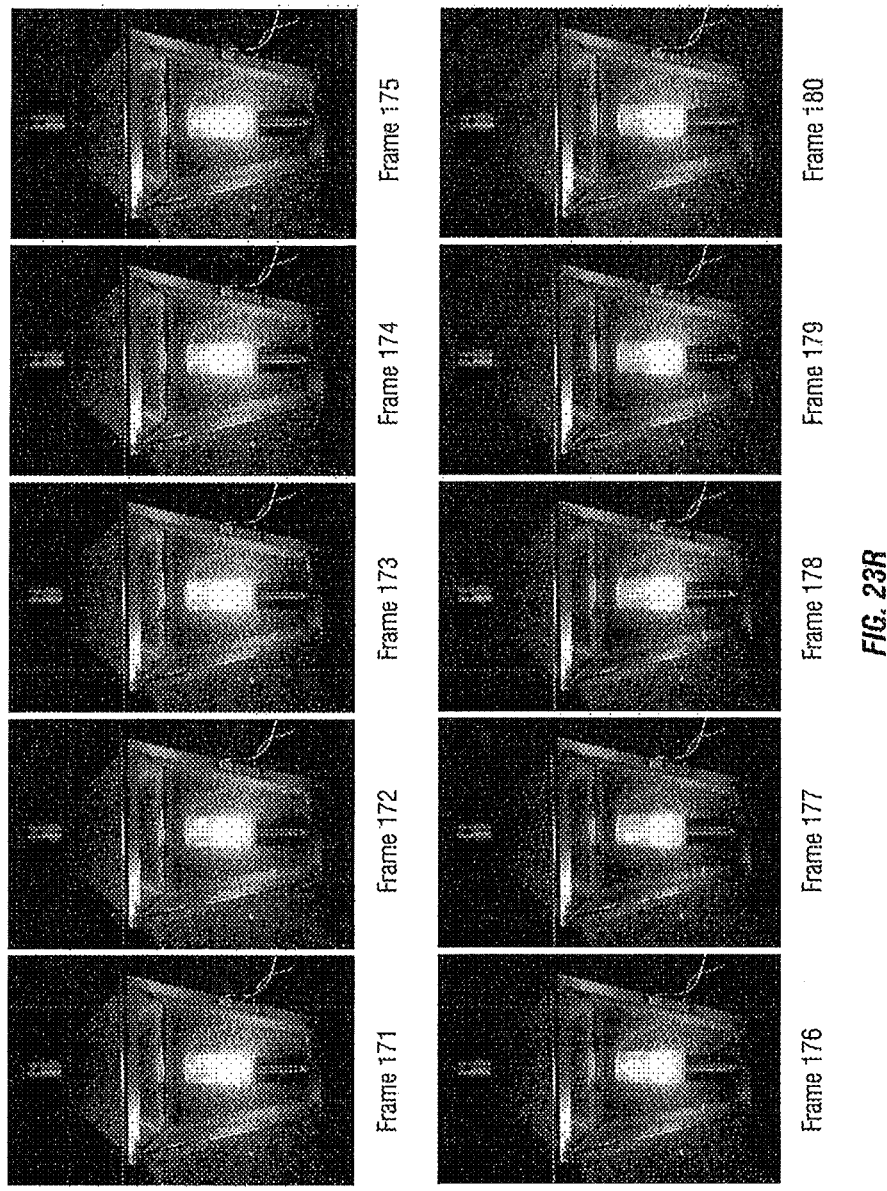
Figure 23S:
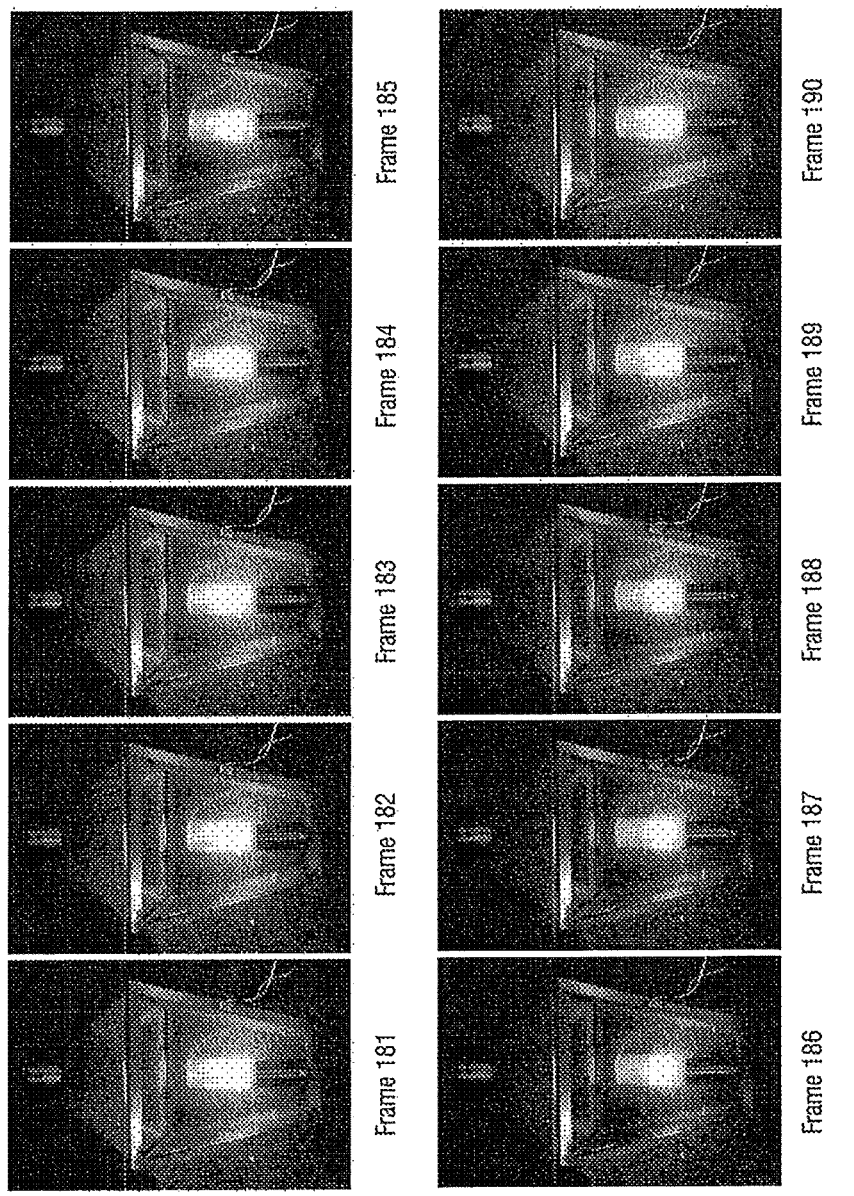
Figure 23T:
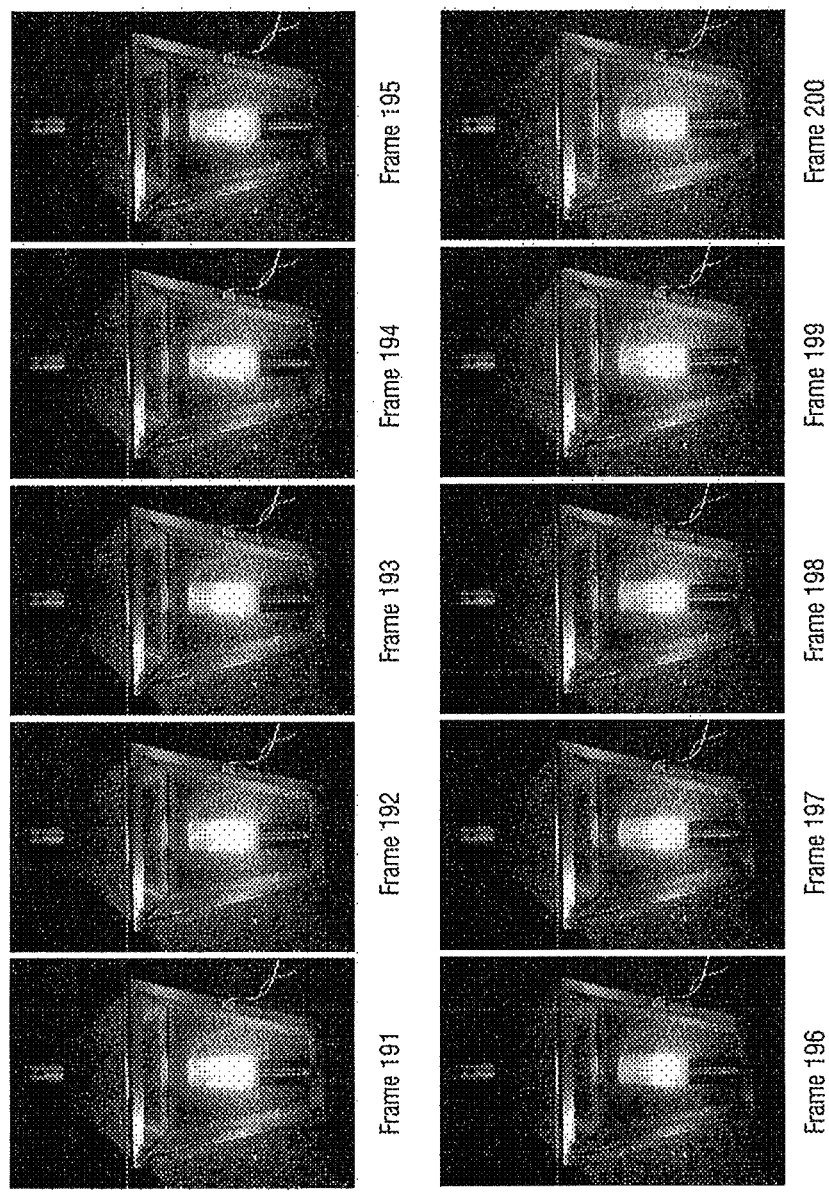
Figure 23U:
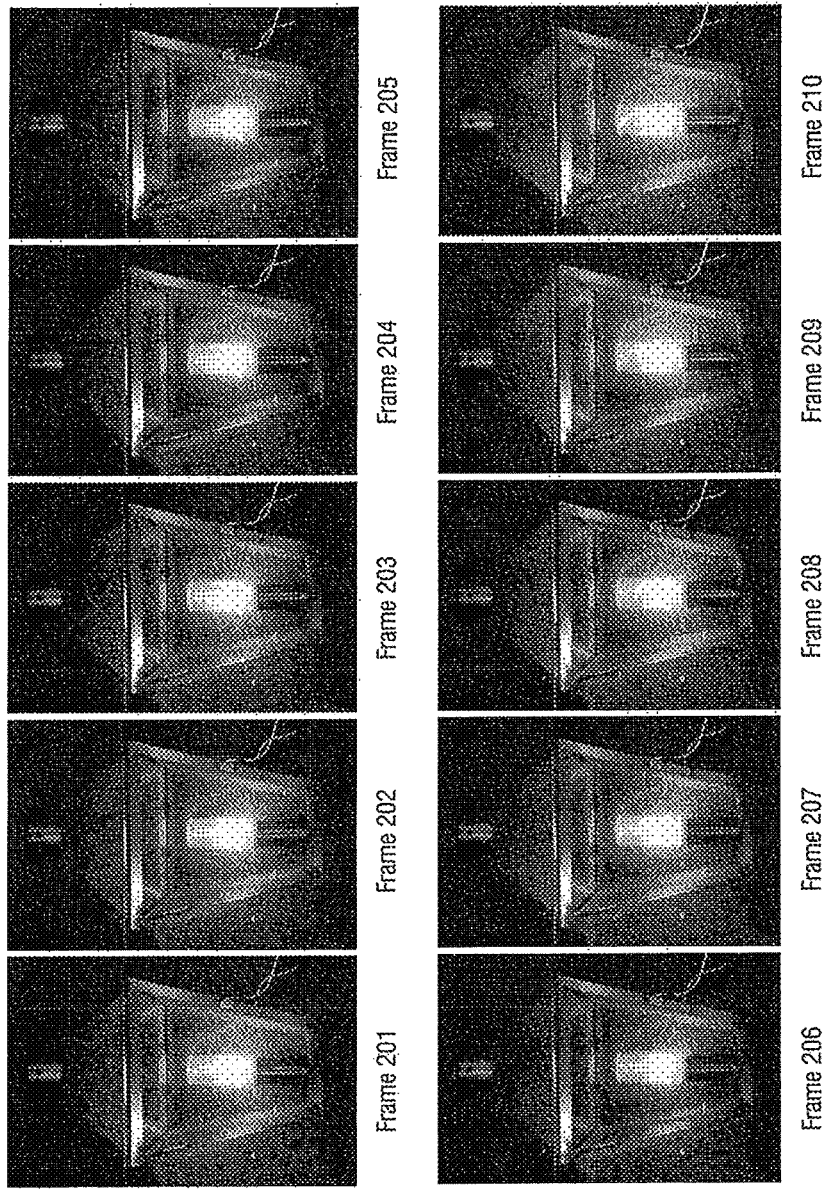
Figure 23V:
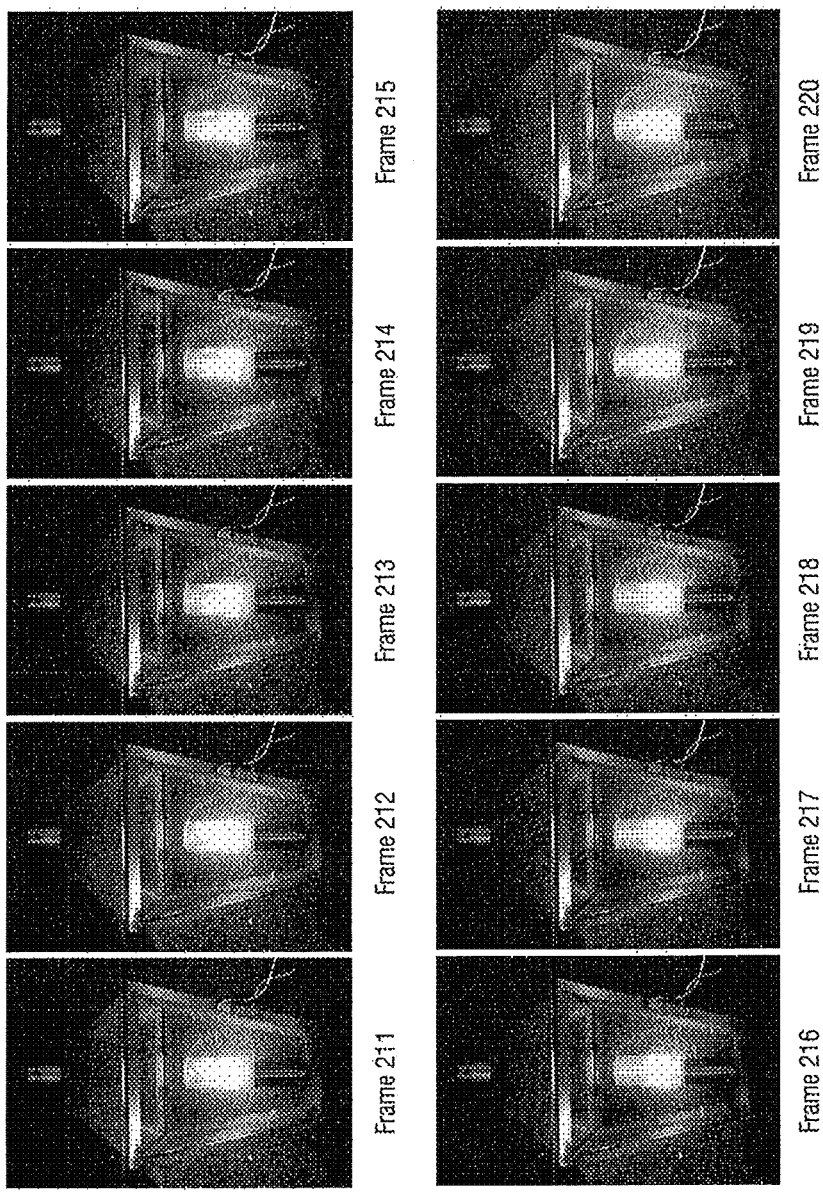
Figure 23X:
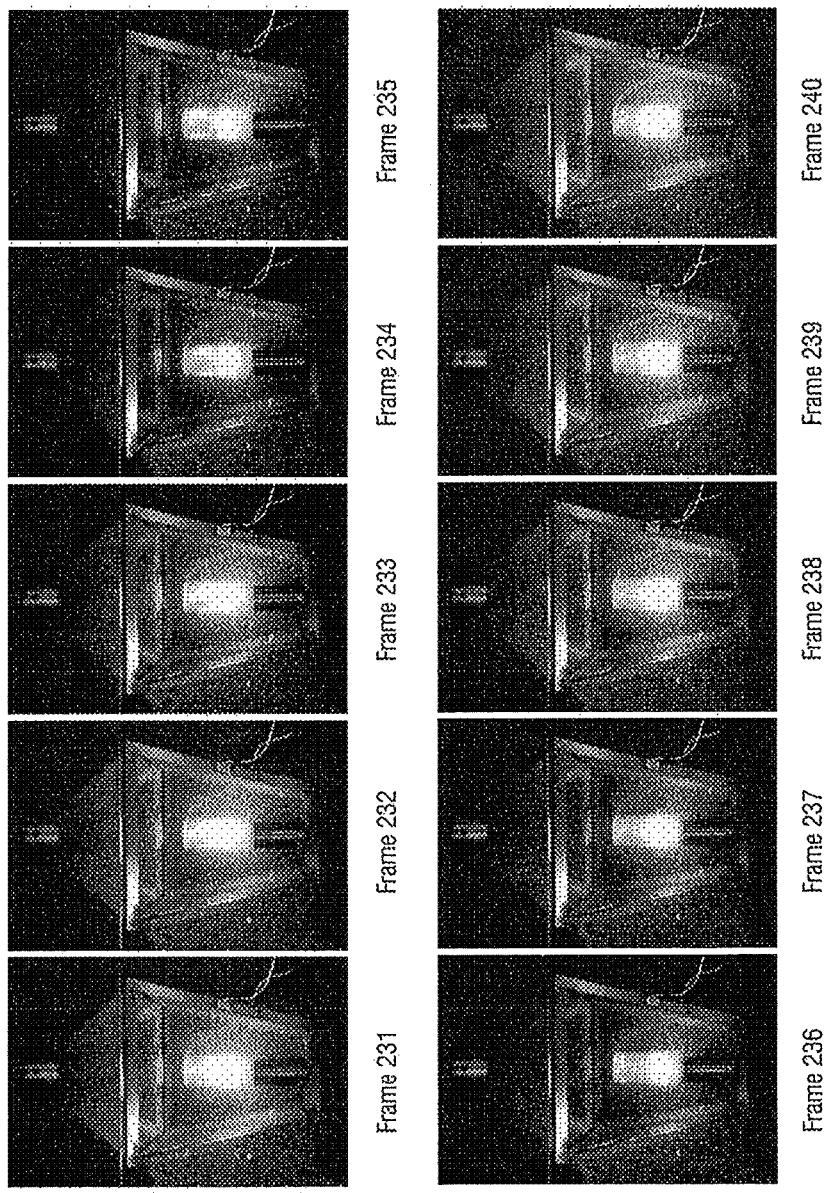
Figure 23Y:
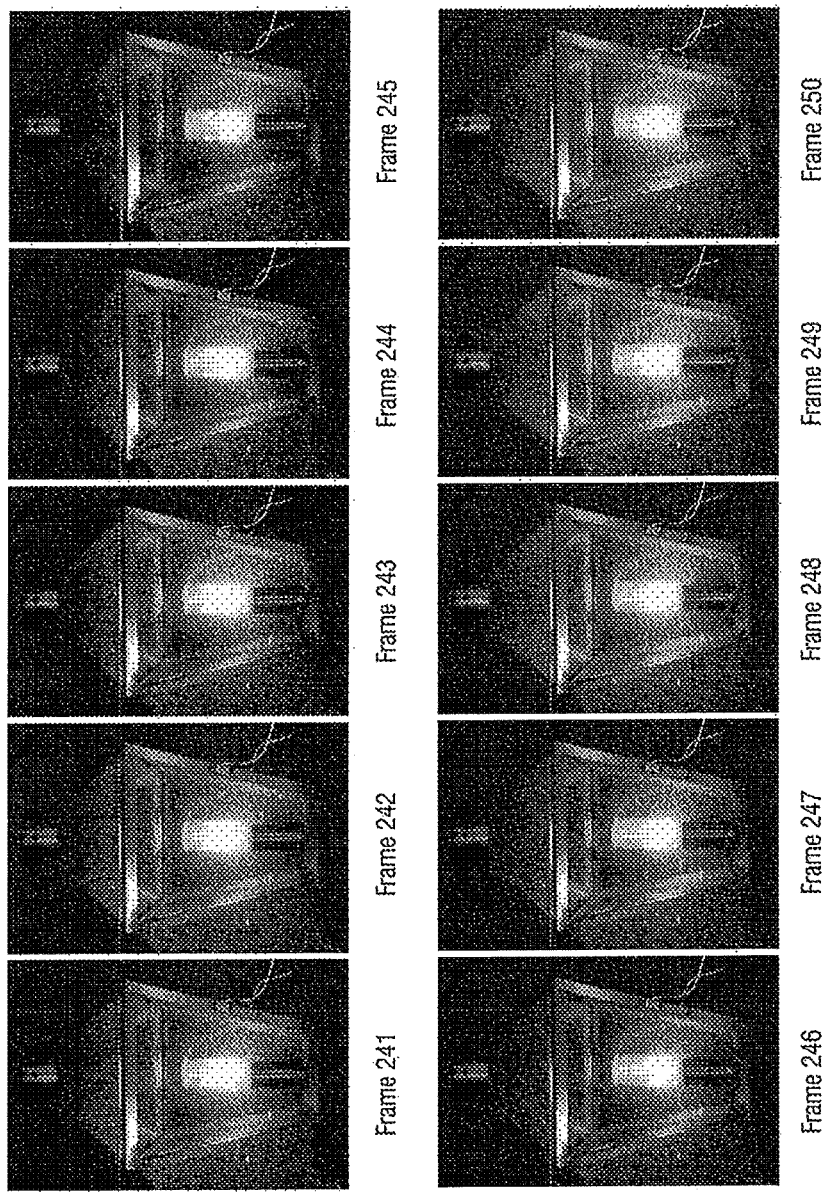
Figure 23Z:
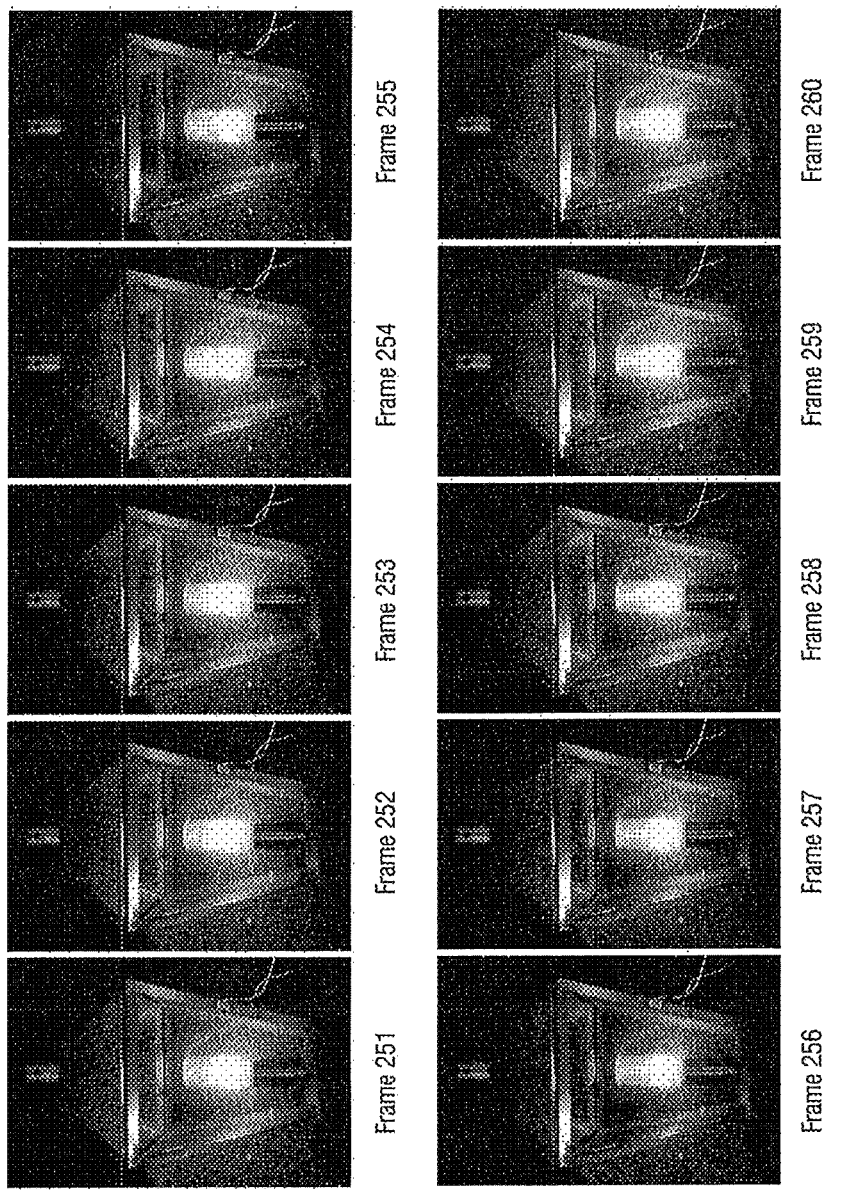
Figure 23A:
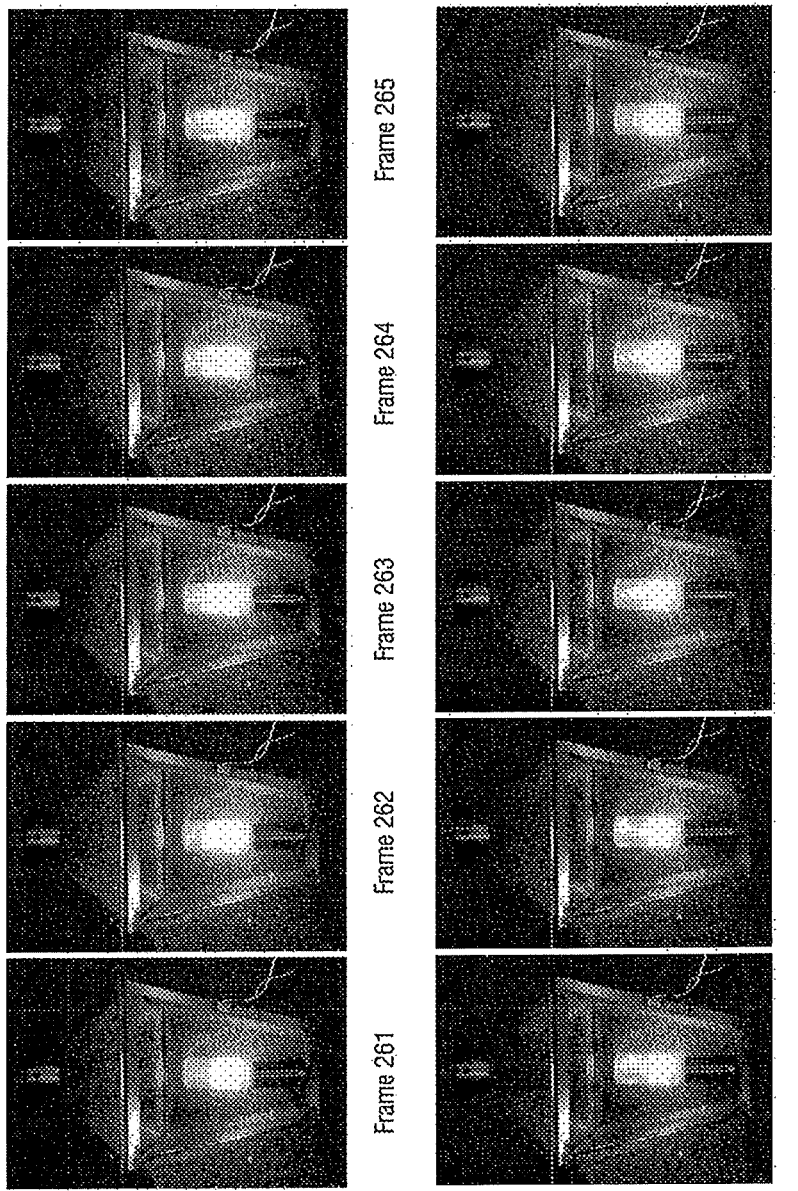
Figure 23B:
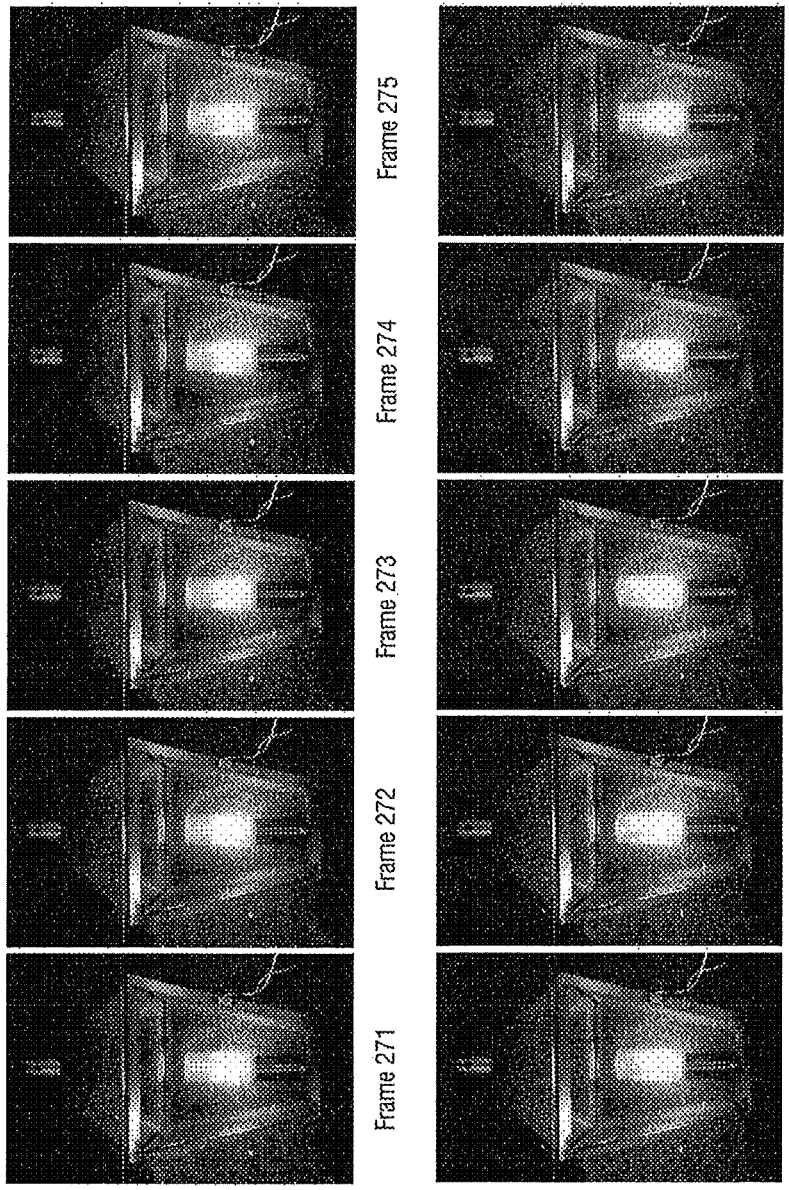
Figure 23C:
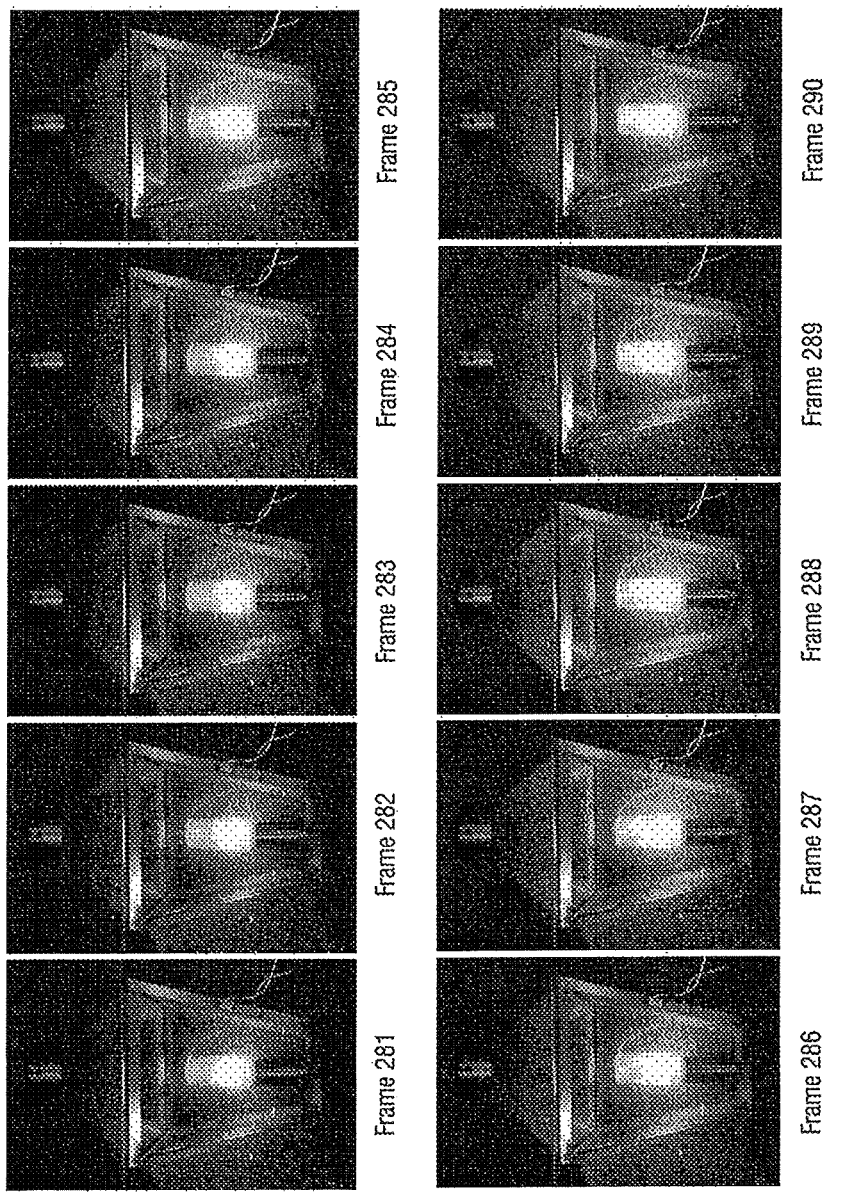
Figure 23D:
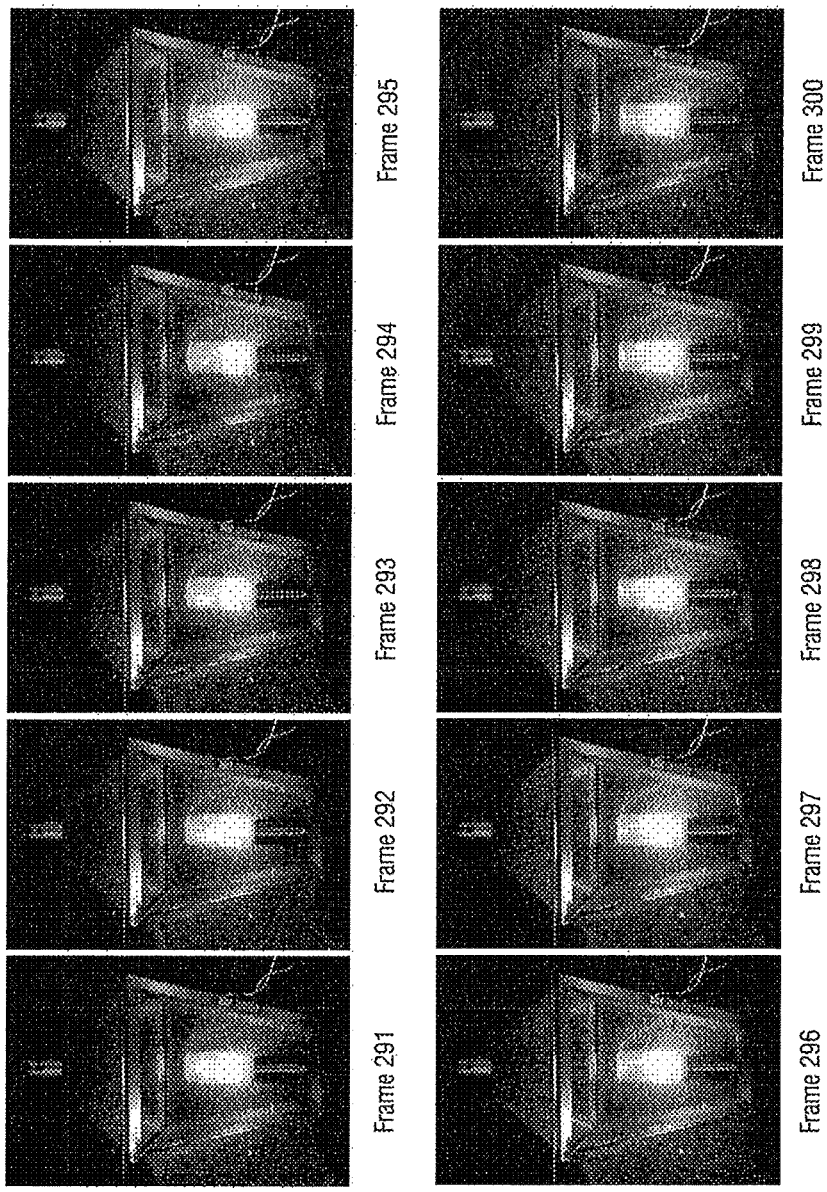

With reference to FIGS. 1A-D through FIG. 15, one example of what would be called light engine 10 will be described. In this example, its form factor is larger than a conventional threaded base light bulb. For example, it can have an end to end length of 220 millimeters, and a largest diameter width of 90 millimeters, with a cylindrical at least partially light transmissive lens 12 having approximately 130 millimeter length, an interior cylindrical three dimensional carrier 14 carrying plural LEDs 15, a top cap 16, and a bottom cap 18 with a threaded electrical interface 19 (collectively having a length of about 65 millimeters) (see dimensions in mm in FIG. 1B). But, as mentioned, this can be scaled up or down within practical limits. It can also have differing form factors. For example, the diameter could be increased relative to length. The shapes do not necessarily have to be cylindrical. In this embodiment the LED array is at least substantially three dimensional in that it projects light radially around the longitudinal axis to at least a substantial degree if not entirely. Another embodiment is closer to the scale of a conventional incandescent household light bulb. See FIGS. 23A-DD for an actual example. It is on the order of 120 mm overall length, 50 mm overall width, and 70 mm from top cap to bottom of LEDs (see FIG. 13A for dimensions in mm of the flexible substrate 14 and LEDs 5 from that embodiment). Other form factors are, of course, possible.

As such, light engine 10 can be a self-contained light source assembly. It can be assembled and sold as a unit. In this embodiment, its universal threaded base allows it to be used in complementary threaded electrical sockets typical in light fixtures that can be connected to household line electrical power.

As will be appreciated from FIGS. 1A-D, this configuration allows 360-degree light output radially relative the longitudinal axis between threaded base 19 and top cap 16. This light output is through an at least partially light transmissive (including but not limited to completely transparent, translucent, diffuse, colored, moire patterned, or other treatments on this lens, shroud, or cover). That cover 12 can also be substantially sealed relative to the other components to protect interior contents from moisture, dirt and dust, or other unwanted things. In this embodiment, member 12 is basically a transparent cover over the LEDs to encase and protect them.

As can be further appreciated, the components can be made out of a variety of materials. In one example the threaded base 19 is electrically conductive and thus typically metal. Other components such as the formed end 18, top cover 16, and cylindrical carrier and outer light transmissive cover 12 can be of electrically insulated material. One example would be any of a variety of plastics. The designer could select the materials according to need or desire. For example, for indoor applications, the materials may not need to be as robust as for outdoors applications.

The shroud 12 in light engine 10 in FIGS. 1A-D alternatively could be translucent. Non-limiting examples of translucent frosted or hammered glass, oil paper, and some plastics.

LEDs or other light sources can be selected according to need or desire. In this example, the LEDs can be commercially available dies. They can be selected from a wide variety of operating characteristics including lumen output, light output distribution pattern, power requirements, color, etc. The designer could also elect to include either a thin layer coating that could change color of light output or other characteristics. The designer could also elect secondary optics at each die if desired. As can be appreciated, the designer can elect to use all the same LEDs or LEDs that vary in characteristics. The designer would normally evaluate all of those factors, including the color, light transmissiveness, and other characteristics of the cover 12, in selecting the light sources.

Figure 12:
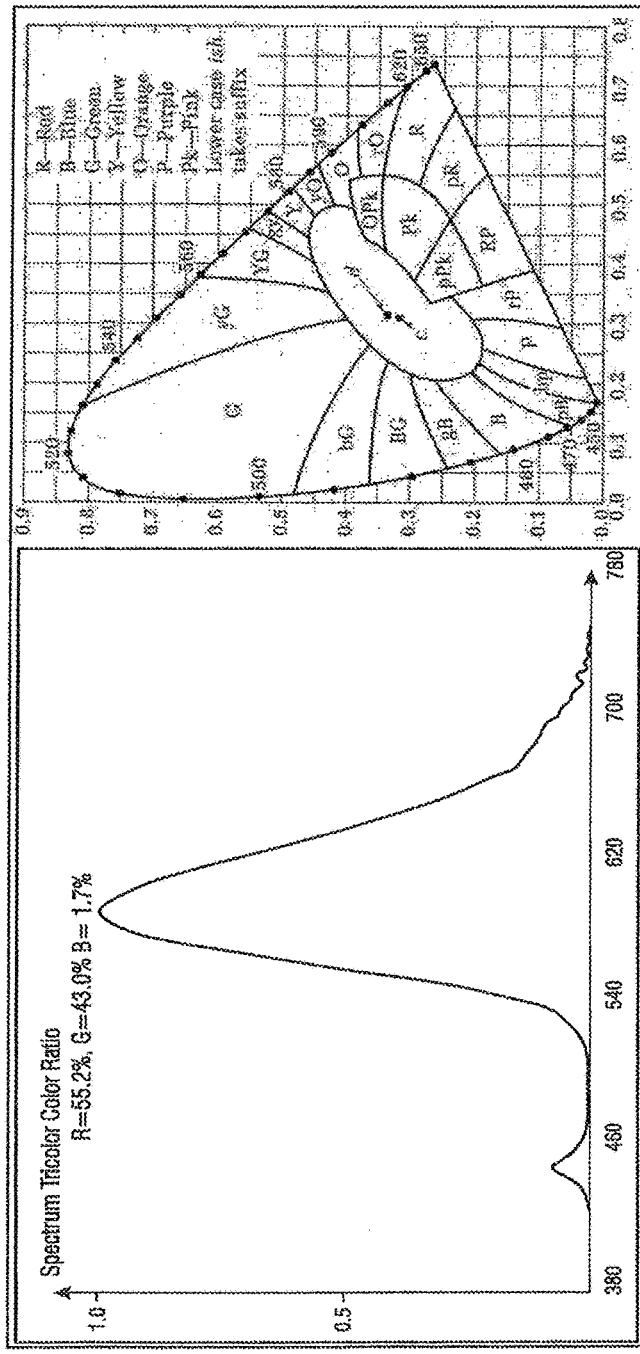
FIG. 12 is an illustration of and parameters of one example of LEDs that could be used in the LED array of FIG. 11 for the light engine of FIG. 1A, including specifications for tricolor ratio, chromaticity, etc.

The LEDs in light engine 10 are characterized in FIG. 12, including size, color output, and operating requirements. It will be understood, however, that light source type and its operating characteristics can vary according the need or desire.

As will be further discussed later, an internal drive circuit in light module 10 can be configured to drive the LEDs in a certain pattern over time. This programmed lighting regimen can take many forms.

As can be seen from FIGS. 1A-D, light engine 10 is elongated around an axis generally between bottom cap 18 and top cap 16. Light from the sources will radiate generally radially from and therefore be observable by persons from any viewing position 360 degrees around that axis. Unlike the more 2D solutions, this promotes the perception of a real flame, as a real flame typically has 3D form.

b) Examples of Bulb 10 in Several Styles of Light Fixtures

FIG. 2A is a schematic illustration of a system according to the present invention. The light engine 10 of FIGS. 1A-D is mounted inside a light fixture 20 which has a complementary threaded electrical socket (shown schematically in dashed lines). Fixture 20 includes an intermediate frame 22 that includes portions that are at least partially light transmissive. In this case, light engine 10 is shown in all dashed lines to indicate its general position inside the surrounding fixture 20 and that light transmissive panes 24 of fixture 20 are frosted, hammered, and/or twisted or otherwise not transparent. These panes essentially are an outer shroud, cover, or lens. The observer of fixture 20 would therefore not directly see light engine 10. Additionally, such frosting or texturing of the panes 24 (see for example FIG. 3) would help simulate a flame-like effect from the fixture.

As discussed with regard to light engine 10, its inner shroud 12 is transparent. But panes 24 on fixture 20 are translucent (here hammered glass). Therefore, an observer of just light engine 10 would not be able to image any LED with clarity. Rather, the translucent outer shroud (panes 24) would scatter the LED light in a manner that the observer would perceive distorted and fuzzy images as the LEDs turn on and off in sets along the axis of the shroud. The light output distribution patterns, color, intensity, and other selected characteristics of the LEDs, in combination with the optical properties of the panes 14, would produce the perception of a 3D flame burning inside light engine 10. A subtlety of the design is that by intentionally obscuring the LEDs by hammered glass fixture panes 24, it actually enhances the simulation of a flame.

Thus, placement of light engine 10 inside a fixture with frosted or hammered glass panes (such as FIG. 2A), enhances flame simulation. An observer from any available vantage point relative fixture 20 (e.g. front, left side, right side, and back side if exposed) would not directly image light engine 10 because panes 24 are translucent. But they would perceive a 3D diffuse and varying light output through translucent panes 24. This enhances the perception of an actual flame inside.

Figure 2B:
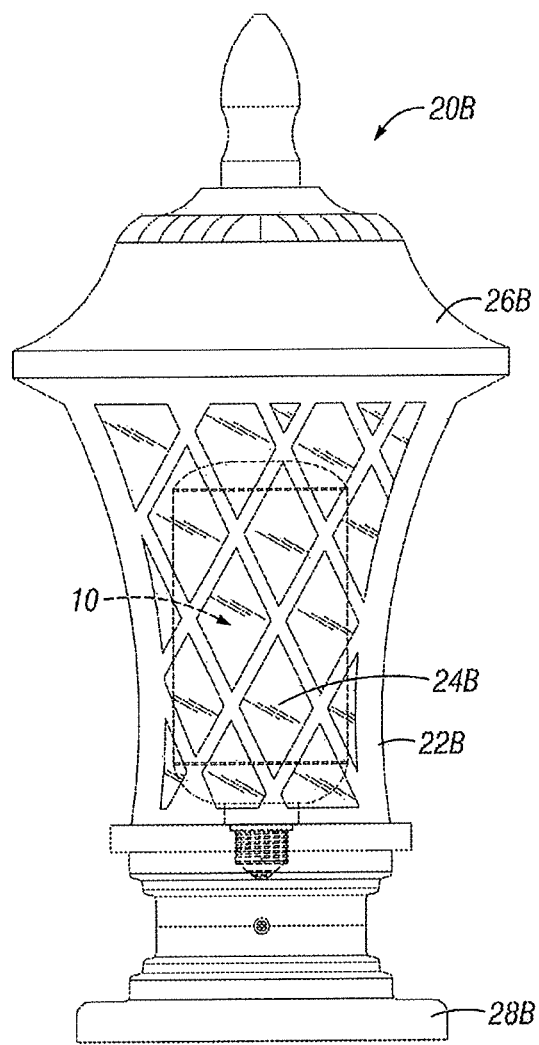
FIG. 2B is a side elevation of an alternative embodiment of a light fixture that could use the light engine of FIG. 1A.

As can be appreciated, fixture 20 in this example of FIG. 2A is one style of an architectural fixture. Its base 28 could include a mounting interface (screws, bolts, or otherwise) for mounting it in an upright vertical position on some supporting structure (e.g. wall bracket, post, bollard, horizontal surface mount, or otherwise). FIGS. 2B and C show just a couple of non-limiting alternative architectural styles for fixtures (reference numerals 20B and C). This emphasizes how light engine 10 can simply be mounted into any number of different styles of fixtures. Furthermore, it can be understood that the panes or at least partially light transmissive portions 24 of any fixture could be transparent, or combination of transparent or translucent.

It is possible that panes 24 could be omitted and there be simply openings in fixture frame 22 to view the light engine 10. The transparent shroud 12 of light engine 10 would allow some viewing angles to have a direct view of the LEDs. However, if shroud 12 were made translucent, it could diffuse the LED output and help simulate a flame effect to observers even if there were no panes in the light fixture. Alternatively, there could be some other shroud, cover, or lens between light engine 10 and the light fixture that could be translucent and diffuse the light engine light.

It can therefore be seen that a system for simulating a flame effect can comprise the combination of one, or more, light engines 10 operatively mounted in any of a number of styles of light fixtures 20. The realism of the flame simulation is enhanced by placing a translucent member between the LEDs of the light engine and viewers of the apparatus. In this embodiment, the light engine can simply be threaded out and replaced when needed. But when the light engine is installed in the fixture, the aesthetic can be that of a burning gas lamp. The 3D form factor of light engine 10 furthers the simulation for virtually all viewing angles of the fixture.

c) Specific Example of Simulated Flame in One Fixture

Figure 3:
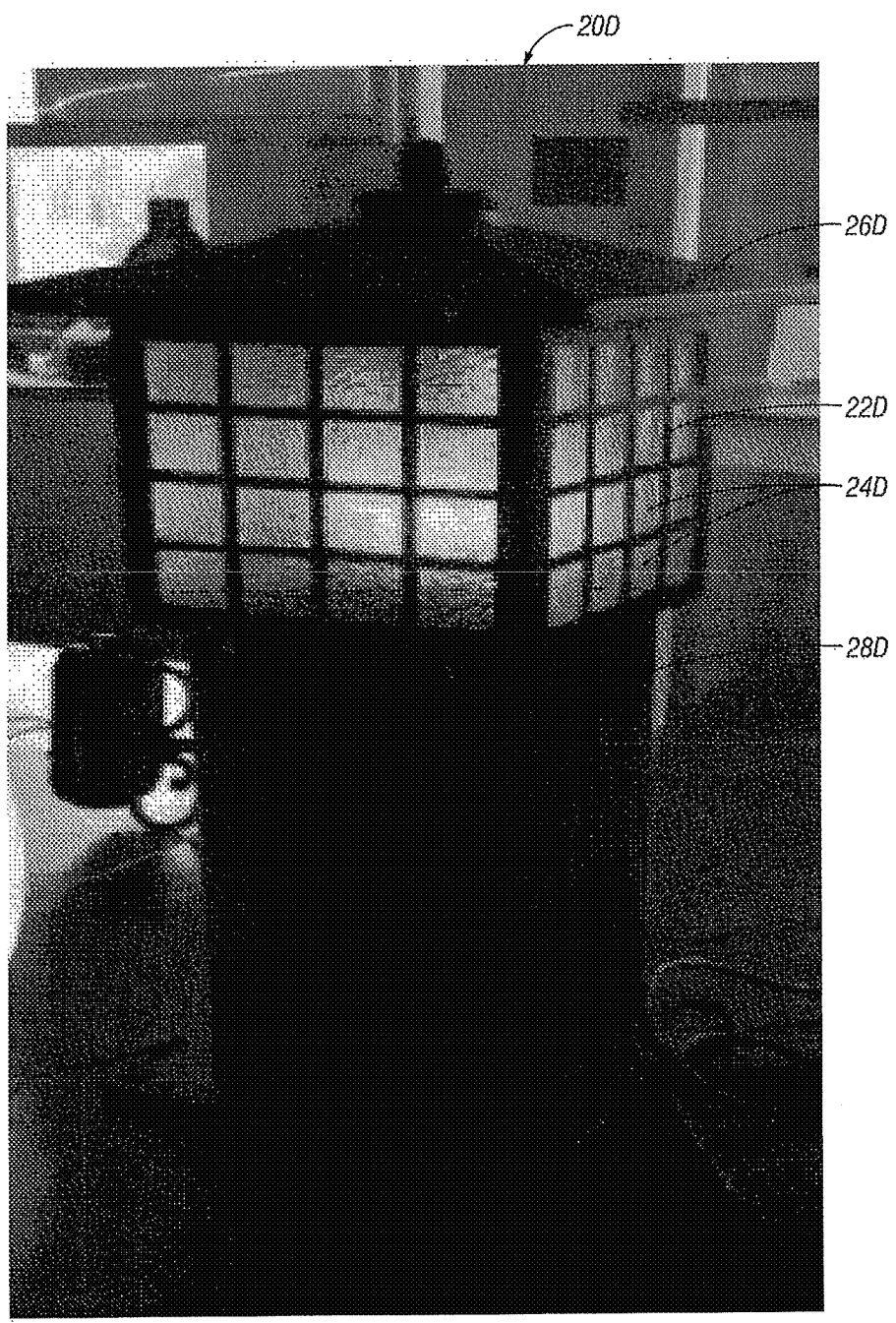
FIG. 3 is a perspective view of a fixture similar to FIG. 2A illustrating the illumination effect of a light engine such as FIG. 1A inside it.

FIG. 3 shows a similar fixture 20 to that of FIG. 2A. But this color photograph shows how frosted panes 24 on fixture 20 (essentially an outer translucent shroud), with transparent shroud 12 of light engine 10 inside fixture 20, would present the observer with a fuzzy 3D ball of brightness inside fixture 20, which is similar to an actual 3D flame. By on-off timing of sets of LEDs in the light engine, discussed below, the fuzzy ball of light would also appear to move, shift, expand, contract, and/or jump with licking flames at the top. Again, a subtlety of the design of this embodiment is that the observer intentionally is not allowed to image the light sources. Rather, the intentionally scattering of light from the light sources (by hammered glass panes or shroud 24) helps create a perception in the observer consistent with an actual burning flame.

Figure 13A:
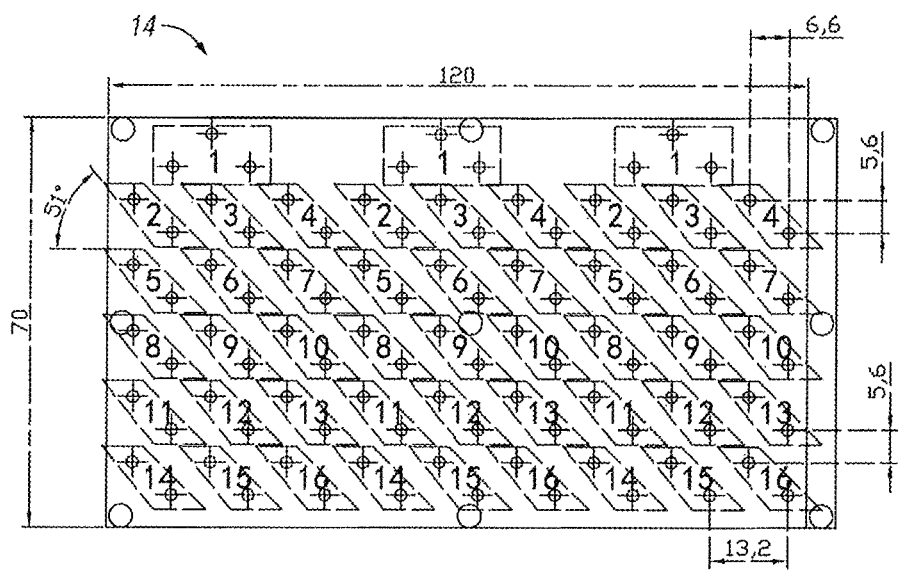
FIG. 13A is a diagrammatic illustration of one example of an LED array layout (in plan view) for a flexible printed circuit such as FIG. 11 for purposes of describing lighting sequence of the LEDs to simulate a flame effect using LEDs oft tricolor ratios and chromaticity selections illustrated in FIG. 12.
Figure 13B:
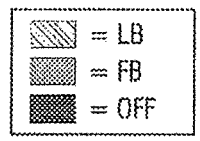
FIG. 13B is a timing diagram matched to the LED array of FIG. 13A. As indicated it illustrates both level of driving of the LED (full on or partially full on or off) as well as which of the LEDs at the numbered positions in FIG. 13A are on at what time and in what sequence.
Figure 13C:
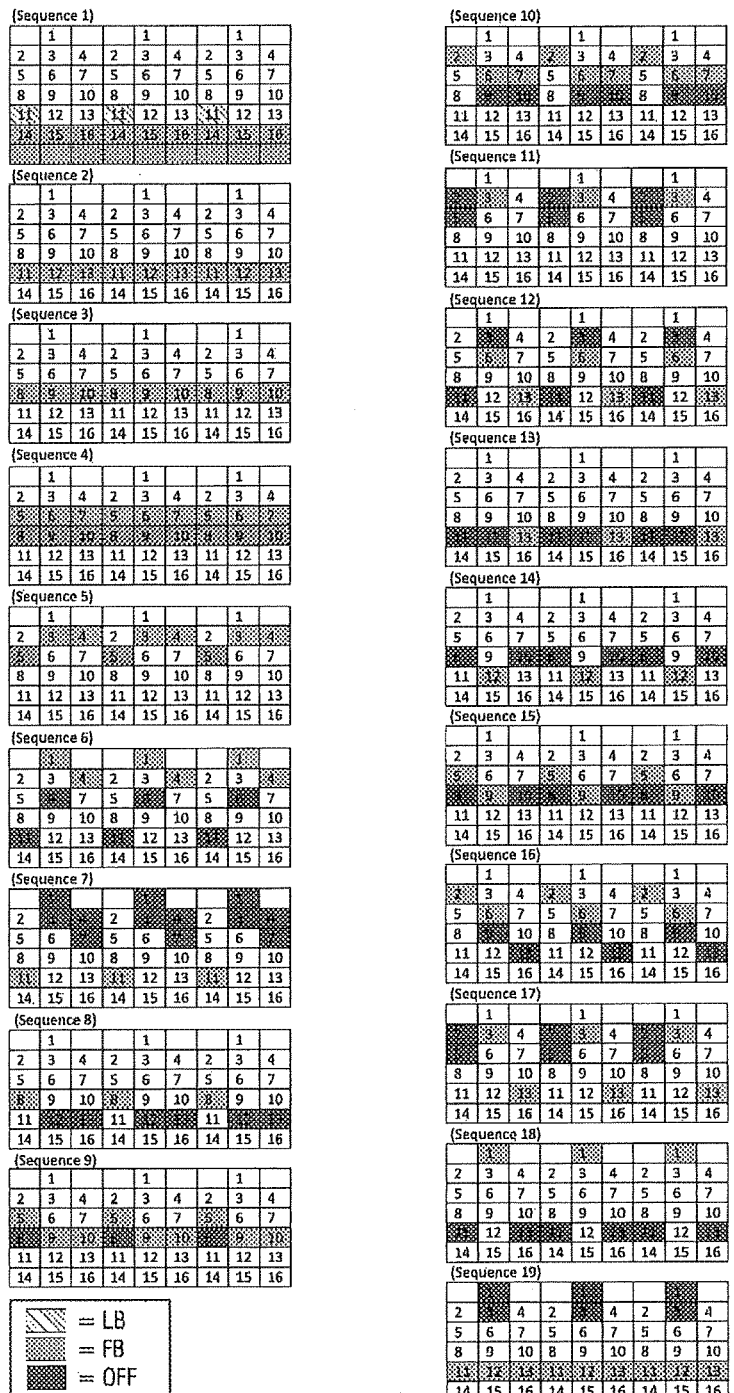
FIG. 13C is diagrammatic representations of the LED layout of FIG. 13A at each sequence time 1-19 from FIG. 13B, showing at each moment in time which LEDs would be on or off and at what intensity.
Figure 22A:
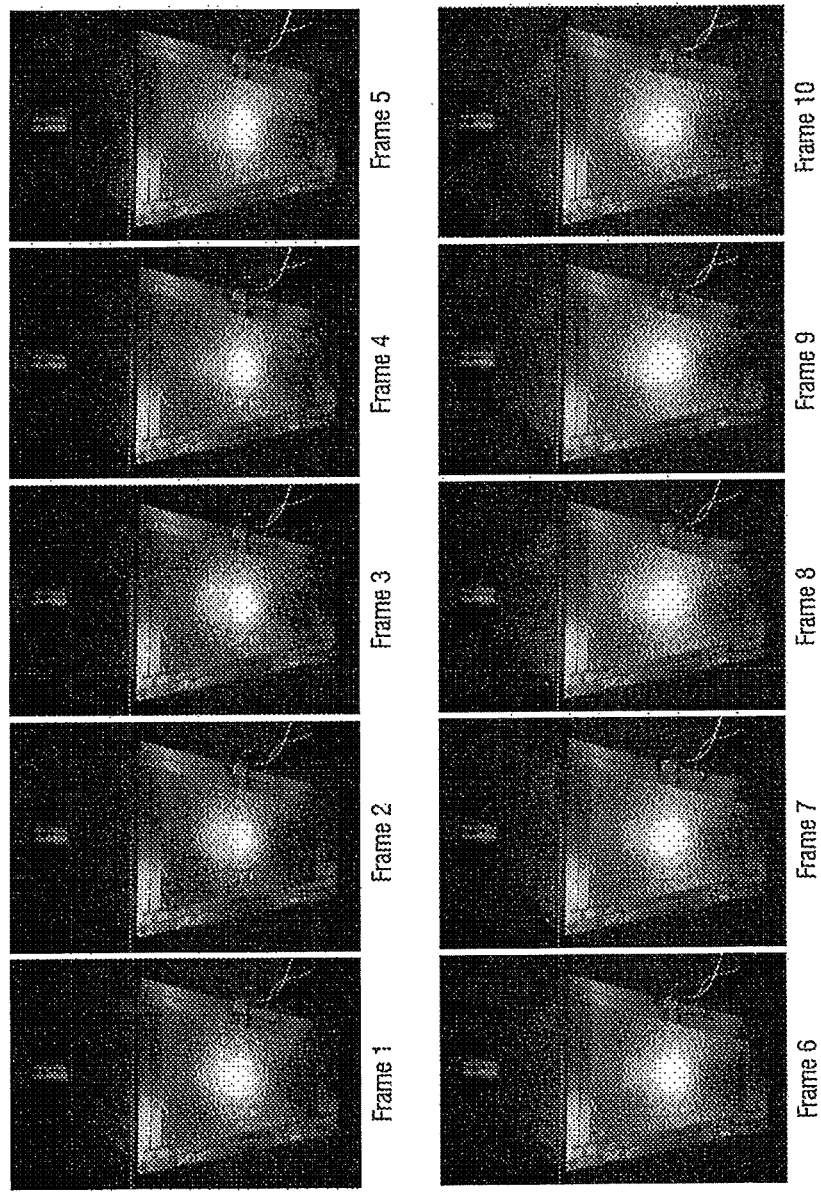
FIGS. 22A-DD are still frame stop action photographs from a continuous video of operation of one exemplary embodiment of a fixture similar to that of FIG. 3 with a light engine similar to FIGS. 1A-D installed and operating under the timing pattern at least similar to FIGS. 13 A-C.
Figure 22B:
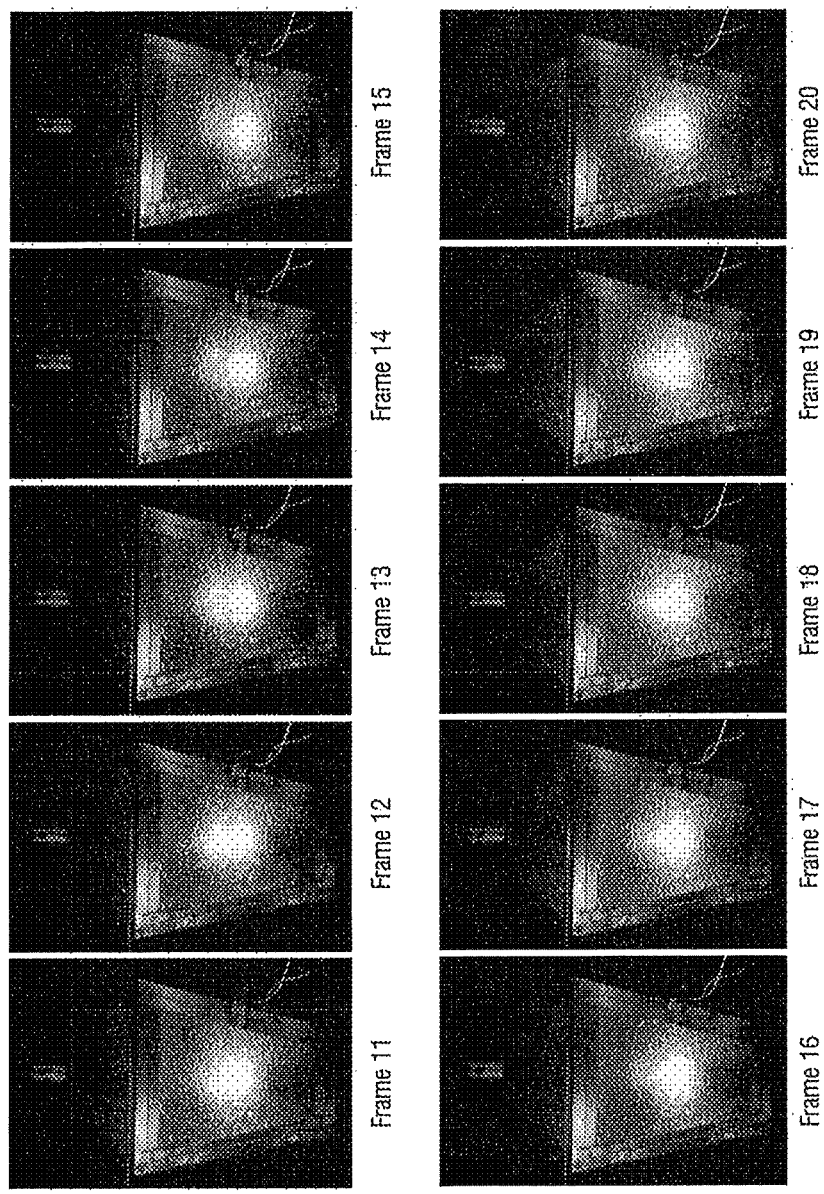
Figure 22C:
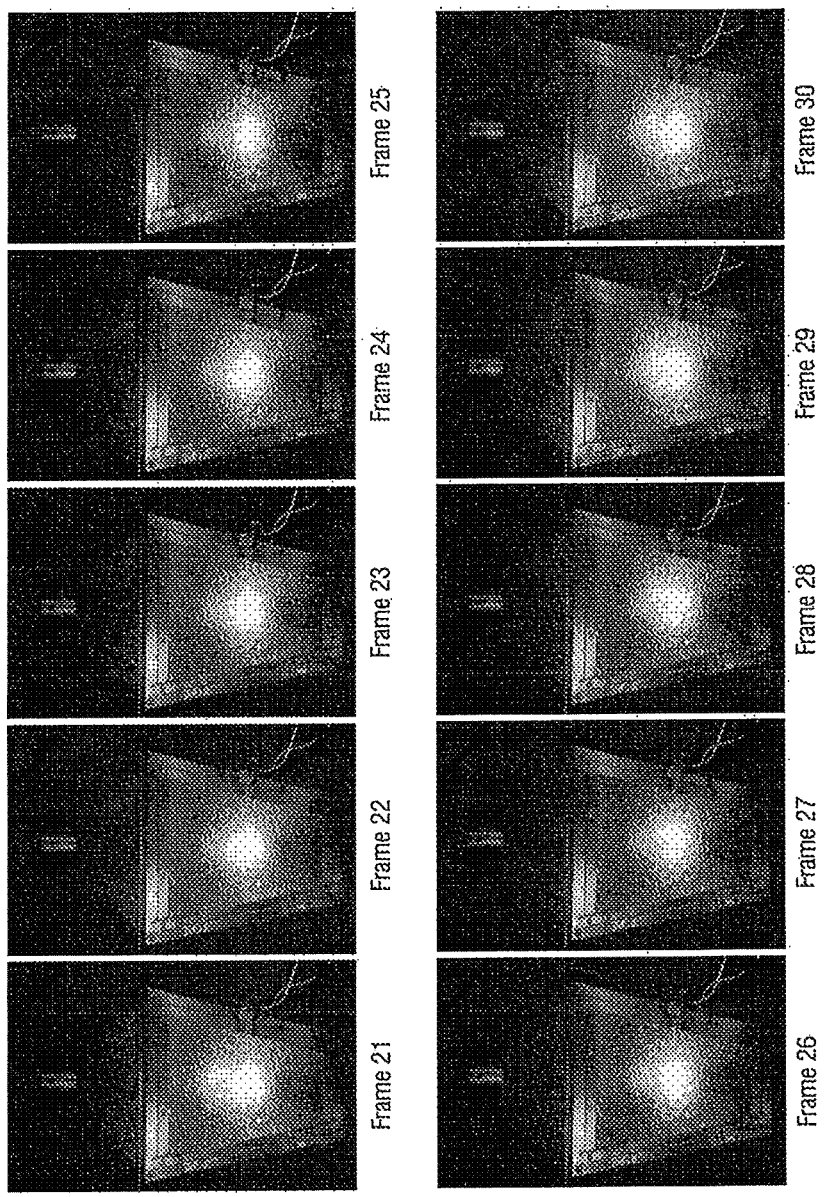
Figure 22E:
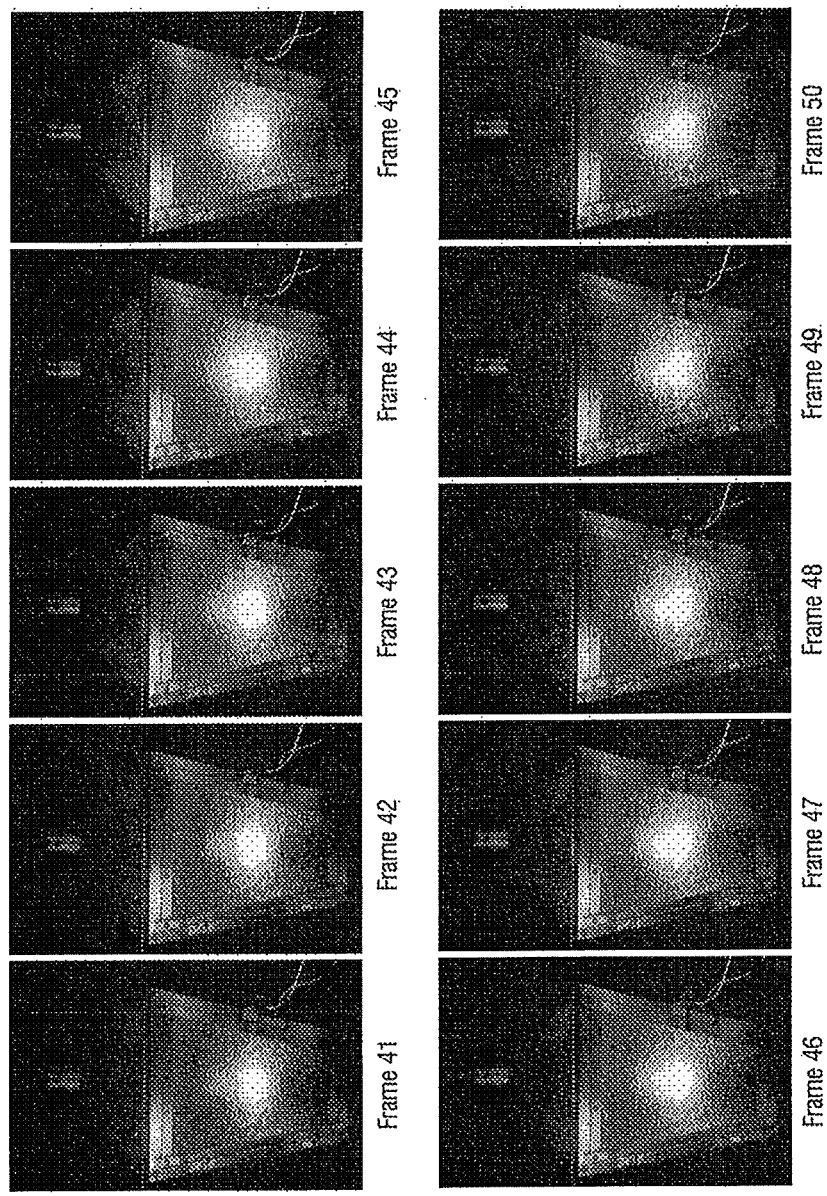
Figure 22F:
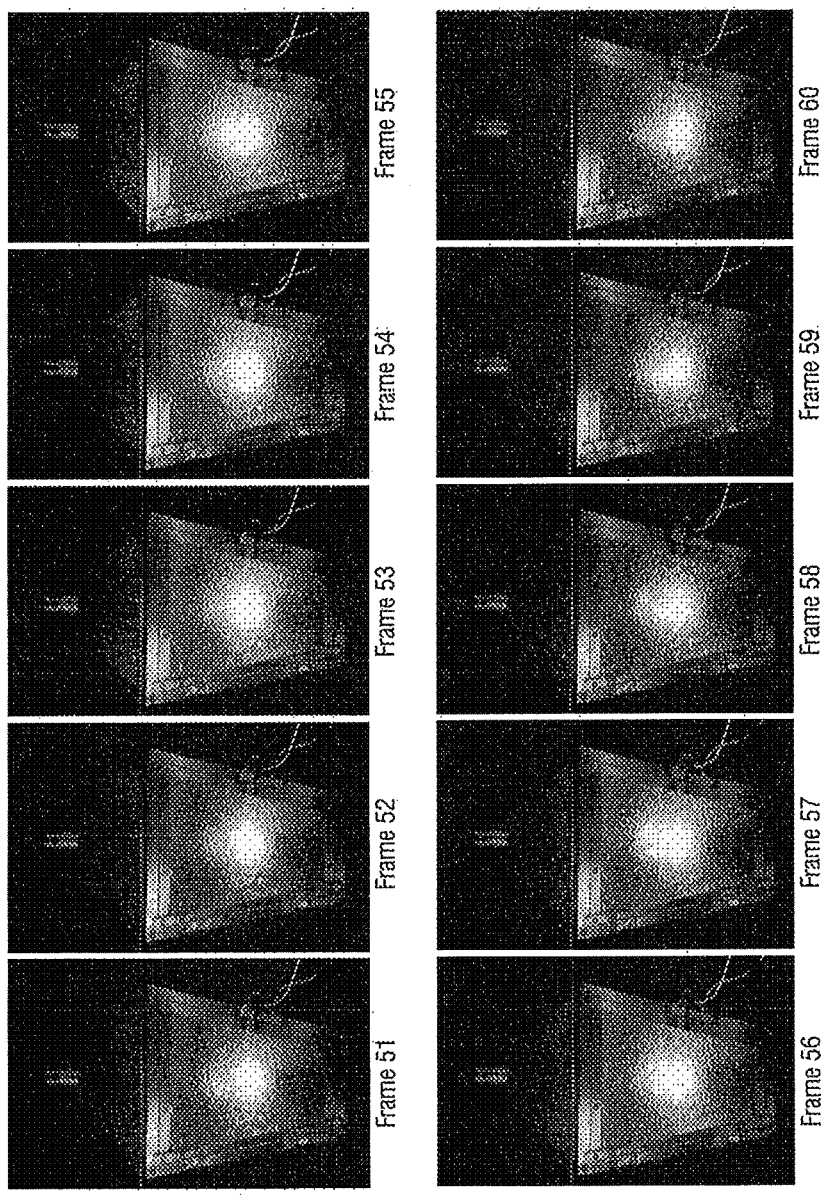
Figure 22G:
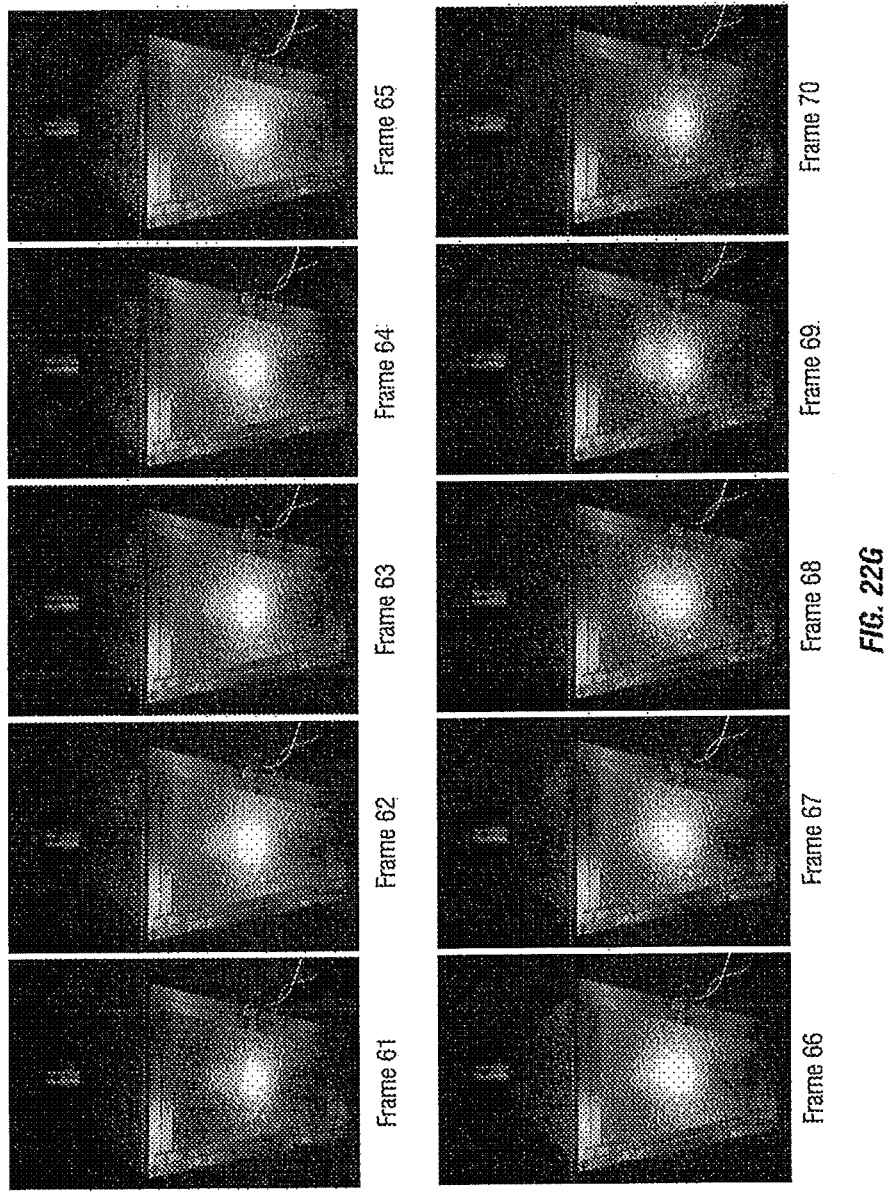
Figure 22H:
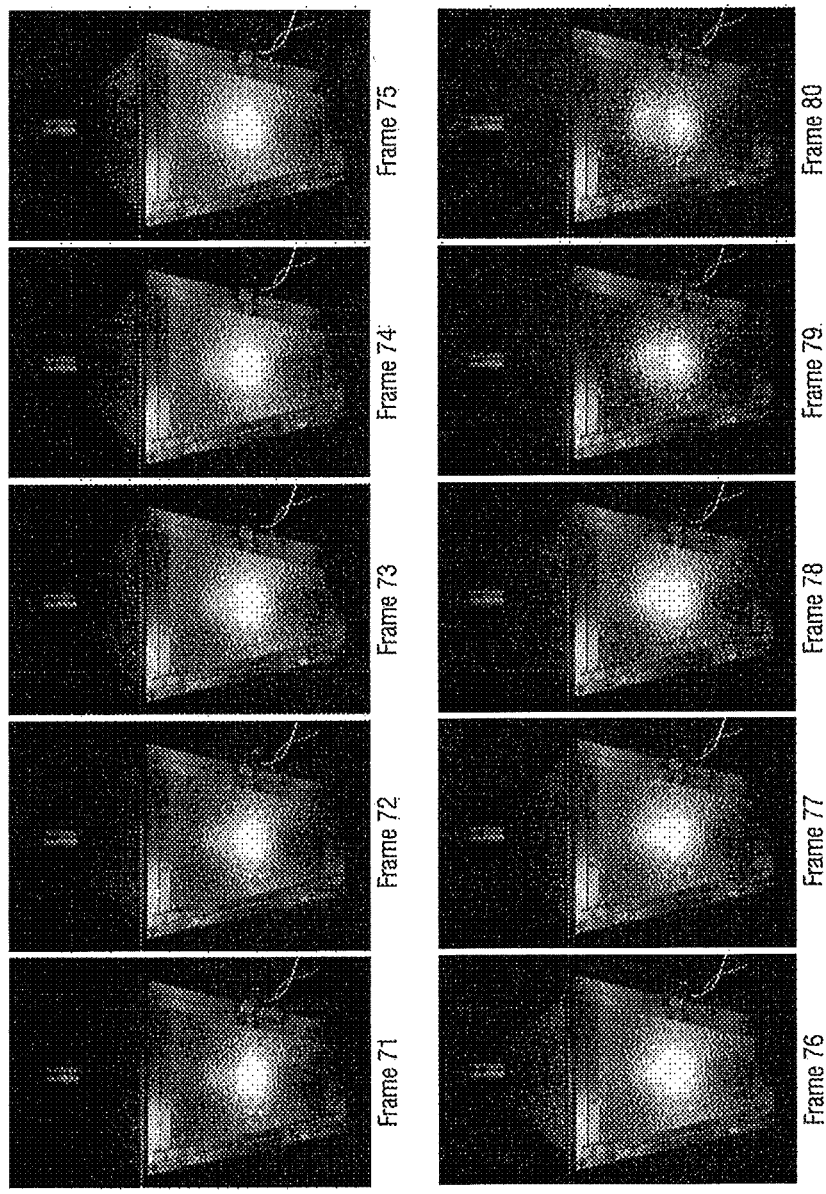
Figure 22I:
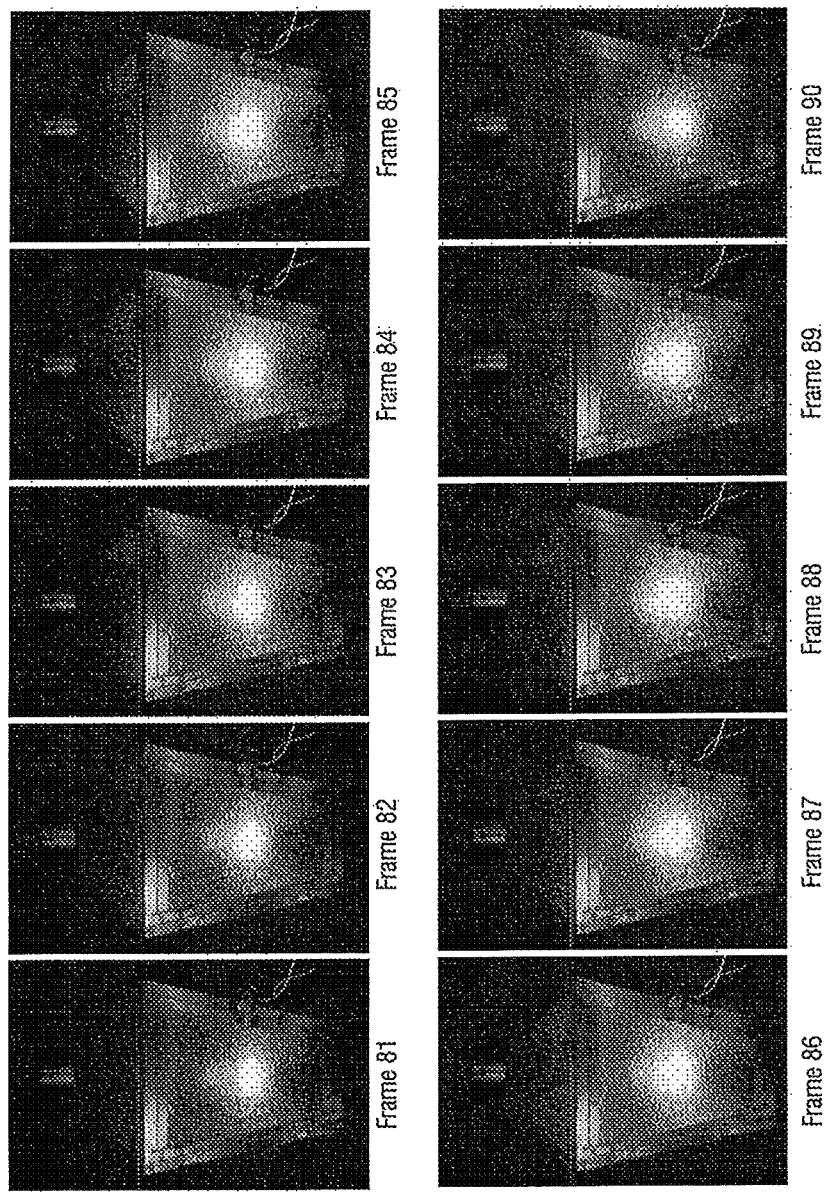
Figure 22J:
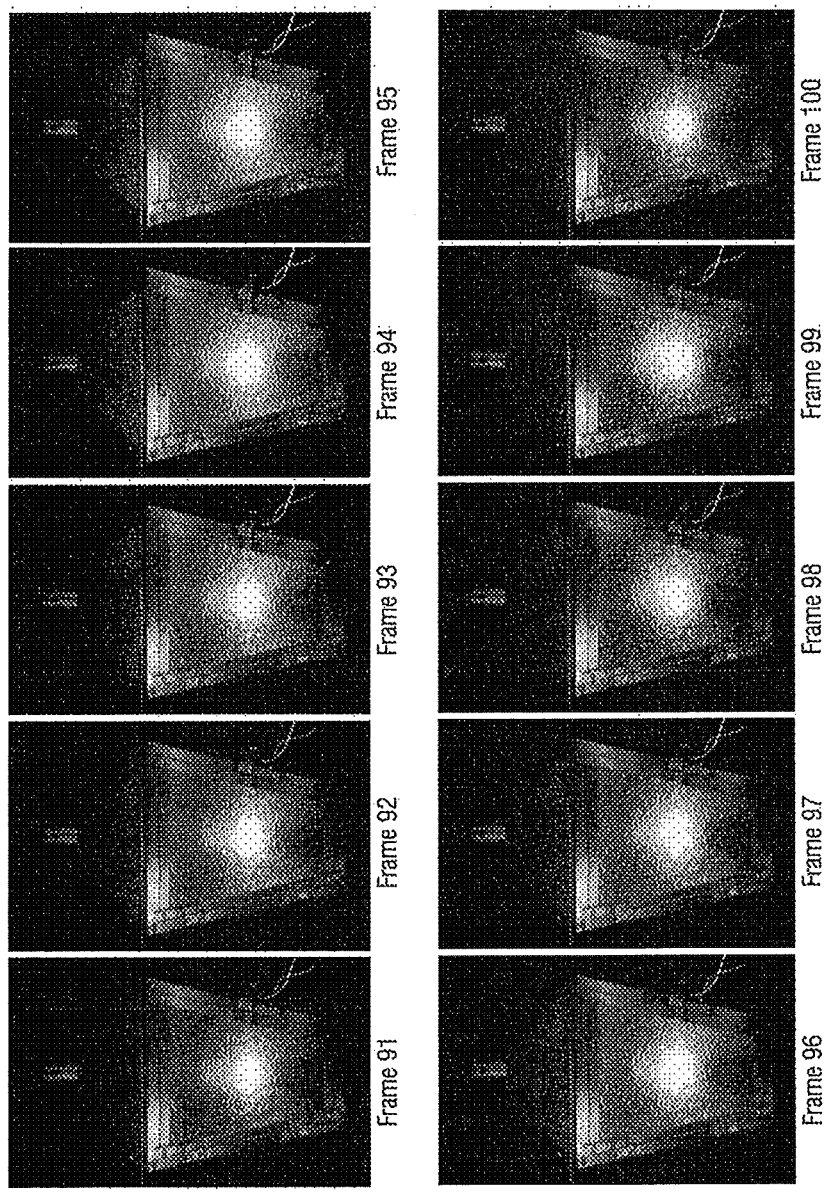
Figure 22K:
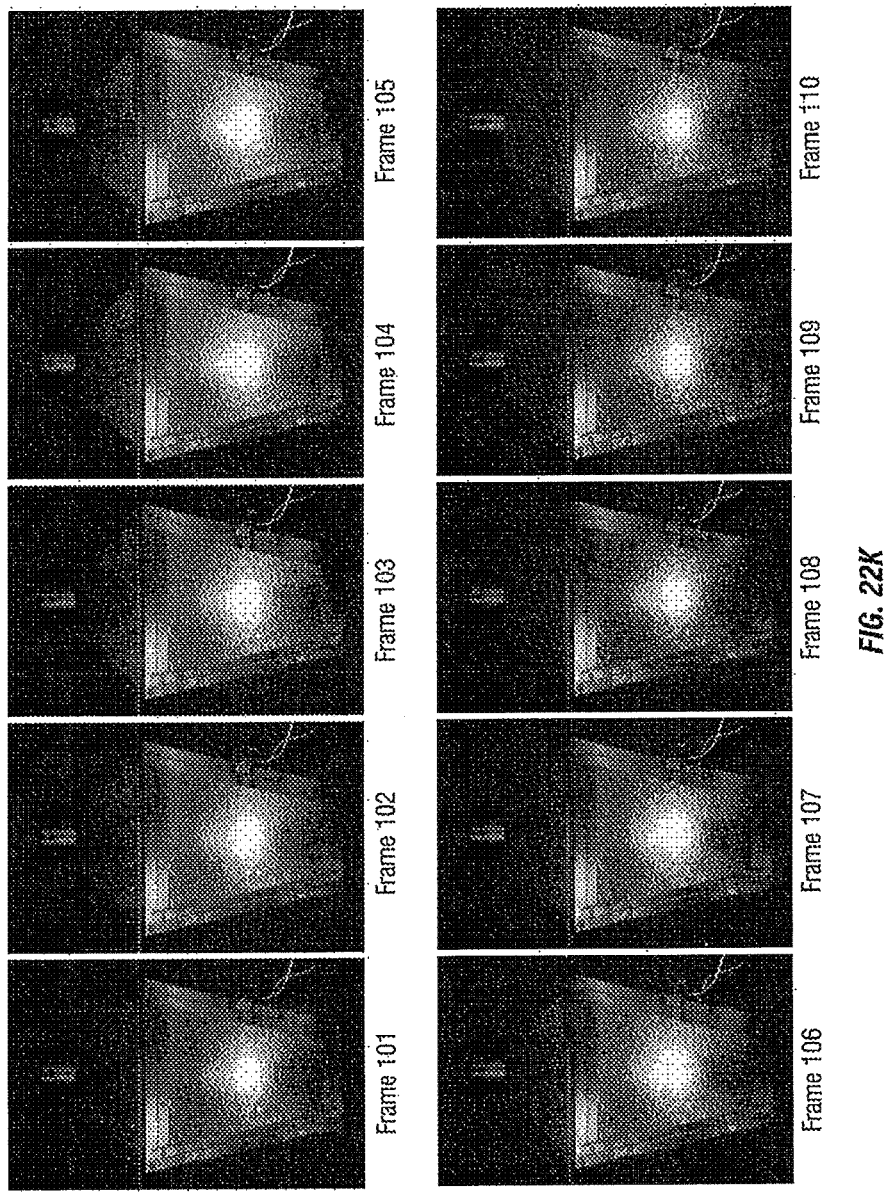
Figure 22L:
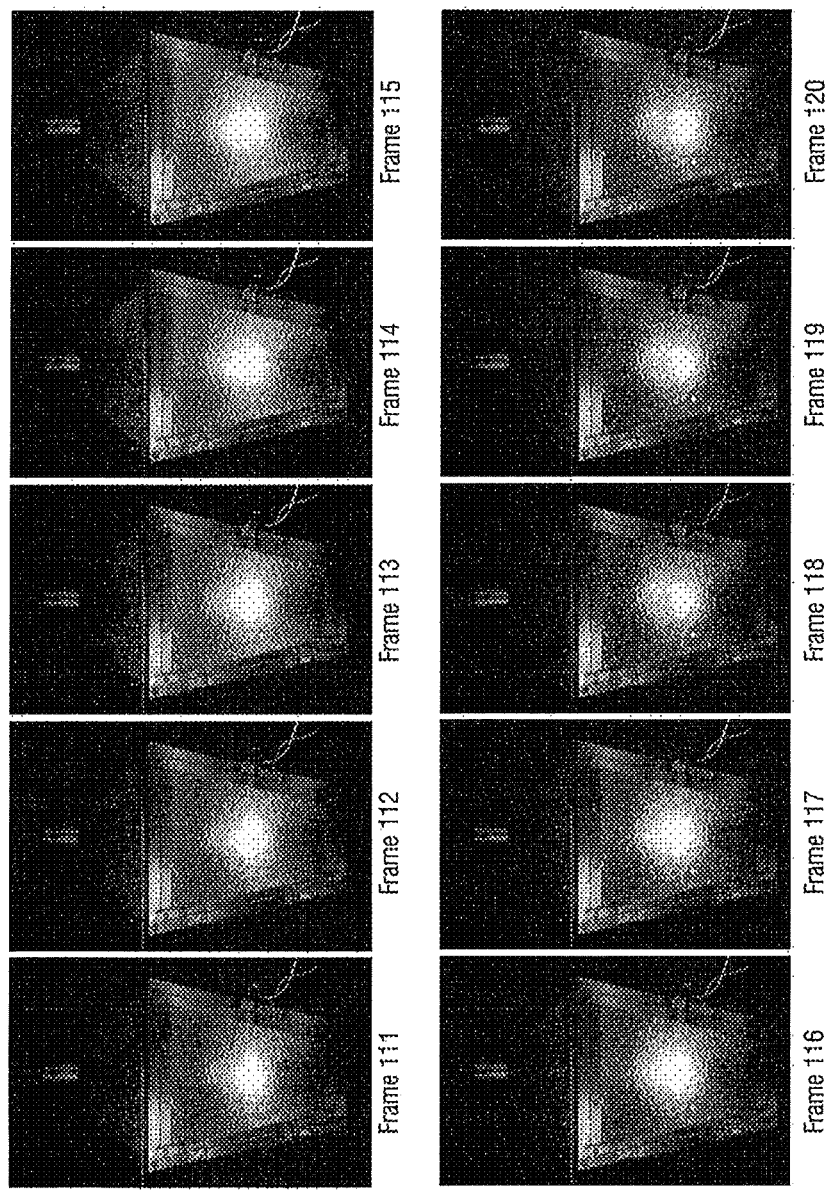
Figure 22M:
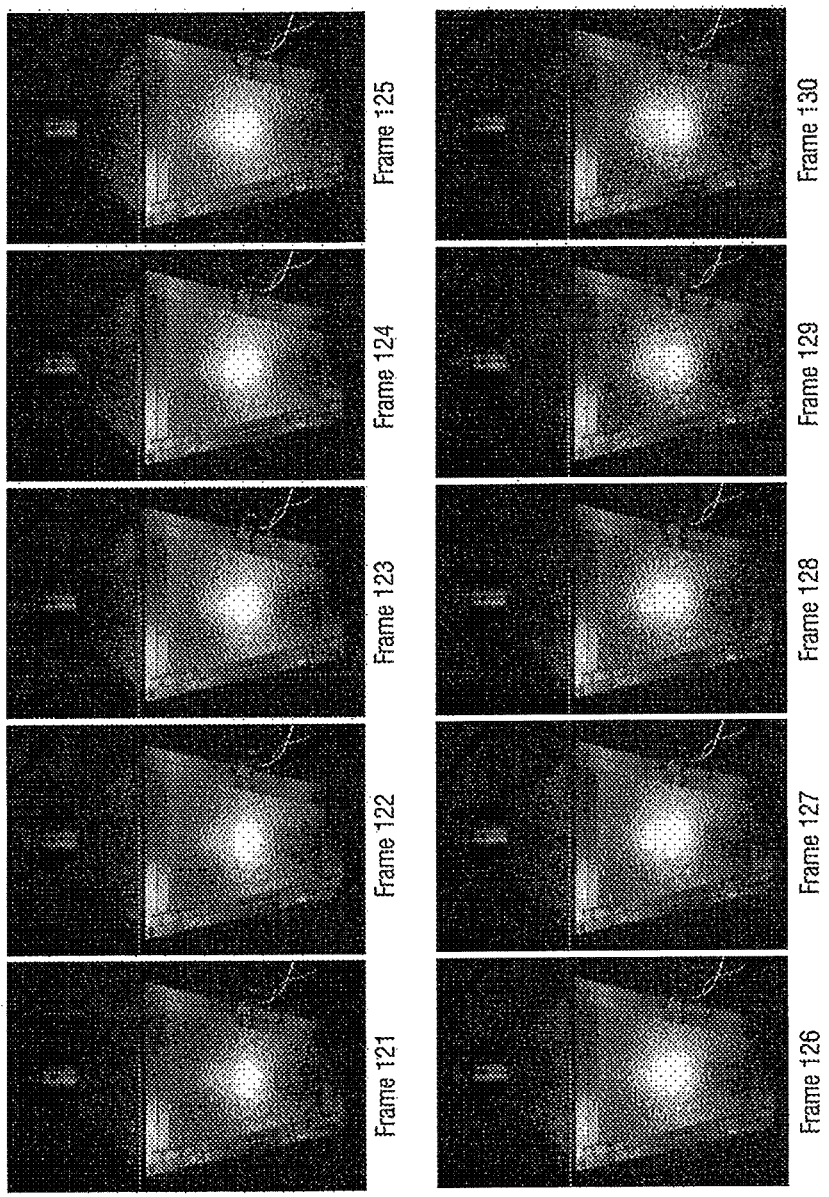
Figure 22N:
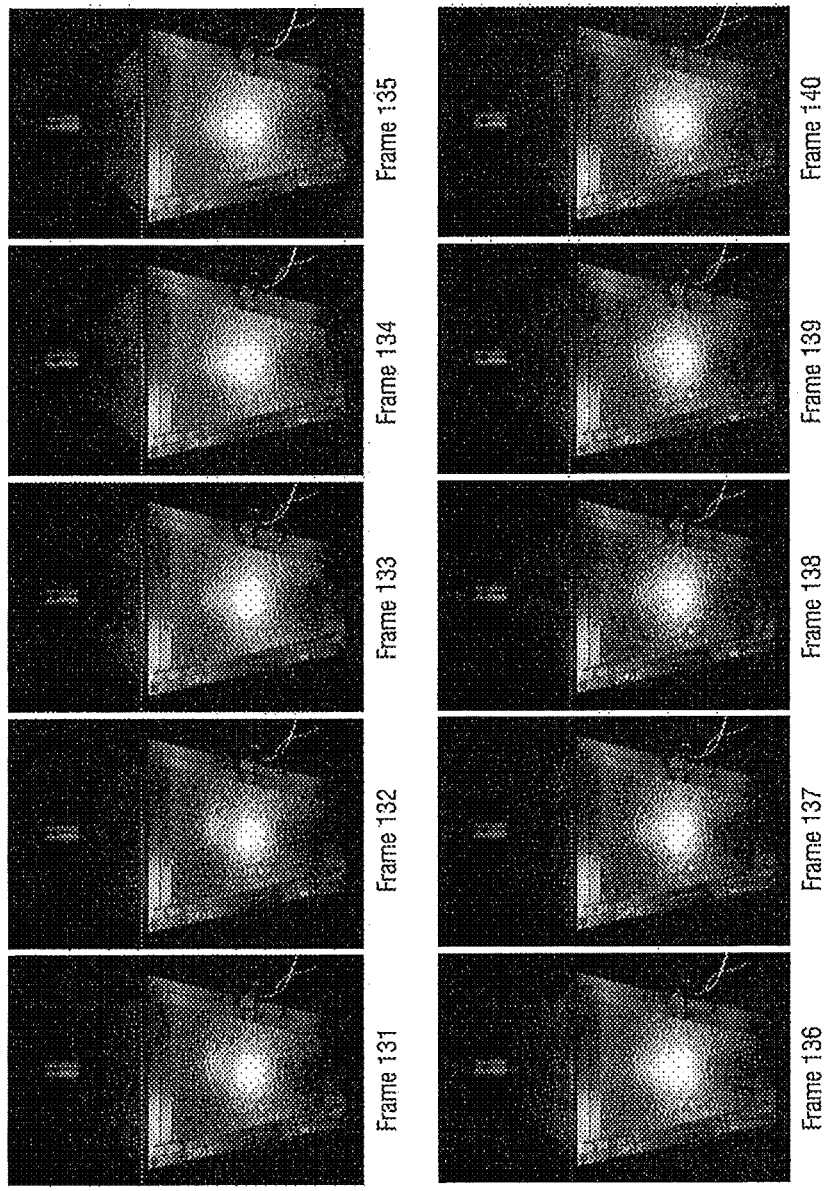
Figure 220:
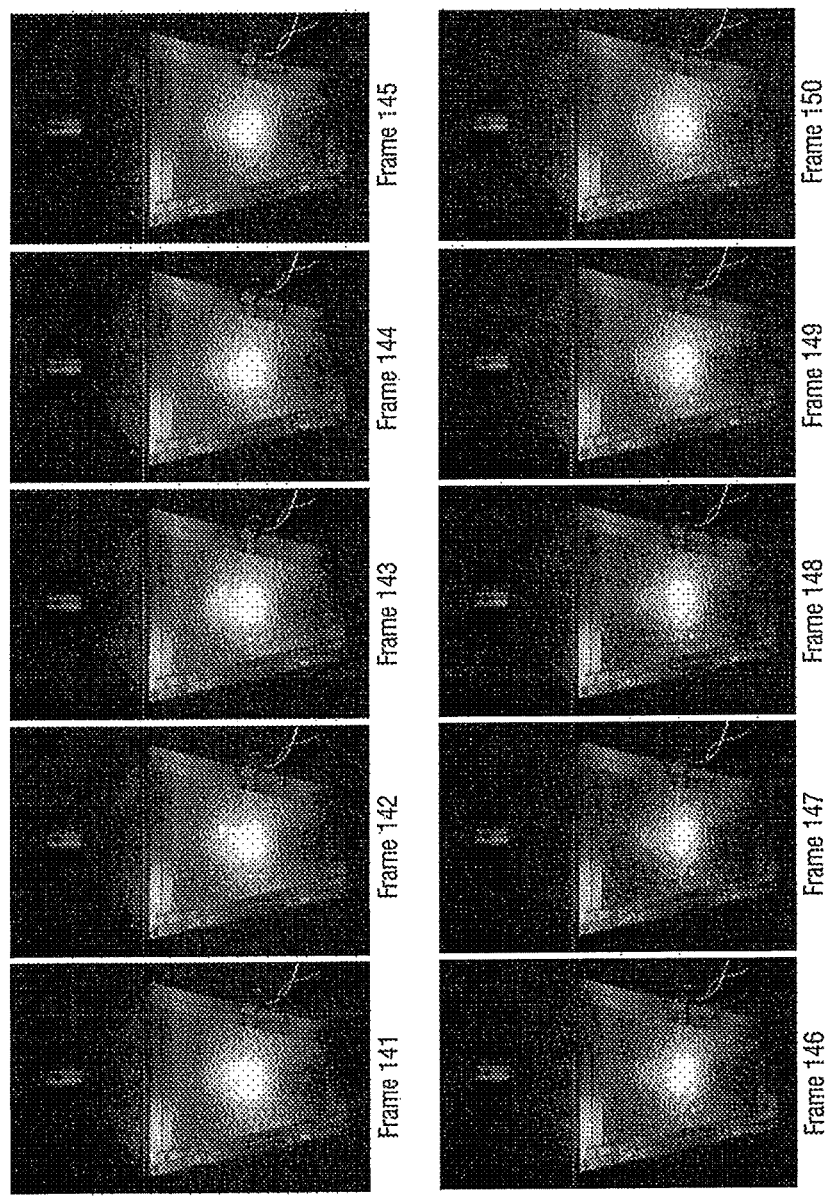
Figure 22P:
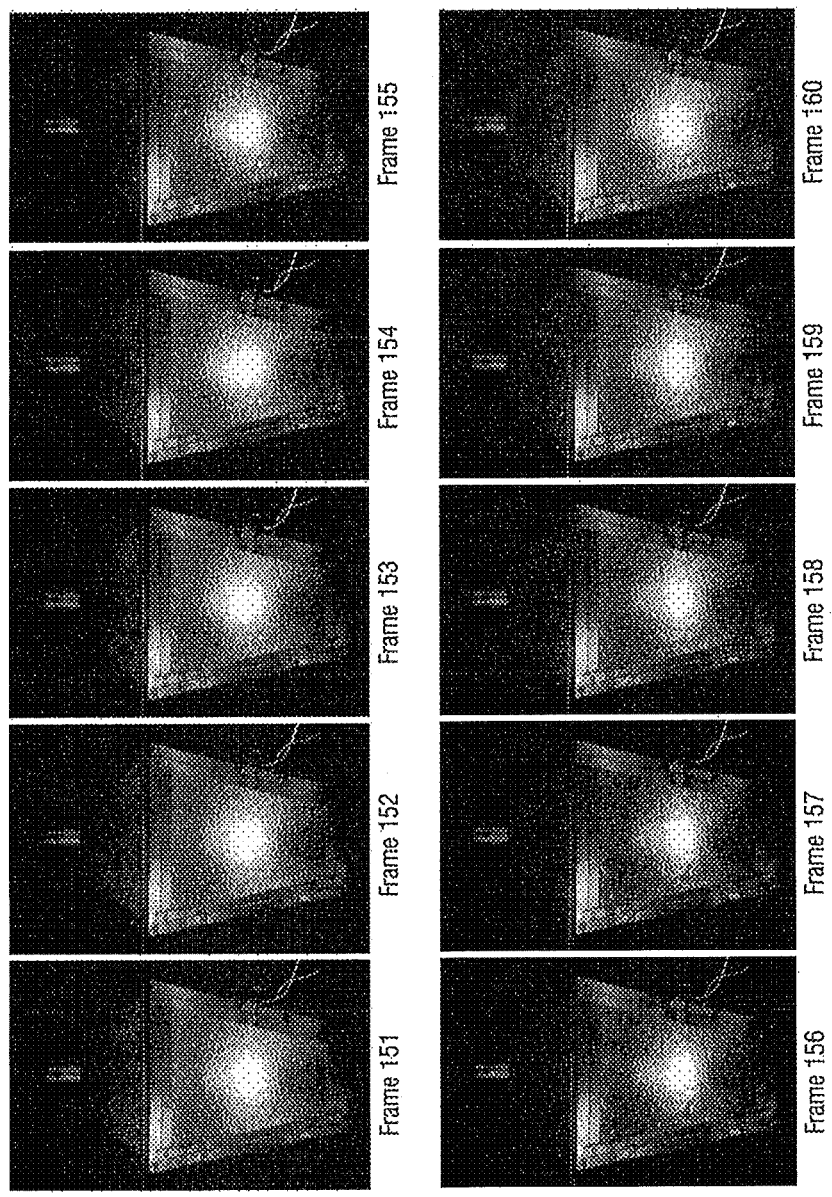
Figure 22Q:
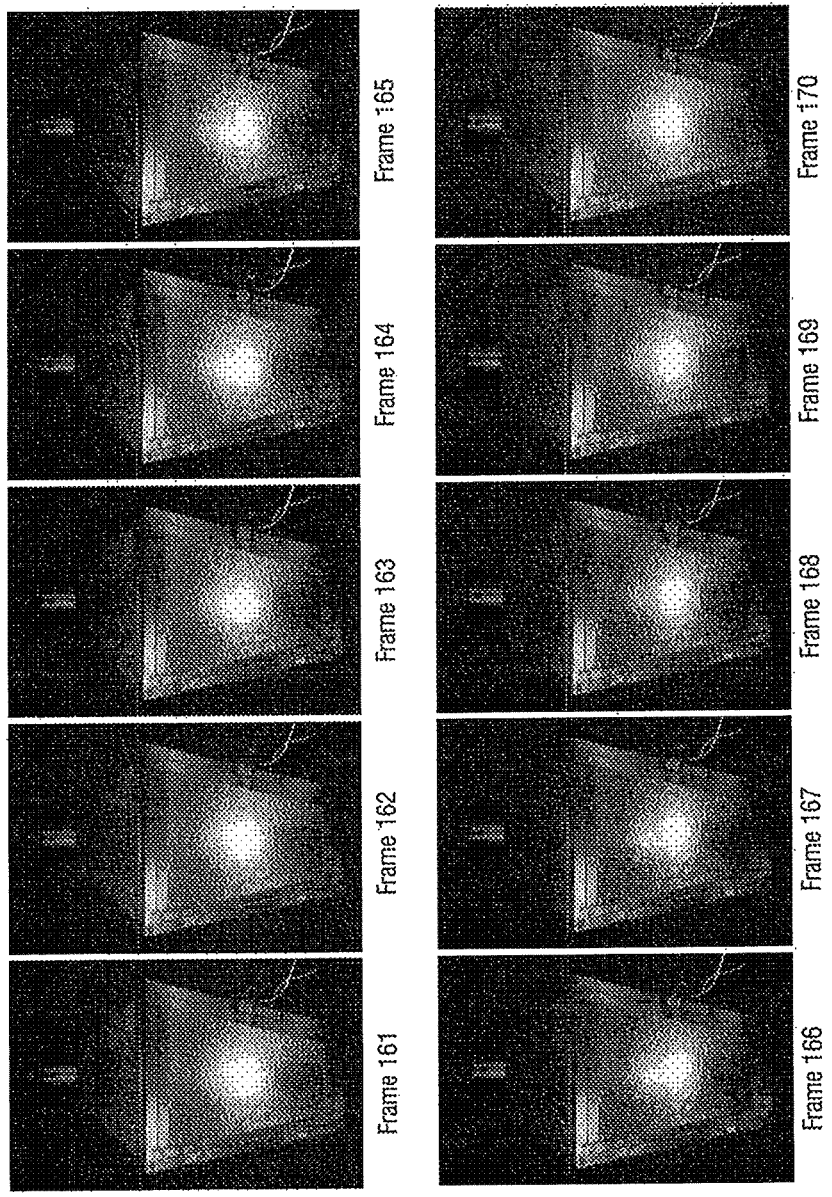
Figure 22R:
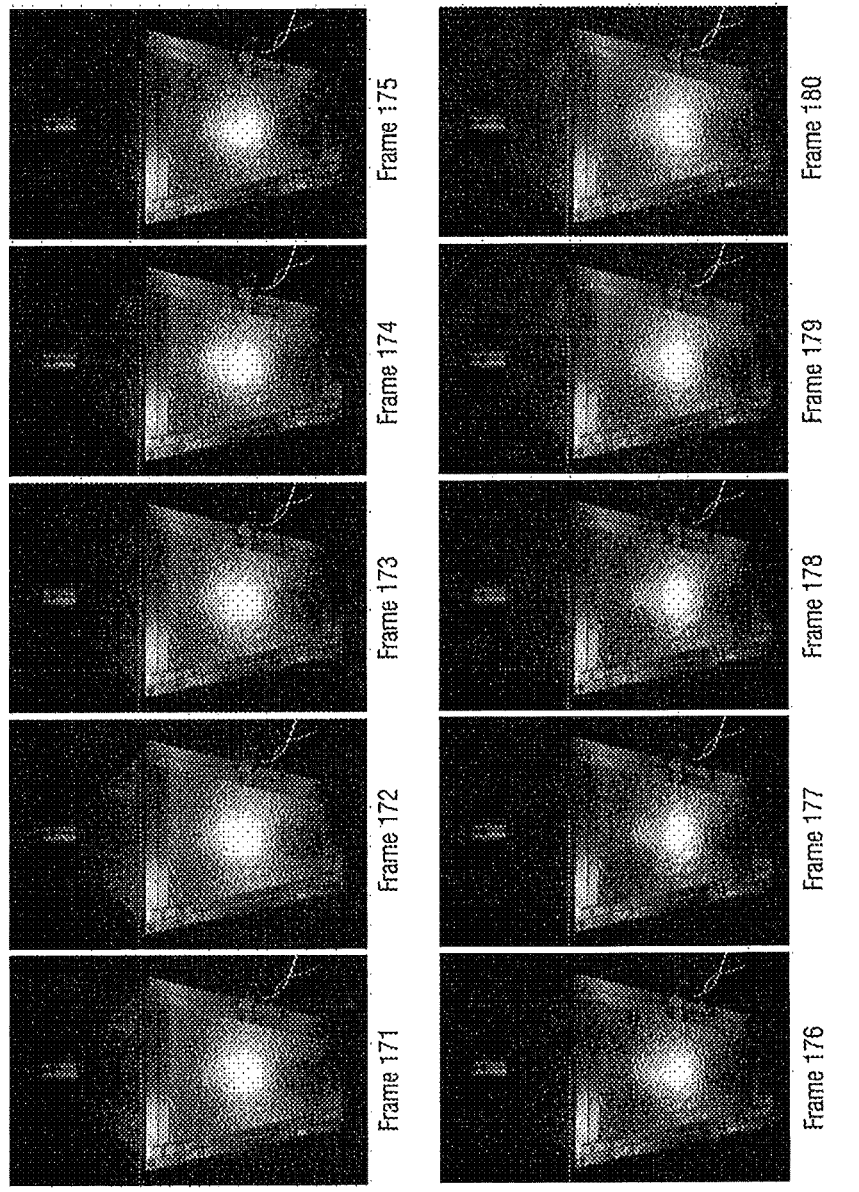
Figure 22S:
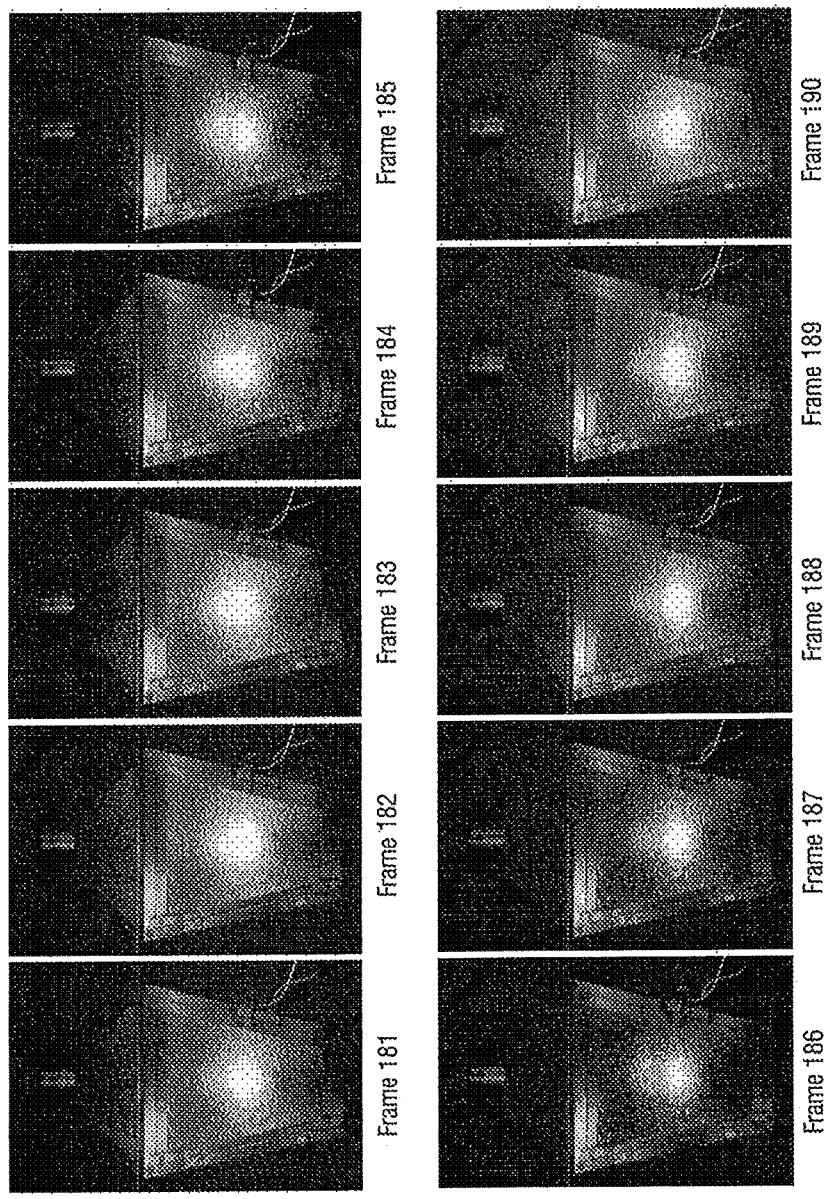
Figure 22T:
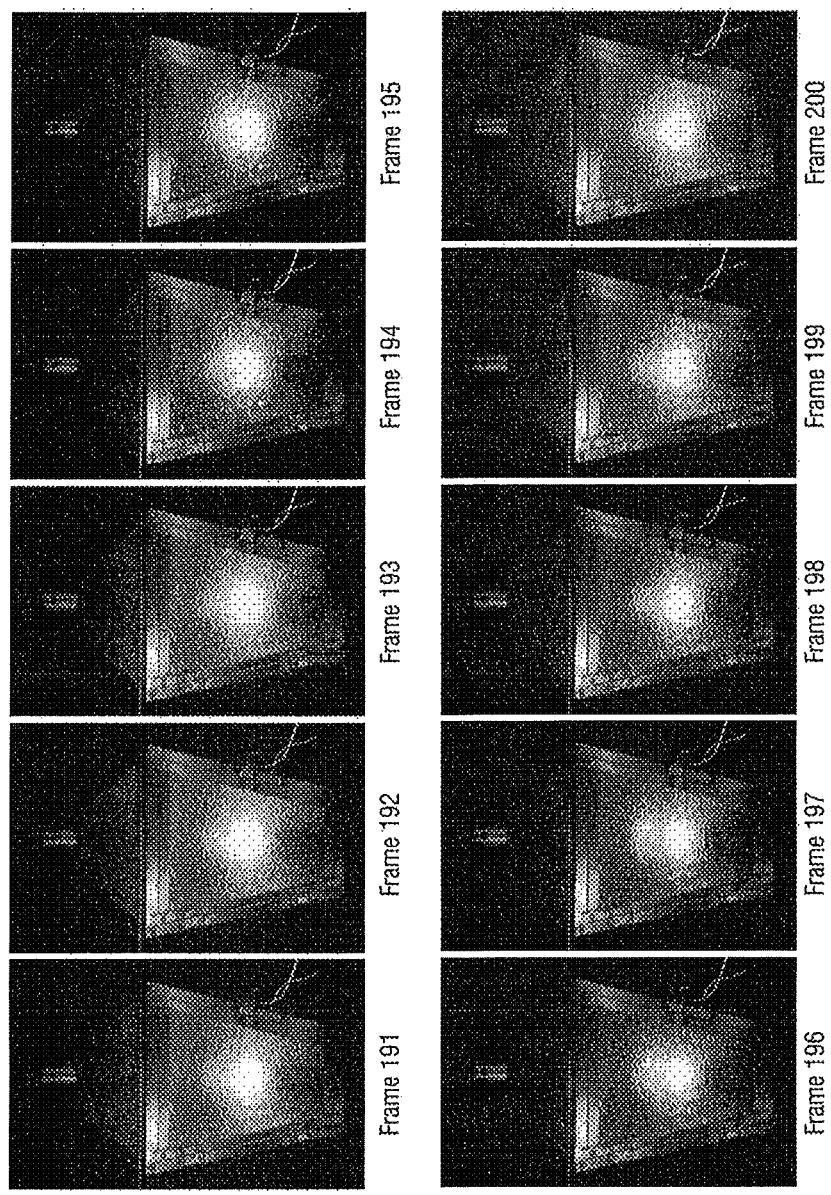
Figure 22U:
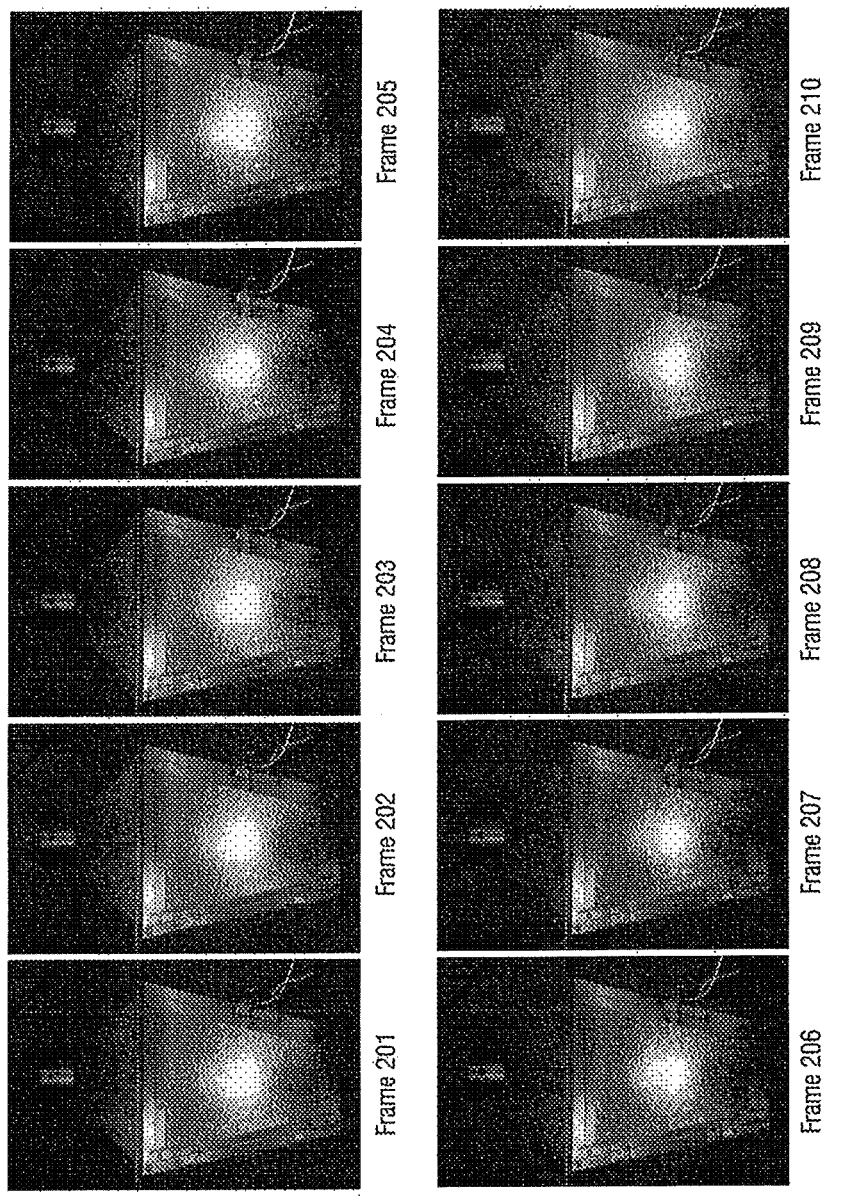
Figure 22V:
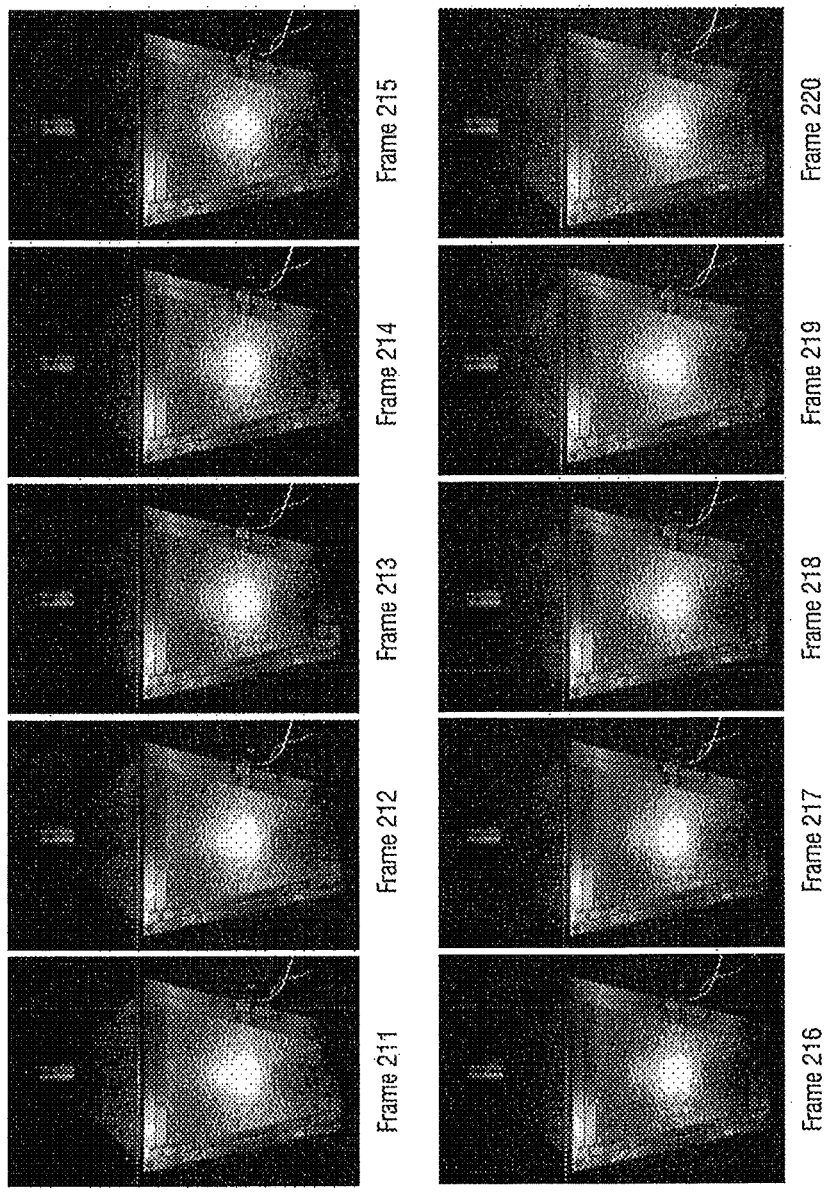
Figure 22W:
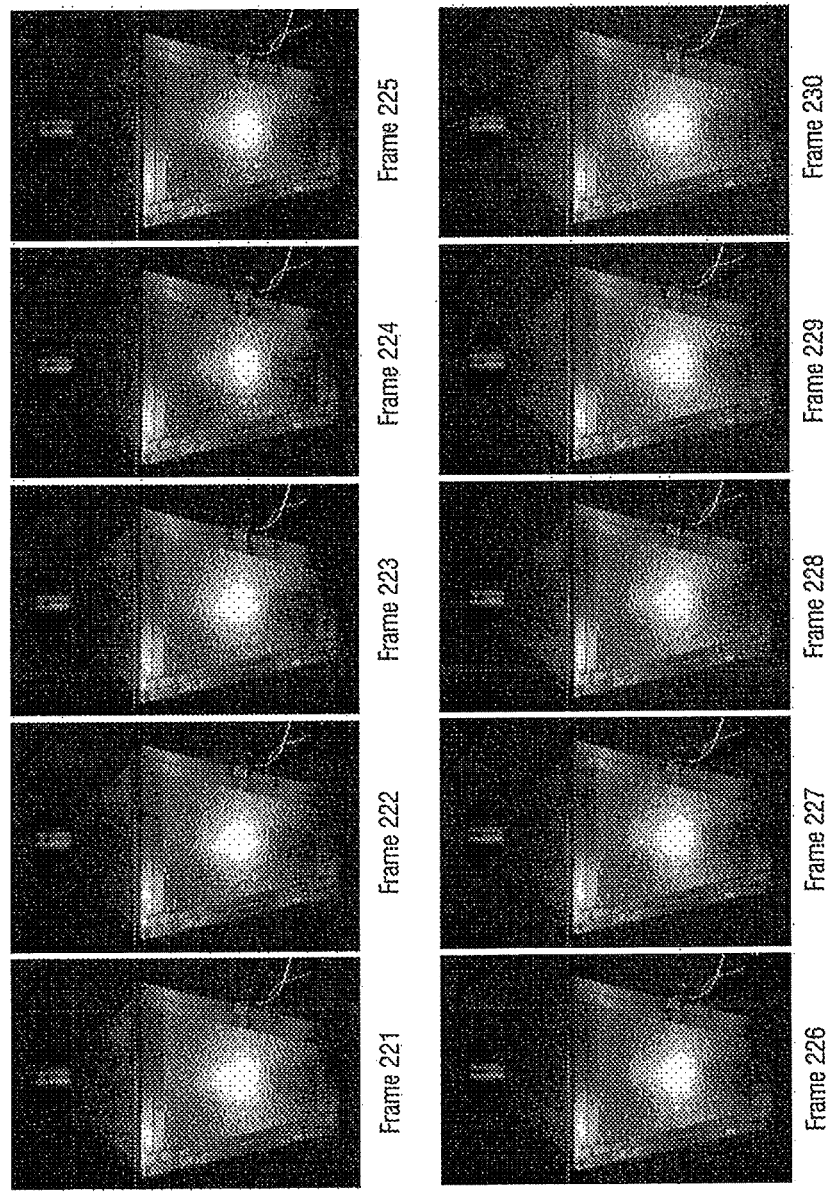
Figure 22X:
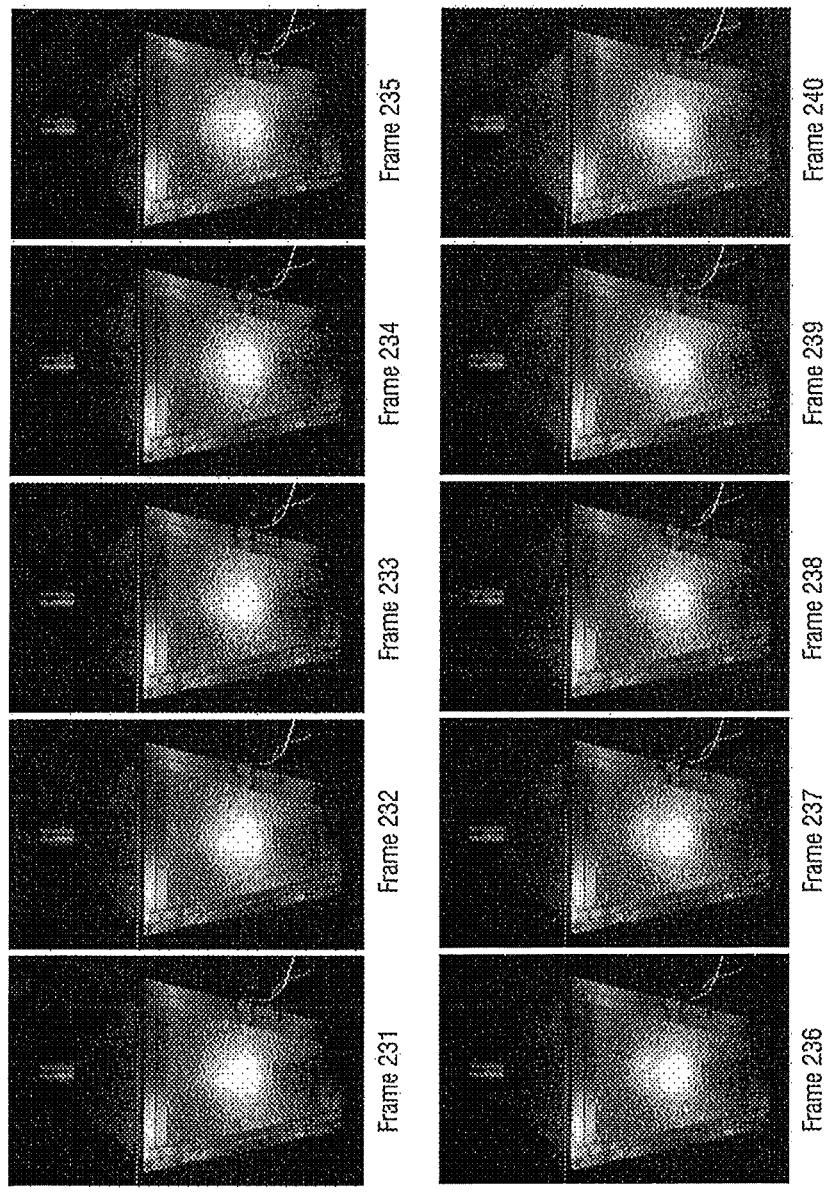
Figure 22Y:
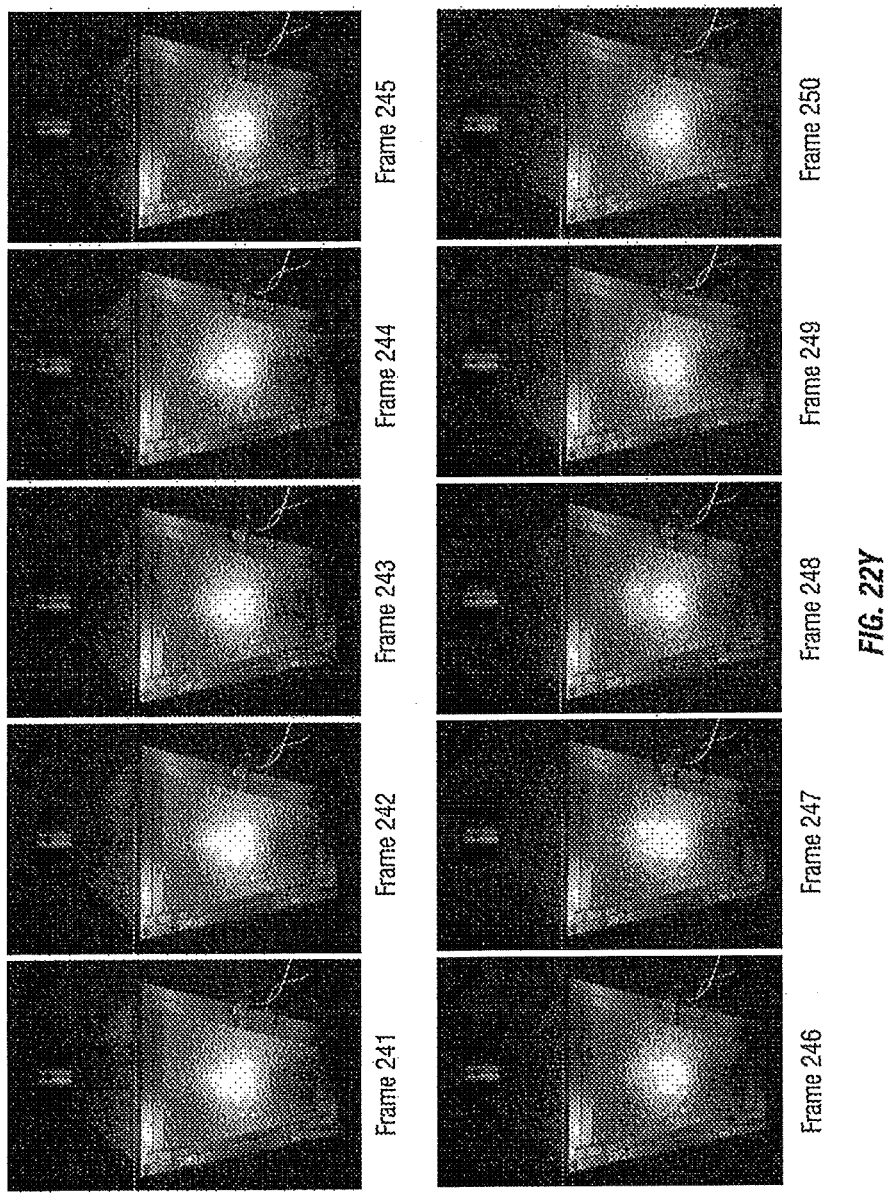
Figure 22Z:
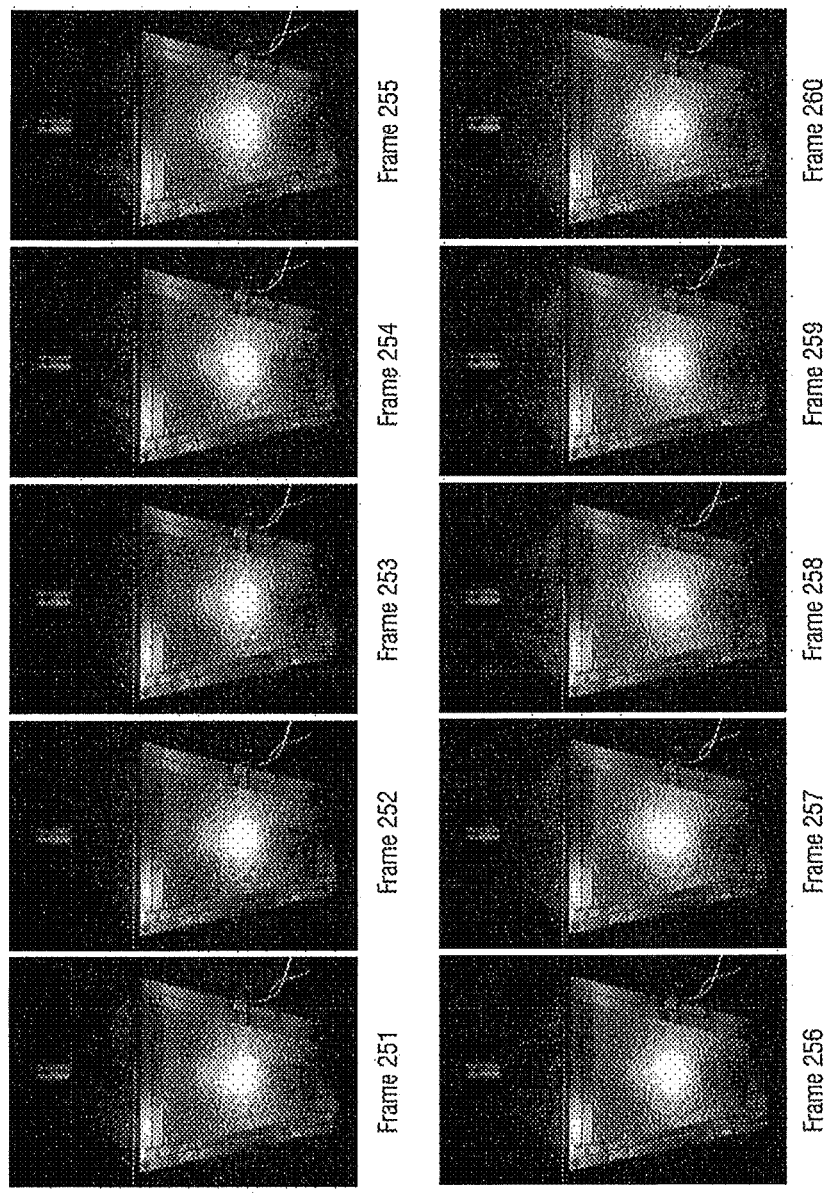
Figure 22A:
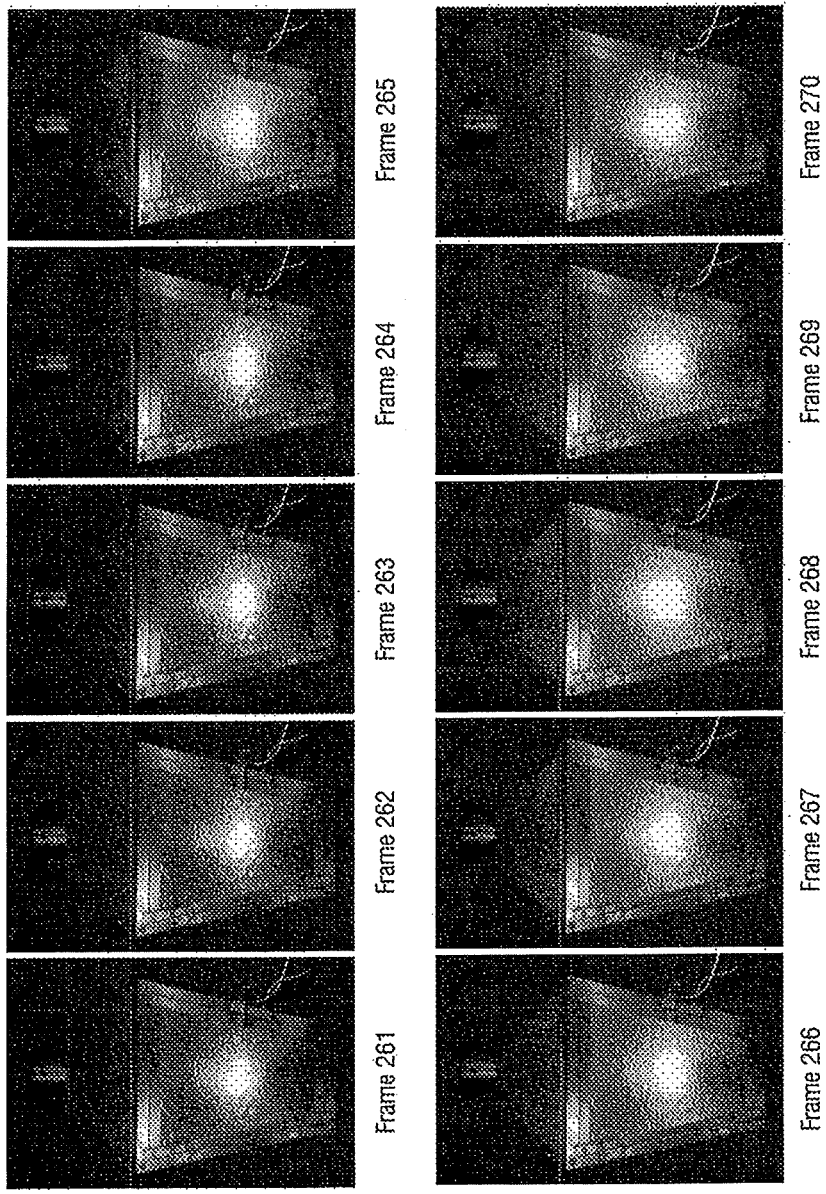
Figure 22B:
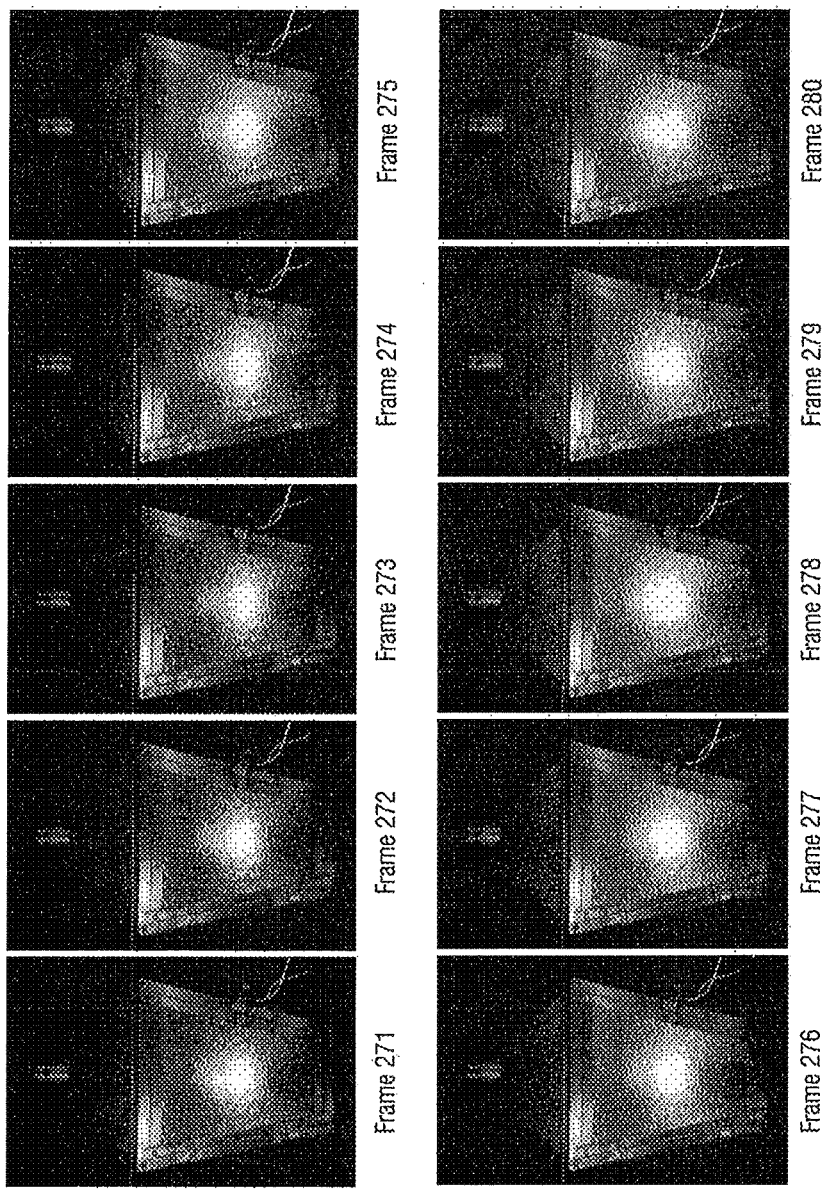
Figure 22C:
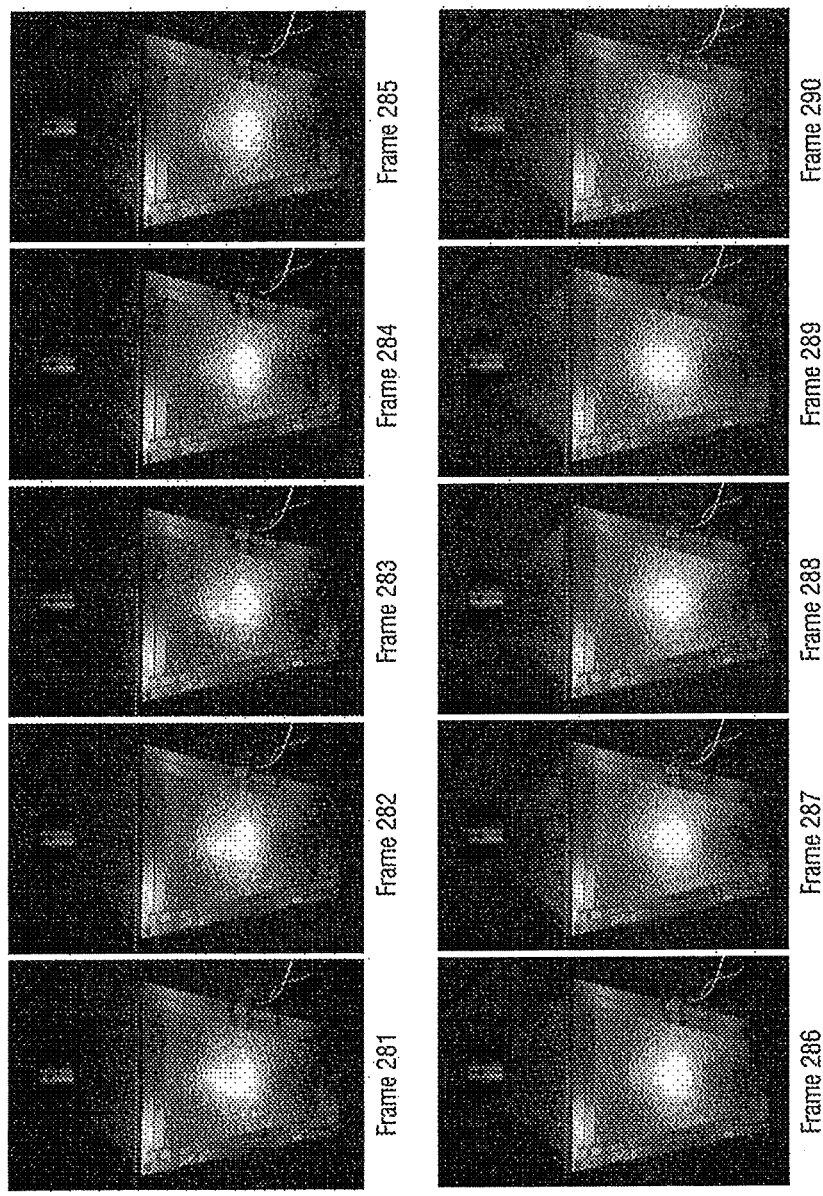
Figure 22D:
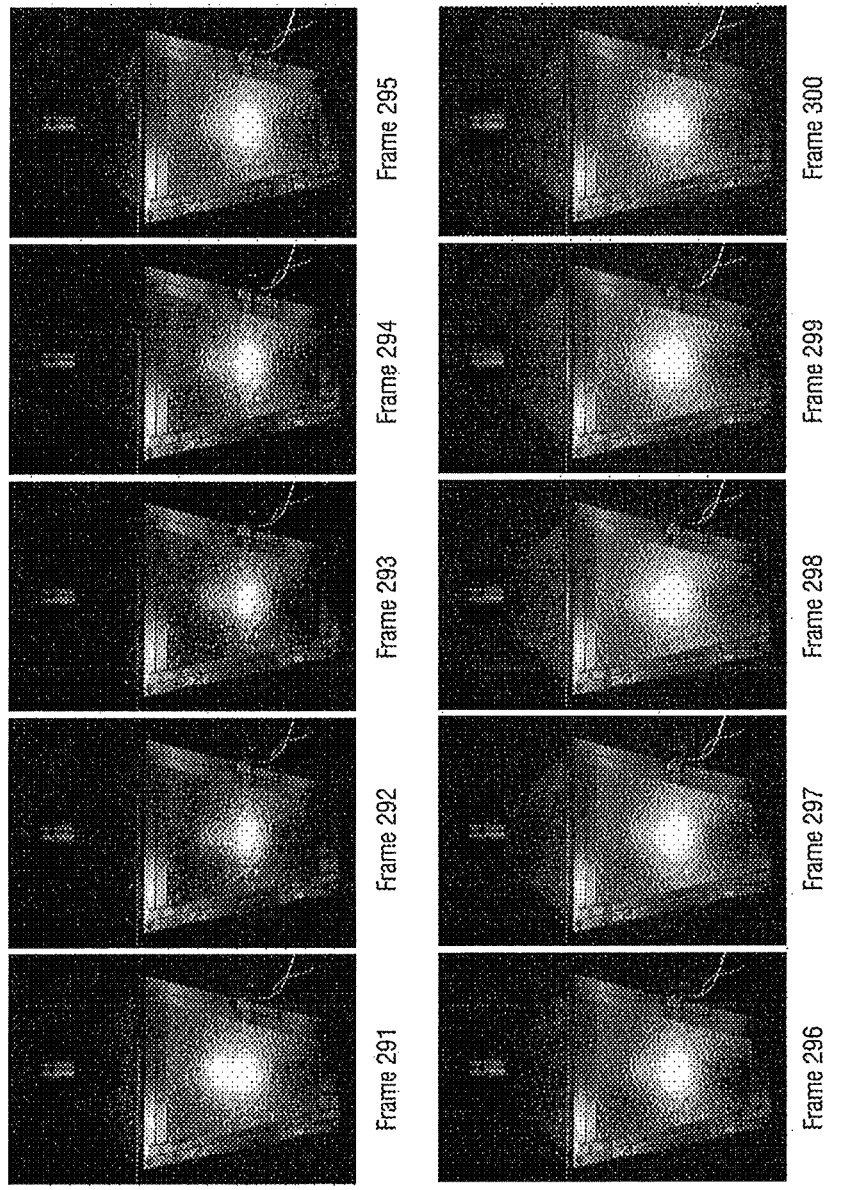

One aspect of certain embodiments disclosed herein is simulation of a flame. To help in understanding of one form in which this is accomplished, FIG. 3 is a color photograph of an architectural light fixture having a light engine such as FIGS. 1A-D inside. Light fixture 20D includes a frame 22D outside of hammered translucent glass 24D (four panes at each side of fixture 20D) between a top 26D and a base 28D. This architectural fixture can take any number of forms and embodiments. As shown in FIG. 3, it has a light output from all four sides. The hammered glass prevents direct view of the light engine 10 or individual LEDs 15 of light engine 10. As is indicative in FIG. 3, this single moment in time shows that the light output from light engine 10 is asymmetrical and flame like in appearance. By further discussion later, timing and sequence control of LEDs 15 of light engine 10 and side fixture 20D gives the appearance of a randomly lapping or jumping flame. One example of such a timing sequence is illustrated in FIGS. 13A-C. One example of actual operation of light engine 10 in a fixture 20 with hammered glass panes is shown in the stop action sequence of photos (color) at FIGS. 22A-DD and 23A-DD. These photographs give some better understanding of the functional and aesthetic effect of operation of that combination for simulation of flame. FIGS. 22A-DD are sequential frames of a video of continuous operation of light engine 10 inside the lantern-type fixture similar to FIG. 2A. They are 10 second continuous operation taken at 30 frames/sec. Therefore each frame is approximately $\frac{1}{30}$.sup.th of a second. They show visually and aesthetically how operation of light engine 10 inside a fixture which itself has translucent glass panes (e.g. hammered glass), produces the simulate appearance of an internal flame or flames (see FIGS. 22A-DD). The sequence, timing, and brightness of the lighting regimen of light engine 10 gives the appearance of flame(s) that jump around, flicker, build and retract, and the like. For comparison, FIGS. 23A-DD show a 10 second continuous operation of the same light engine at 30 frames/second but with a direct view of light engine 10 (a door to one side of the fixture is opened so that there is no hammered glass pane between the LEDs of the light engine and the viewer). This illustrates how timing and sequence, as well as intensity, of the LEDs can be controlled to simulate the changing form factor of a real flame as it changes size, shape, direction, color, intensity, and otherwise when burning. Note particularly how a substantial number of LEDs are on more consistently than some LEDs higher up, and that the topmost LEDs are only flashed on at more spaced-apart times. This simulates the jumping, leaping, or lapping of flame tips. The lower-most LEDs, by either the number or intensity, tend to collectively pulse or seem to change intensity (and even color). This simulates the more steady-state combustion at the base or bottom of a flame (such as a gas flame) but also how it can tend to throb or pulse. Note also how middle to top LEDs are controlled to simulate flames leaping, jumping, or lapping by sequentially, at least in part, being quickly turned on. This gives the perception of the simulated flames produced 360 degrees around nearer the bottom or base of the light engine periodically (pseudo-randomly) rising in height, and then, even less frequently on average, turning on the very topmost spaced apart sets of LEDs on the light engine to simulate flame tips every so often. Still further, it will be appreciated that because the LEDs are mounted on a 3D substrate, even with the fixture door closed (FIGS. 22A-DD), because light from LEDs is emanating from around that 3D substrate helps the impression or perception that the source of the light is 3D, that there is a ball or volume of light. This enhances simulation of a real flame. For example, FIGS. 23A-DD (fixture door open) demonstrate that even a viewer directly perpendicular to one side of the fixture would be in line with some LEDs on the light engine. But the viewer would be off-axis many others. Therefore, the beam axes of individual LEDs would extend at various angles relative the viewer and help the 3D perception. Still further, a viewer aligned with the corner of the fixture would see part of the light from the light engine inside through at least two hammered class panes 24. This helps the 3D perception. Also, in operation, light from the light engine would emanate in radial directions all around the vertical longitudinal axis of the light engine, so that viewers from any radial direction would have similar visual experience. But refraction and reflection of the hammered glass panes would also contribute to somewhat random patterns or luminance from the fixture, which also further enhances the aesthetics and simulation. For example, some light from LEDs on a side of the light engine opposite the one viewer's viewing direction would emanate first away from the viewer but could hit the inside of the hammered glass pane nearest to it and reflect instead of pass through that pane on the opposite side of the fixture. It might reflect to one of the panes on either side of the fixture relative the viewer. It could even bounce around inside the fixture. In any event, this type of reflected light may reach another pane, including the one closest the viewer. This further enhances the perception of 3D source of luminance inside the fixture. As will be appreciated, this perception of a 3D ball or body of flame will be the same or similar from all viewing directions of the fixture of FIG. 3, or FIGS. 22A-DD.

Figure 2C:
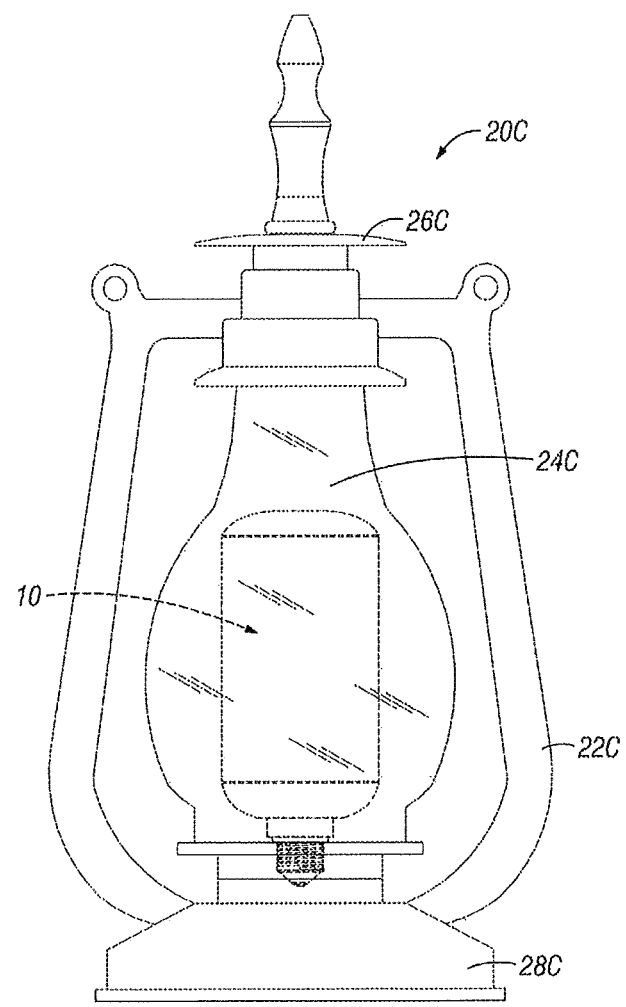
FIG. 2C is another possible fixture embodiment that could use the light engine of FIG. 1A.

But as can further be appreciated, as an alternative, cover or shroud 12 right at the LEDs of light engine 10 could be translucent (otherwise light diffusing) and the pane or panes 24 of light fixtures such as FIGS. 2A-C could be transparent or missing. The viewer would not have a direct view of the LEDs and would see a 3D source of luminance that would appear to change size, shape, and nature in a random way, including the expanding/contracting and jumping or lapping flame tips. If the fixture has panes, even if they are transparent, at least some of the light will bounce around (by reflection at the inner surface of the transparent pane or parts of the fixture) or be refracted (at both inner and outer surfaces of the transparent pane). This may enhance the simulation of a flame. This can help the light engine to be retro-fitted and used in fixtures that do not have translucent panes, shrouds, or lens.

It is also possible that a light engine with a transparent shroud 12 be used in fixtures with transparent panes, shrouds, or lenses, or no panes, shrouds, or lenses. Operation of the light engine would still produce the pseudo-random light output which is designed to have characteristics that simulate an actual flame as described above. This is especially true when viewed from substantial distances, as light tends to disperse with distance. Visual acuity also degrades.

2. Exploded or Isolated Views of Components of Light Engine 10

The internal parts in the assembly of light engine 10 are illustrated in FIGS. 4A-B through 7A-D.

Figure 4A:
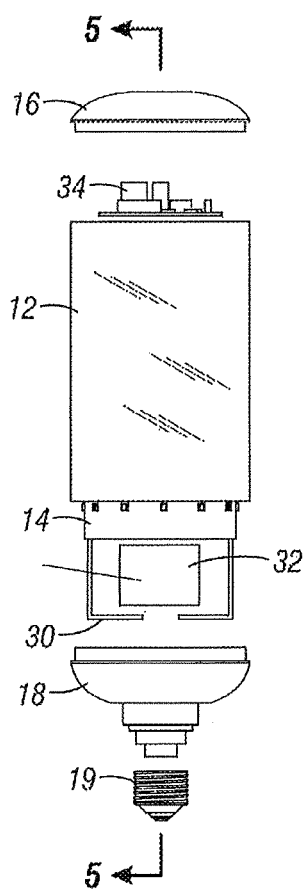
FIG. 4A is a side elevation and exploded view of the light engine of FIG. 1A.

FIGS. 4A and B show the main components of light engine 10 in exploded form. As can be seen, threaded cap 19 can be mounted on bottom cap 18. Bracket 30 can be mounted inside bottom cap and support a transformer 32, the cylindrical LED carrier 14, the concentric cylindrical translucent shroud or lens 12, and a control circuit 34. A top cap 16 can fit onto the open top of shroud 12 to complete the assembled unit.

Figure 4B:
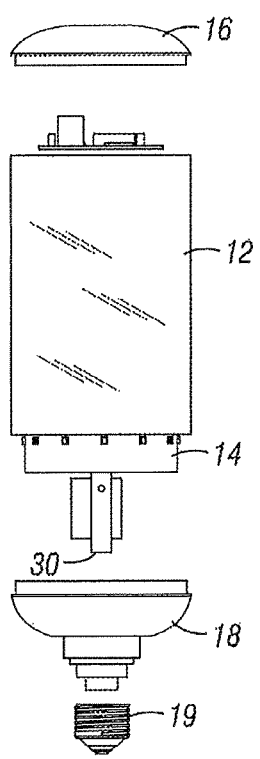
FIG. 4B is similar to FIG. 4A but from a 90.degree. different perspective from FIG. 4A.
Figure 5:
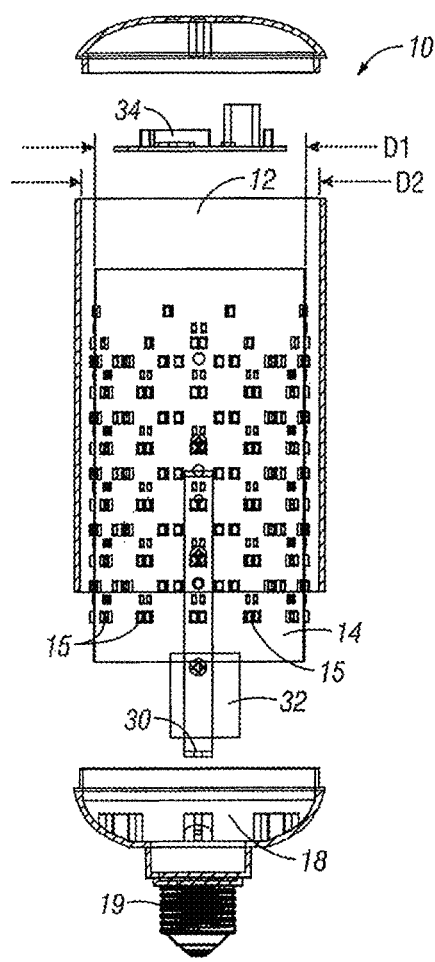
FIG. 5 is a sectional view taken along 5-5 of FIG. 4A.

FIG. 5 is a cross-section of FIG. 4B and gives more details of placement of the components inside light engine 10.

a) LED Carrier (Flexible Circuit Board and LED Array)

Figure 6A:
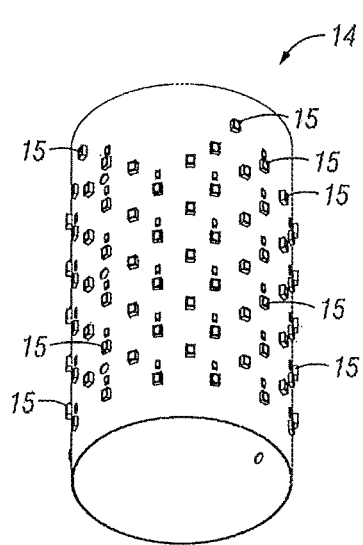
FIGS. 6A, B, and C are perspective, side elevation, and top plan views, respectively, of a cylindrical carrier (flexible circuit board formed in a cylinder) of an array of plural LEDs which can be placed inside the light engine of FIG. 1A, shown in isolation.
Figure 6B:
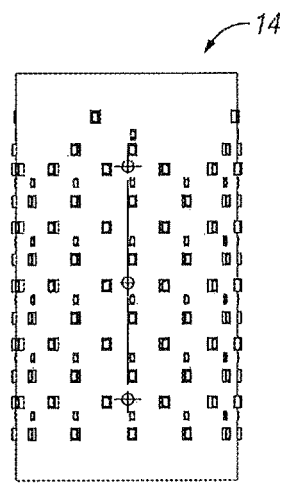
FIGS. 6D and E are perspective and top plan views, respectively, of a bottom end cap for the light engine of FIG. 1A, in isolation.
FIG. 6F is a perspective view of an electrical threaded base for the light engine of FIG. 1A, in isolation.
FIG. 6G is a perspective view, in isolation, of an internal frame used in the light engine of FIG. 1A.
FIG. 6H is a highly diagrammatic perspective view, in isolation, of a transformer for converting household line electrical voltage into a lower voltage which can be mounted inside the light engine on the frame of FIG. 6G. A schematic of the circuitry inside the component, hard wires from the threaded base of FIG. 6F and to the circuit board of FIG. 6I are shown in ghost lines.
FIG. 6I is a perspective view, in isolation, of a circuit board carrying components of controlling the LEDs in the light engine of FIG. 1A.
Figure 6C:
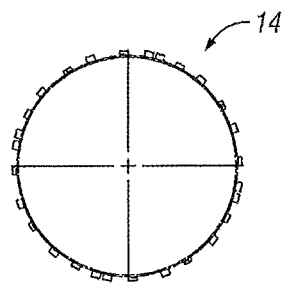
Figure 11:
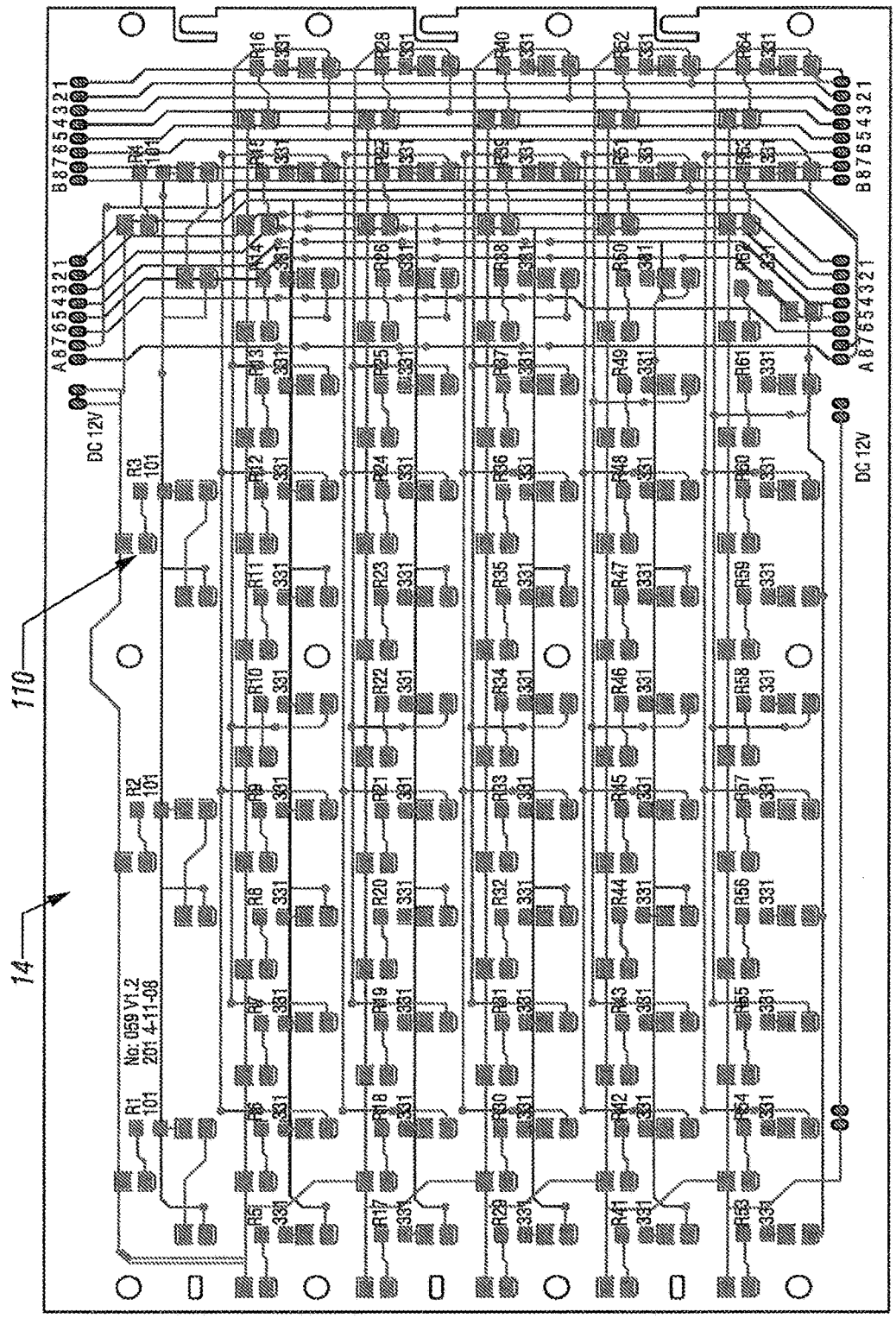
FIG. 11 is an example of how an LED array circuit of the type of FIG. 10 could be produced by printing conductive traces on a flexible circuit board (here shown in plan view). The LED dies could then be surface mounted to the printed traces, and the flexible circuit board with installed LEDs formed into the cylinder like shown in FIGS. 6A-C.

FIGS. 6A-C are perspective and isometric views of LED carrier 14. In this embodiment, carrier 14 is cylindrical in shape (cylindrical side wall with open opposite ends) and is populated with LED dies around its sidewall. In this embodiment this 3D shape is made possible by using a flexible circuit board from the cylinder with pre-printed circuit traces on its outer surface. LEDs are then surface-mounted to appropriate positions in that printed circuit. FIG. 11 gives one general example of what such a printed circuit board might look like in plan view. Flexible circuit boards are commercially available.

It this specific embodiment, the LEDs 15 are populated fairly evenly across most of the cylinder's outer surface from near the bottom or bottom cap open end towards the top or top cap open end. Note that here several clusters of LEDs 15 at or near the top extend nearer the top. The clusters are spaced apart circumferentially. This allows creation of "licking" or "lapping" flame tips at certain areas of carrier 14. This embodiment has the LEDs relatively heavily populated on the substrate, with the exception at the top.

Spacing of LEDs 15 in this example are shown in FIG. 13A (dimension numbers in mm). Thus, the cylinder is relatively heavily populated with LEDs. As can be appreciated, the designer can adjust the spacing and alignment of any set of LEDs. The figures give examples of such spacing in proportion to the scale of the light engine or substrate. It's to be understood that the figures are not to scale. Therefore, as shown in FIG. 1B, the height of the substrate for that embodiment of light engine 10 is approximately 130 mm. Thus FIG. 1B shows spacing of the LEDs 15 relative to one another for a form factor and size as dimensioned there. On the other hand, FIG. 13A shows a circuit board for a light engine like that of FIG. 1A-D, but roughly half as big. The specific spacings between LEDs, as well as the consistent 51 degree diagonal angle along which most of the LEDs are aligned, can be derived by the dimensions annotated on FIG. 13A (in mm). Note that other figures, such as FIGS. 16 through 21, illustrate other potential sizes and form factors. The spacing of LEDs can vary according to need or desire.

The designer can alternatively adopt more of the arrangement of FIG. 13A, which is heavily populated with consistently arranged LEDs from bottom towards the top but ends up around the top with small separated clusters of LEDs. This can help give the appearance of a lapping or jumping flame. For example, simulated Christmas tree shapes (e.g. FIG. 20) might be a few inches tall to many feet tall. Likewise, some of the other shapes could be the same. Some could be many feet tall (e.g. lawn displays or sculptures). These Figures are not intended to illustrate the precise number or spacing of LEDs, but rather general locations.

By automated manufacturing processes, the circuit board, printed traces, and LEDs can be assembled relatively efficiently and economically for mass production. This represents a minimal number of parts and manufacturing steps.

The material of carrier 14 can vary. In this embodiment it is opaque, flexible circuit board material (e.g. dielectric) and is commercially available. It will be appreciated, however, that 3D shapes could be obtained with flat or rigid circuit boards assembled appropriately. Also, carrier 14 could be light transmissive (translucent or transparent) in areas without electric traces or LED dies. It also could be reflective in those areas (e.g. reflective paint, coating, or surface). One example would be white surface.

It will be further appreciated that the carrier can be elongated in a horizontal operation direction, asymmetrical, or in almost any shape that has a peripheral surface from a lower end to an upper end over which light sources can be populated and operated.

b) Bottom Cap and Threaded Base

Figure 6D:
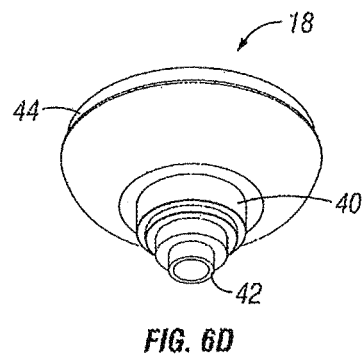
Figure 6E:
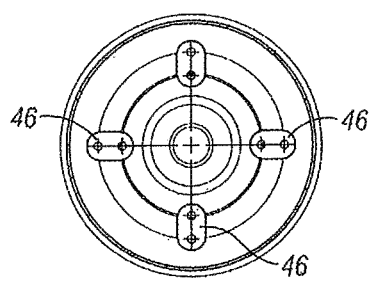
Figure 6F:
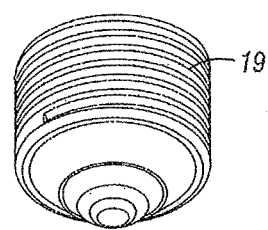

FIGS. 6D-F show details of bottom cap 18 and threaded base 19. Threaded electrical base 19 can be fixed to a formed nose portion 40 on the bottom of cap 18. This can be by interference fit, adhesives, rivets, screws, or other fastening techniques such as are known in the art. Electrical leads from threaded base 19 to the interior would also be added (see FIG. 6H). Cap 18 can be a dielectric (e.g. certain plastics) and base 19 an electrical conductor (e.g. conductive metal). Examples of threaded base include but are not limited to E14, E27, E40, and B22.

As can be appreciated by those of skill in the art, heat management features can be incorporated into light engine 10, including bottom cap 18. For example air vents or openings can be formed in bottom cap 18 to promote air transfer and carrying away of heat from LED operation. Vents or openings could also be formed in top cap 16. Having them in both top and bottom caps could enhance such heat transfer by convention away from the LEDs. The vents or openings could be relatively small to allow gaseous state (air) transfer but deter liquid or solid state transfer (water, dirt, debris, insects). There could also be heat transfer from the LEDs by conduction through the circuit board and then the top and/or bottom caps.

c) Internal Bracket to Hold Transformer and Shroud

Figure 6G:
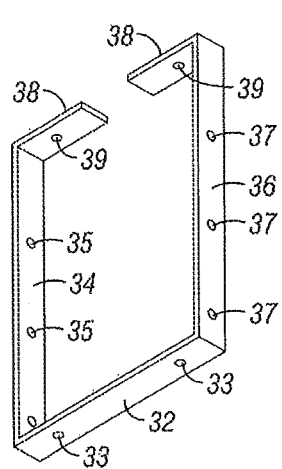

FIG. 6G shows in isolation a bracket 30 used in assembly of light engine 10. Bracket 30 (see also FIG. 6G) could be screwed, riveted, or otherwise fastened to bosses 46 inside bottom cap 18 (see FIGS. 6D and E) through apertures 33 and bottom cross piece 32 of bracket 30 (see FIG. 6G). An electrical transformer 32 could be mounted to bracket 30 (see FIGS. 4B and 5). Transformer 32 would convert typical household line voltage (e.g. 120 VAC) to a voltage useable by control circuitry 34, discussed below (e.g. 12 VDC; see FIG. 6H). Device 32 can take a forms that are commercially-available from a number of sources. Its form factor would be such that it would fit into bracket 30, the size of which can be deduced by comparison to threaded base 19.

Bracket 30 also will support shroud 12. As can be appreciated from the drawings, shroud 12 would fit concentrically over LED carrier 12 between bottom and top caps 18 and 16. Shroud 12 spacing from carrier 12 is shown in FIG. 5 (the difference between diameter D2 of shroud 12 and diameter D1 of LED carrier 14). This can be a fraction of an inch.

Figure 6H:
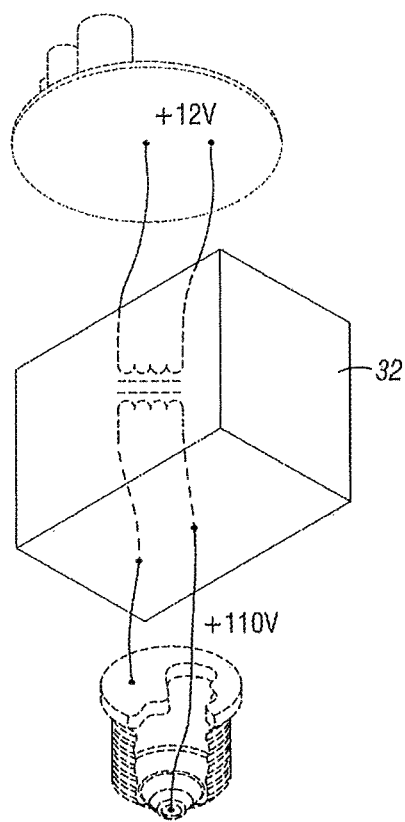
Figure 6I:
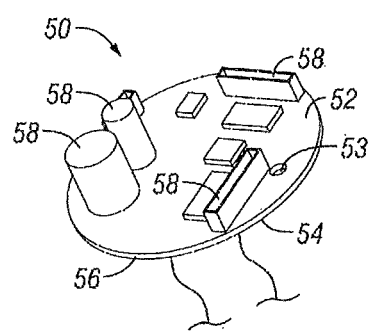

At its end opposite cap 18, bracket 30 additionally supports a control circuitry 34 that would operate the sequence of LED activation (see FIGS. 4A, 6H, and 6I). Control circuitry 34 can be attached (e.g. screws, bolts, rivets, or other techniques) to that end of bracket 30. Operation of circuitry 34 will be discussed in detail below.

Bracket can be of metal (e.g. aluminum) or possibly of other rigid materials sufficient to support the components described.

Cylindrical internal LED carrier 14 can have mounting holes 45 (see FIG. 6A) that align with apertures 35 on opposite sides 34 and 36 of bracket 30 (see FIG. 6G). By rivets, screws, bolts, or other fasteners, this would fix carrier 14, with its plural LEDs 15, to bracket 30, which in turn is fixed to bottom cap 18. Circular circuit board 50 (FIG. 6I) can include a top side 52, a bottom side 54, through holes 53, a perimeter edge 56, and electrical components 58. This circuit board component 34 can be mounted by screws, rivets, or other fasteners through openings 53 to the openings 39 along the top 38 of bracket 30 (see FIG. 6G). Appropriate electrical connections from conductive base 19 to circuit board 34 (see FIG. 6H) would be included.

d) Shroud

Figure 7A:
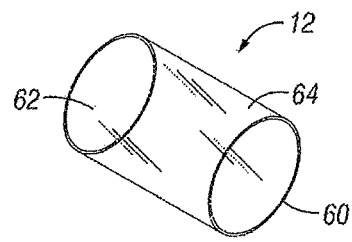
FIGS. 7A, B, and C are reduced-in-scale perspective, front elevation, and top plan views of an outer translucent cylindrical cover, shroud, shade, or lens for the light engine of FIG. 1A, in isolation.
Figure 7B:
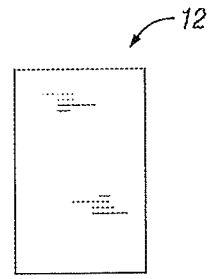
FIGS. 7D, E, F, and G are perspective, bottom plan, side elevation, and top plan views of the top cover from the light engine of FIG. 1A, in isolation.
Figure 7C:
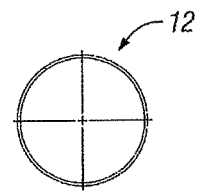
Figure 7E:
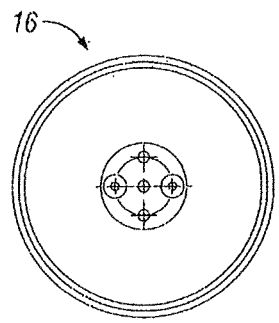
Figure 7D:
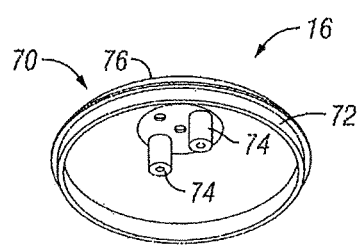
Figure 7F:
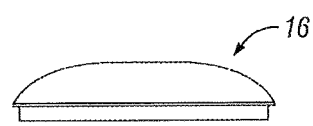
Figure 7G:
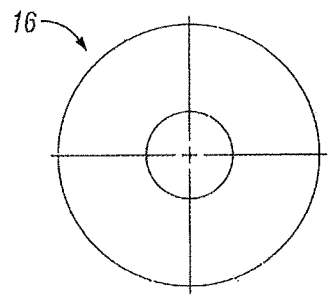

FIGS. 7A-C illustrate in isolation the basic form factor of outer lens or shroud 12. Like carrier 14, it is a cylinder with opposite open ends.

Cover or lens 12 can be slid down over the foregoing combination and its bottom end 62 seated on a complementary flange and ledge at the top of bottom cap 18.

The nature of shroud 12 in this embodiment is a transparent cover over the 3D array of LEDs. As mentioned, in some embodiments, shroud 12 could be translucent. Translucency can be obtained in a number of ways. Several non-limiting examples are materials which can be frosted, textured, moire patterned, or otherwise configured so that direct imaging of the LEDs is not possible with the human eye.

It is to be appreciated however, that light engine lens or shroud 12 could have other or different optical properties.

As mentioned previously, in this embodiment a translucent shroud has been found to enhance simulated flame appearance. To do so with light engine 10 with a transparent shroud or cover 12, another shroud, this one translucent, would need to be placed between light engine 10 and the viewer(s). As discussed above, one way is to mount light engine in a fixture that has such a translucent shroud. Non-limiting examples are panes, a cover, a shroud, or a lens. It is not necessarily required however. As mentioned, embodiments could simply be used to essentially have a light show or aesthetically pleasing lighting effect. In other cases there may be a distance from normal viewers or pre-existing layers (e.g. glass doors to a fireplace) that would allow one form of the light engine to produce a reasonable or good simulated flame effect without a hammered glass or similar translucent shroud.

Thus, any of the embodiments described herein could have a substrate in a 3D form factor populated with LEDs, and the LEDs operated in a pre-programmed timing sequence. It could be just be aesthetic or other effect. Or the timing sequence could follow the pseudo-random flame simulations, the same or similar to discussed above, by having a pulsing lower portion and pseudo-random traveling upward to simulated flame tips, all just with LEDs and no cover, shroud, or lens. Alternatively, the cover, shroud, or lens right at the LEDs could be translucent or otherwise light diffusing. Or that shroud, cover, or lens could be transparent and another shroud, cover, or lens (e.g. panes) could between the light engine with transparent shroud and the viewers. It is also possible to have a translucent shroud at the light engine and another translucent shroud over that. Furthermore, the shape of shroud 12 covers the output light distribution patterns of the LEDs in the array inside light engine 10. In this embodiment, this means shroud 12 is elongated along the longitudinal axis of light engine between bottom cap 18 and top cap 16, and thus, emits relatively unaltered light from the 3D LED array radially all along that axial length. This allows flame simulation in both a 3D form and from 360 degree viewing angles radially from the axis.

Because light engine 10 of this embodiment would typically be used for flame simulation, and this embodiment operates the LEDs to simulate a flame jumping in the direction of top cap 16, light engine 10 is typically mounted threaded-base-down. However, as will be appreciated by those skilled in the art, if base up operation were desired, the on-off sequence could be inverted by appropriate configuration of the control circuit.

And, it is not required that light engine be operated with its longitudinal axis vertical.

e) Top Cap

FIGS. 7D-G are perspective and isometric views of top cap 16. It could be by interference fit, snap-fit, adhesive, screw-threads, screws, bolts, sonic welding, or other techniques. It can be beneficial for it to be removable (e.g. for maintenance and repair). But it can also be beneficial that it at least substantially seal the top of shroud 12. For example, by the fastening method or with such things as gaskets, rings, or other seals, light engine 10 can be made robust including for outdoors use where moisture, dust, or debris can be an issue.

FIGS. 7D-G show top cover 16. It has a body 70 with a peripheral annular flange in shoulder 72. Its interior side includes projected bosses 74. This allows cover 16 to be complementarily fitted into the top end of cylindrical lens 12.

Therefore, as can be appreciated, assembled light engine 10 (see e.g. FIGS. 1A-D) can be self-contained including plural light sources on the three dimensional carrier with appropriate on board electronics. Power would be delivered through threaded base 19. Installed base-down in an electrical socket, either on its own as in FIG. 1A or in a fixture 20 as in FIGS. 2A-C, it can be operated to simulate a burning flame. Viewers from available vantage points 360 degrees around it will see essentially a consistent simulation. The simulation will therefore have both flame-like appearance but also a 3D realism.

f) Control Circuitry

FIGS. 8-11 illustrate generally how the control circuitry 34 of FIG. 6I can be configured and how the printed circuit on LED carrier can be produced. It is to be understood that this is but one example only of the circuitry that could be used on circuit board 34.

Figure 8:
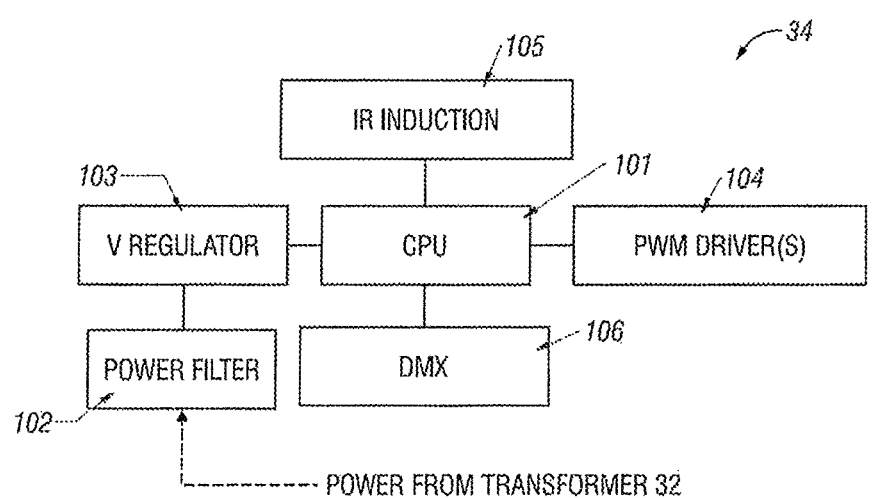
FIG. 8 is a block diagram of components of the circuit board of FIG. 6I for the light engine of FIG. 1A. Connection to the power transformer of FIG. 6H is shown in ghost lines.

FIG. 8 shows a block diagram of the main components of control circuitry 34. Control circuitry 34 in this example is centered on a programmable microcontroller or CPU 101. CPU 101 would receive appropriate electrical power (e.g. 12 VDC) from transformer 32 (FIG. 6H) through power filter module 102 and power regulator module 103.

Figure 9A:
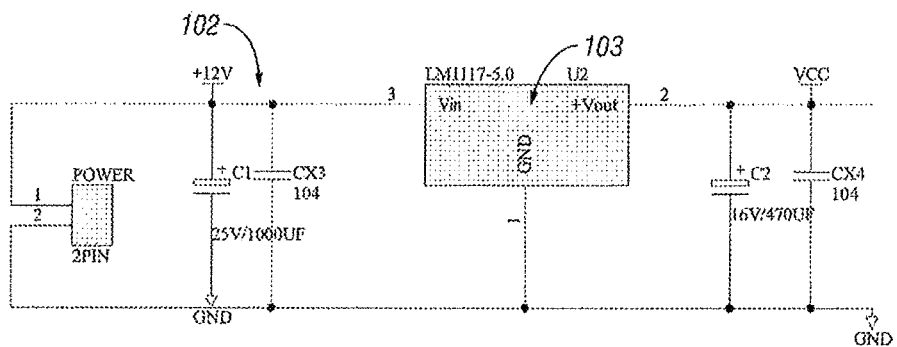
FIGS. 9A-D are electrical schematics of examples of the types of components of FIG. 8, including power filtering and voltage regulating modules (FIG. 9A), a DMX module (FIG. 9B), a control or CPU module (FIG. 9C), and a driver module (FIG. 9D).

FIG. 9A shows power module 103. It is a low-dropout linear regulator set to 5.0V output. The output VCC can power the DMX module interface 105, see FIG. 9B, the CPU module 101 and CON4, see FIG. 9C, and CON3, see FIG. 9E, 9F, 9G. The power module input is 12V via a 2-pin power connector that would be connected to transformer 32 of FIGS. 4A-B. Transformer 32 converts 120 VAC to 12 VDC. The 12 VDC output from transformer 32 feeds control board 34, including CPU 101, LED PWM driver modules 104, and each LED zone. Transformer 32 may be a transformer, a transformer and solid-state hybrid, or a solid-state only device.

Power filter module 102 can be any of a variety of filtering techniques to help manage typical household voltage. Those skilled in the art could select the type of filtering and voltage regulation deemed needed or desired for a given light engine according to the invention.

Figure 9B:
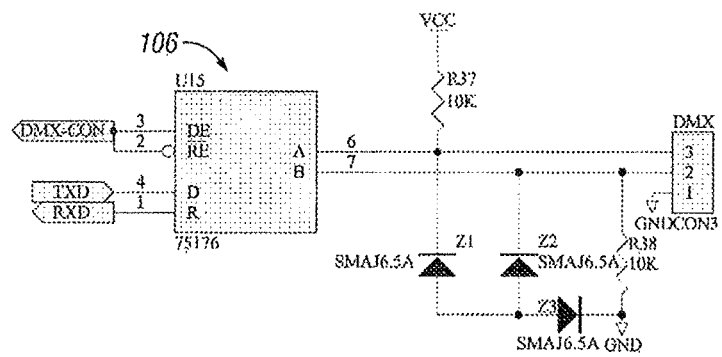

FIG. 9B shows what is called DMX module or interface circuit 106. U15 is a monolithic integrated circuit designed for bidirectional data communication on multipoint bus-transmission lines. U15 is designed to function on balanced transmission lines and meets ANSI Standard EIA/TIA-422-B and ITU recommendation V.11. An example is the Texas Instruments SN75176. U15 interfaces with the control module at pin 32, see FIG. 9C, via DMX-CON on pins 2 and 3 of U15. U15 pins 6 and 7 terminate at CON3 (DMX). DMX module 106 therefore allows for a variety of things. One would be the ability to do such things as have a remote control of on/off of the light engine. Another would be remote control of speed, size, intensity, or other controllable factors of operation of the light engine. Another possible optional feature would be remote control of either operating the light engine according to the timing and sequencing algorithm for simulated flame effect or simply turning all LEDs on at some same or similar intensity. This option could allow a user to switch between a simulated flame effect, such as simulating a gas lamp wall-mounted porch fixture, with a simulated appearance of the randomly jumping gas flame inside the fixture, but then turning all light sources full on for use as a more conventional constant on porch light. Alternatively, the circuit could be configured to allow a manual switch between such states. DMX protocol could also allow such things as remote programming of the light engine. For example, by known methodologies associated with DMX protocol and communication, different timing and sequence operations could be added or changed over in a light engine without hardwire communication or carrying the light engine down.

Figure 9C:
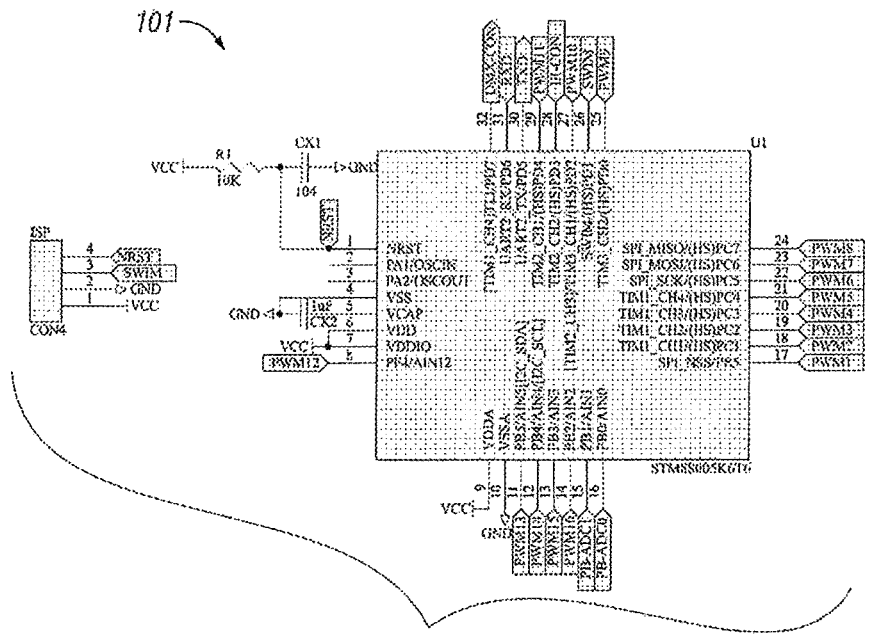
Figure 9D:
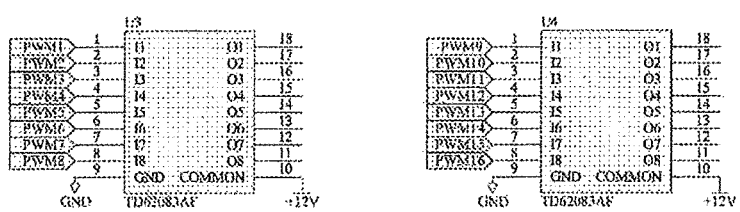
Figure 9E:
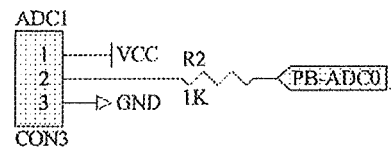
FIGS. 9E-G are optional features such as a speed control (FIG. 9E), a flame size control (FIG. 9F), and an infrared/body induction module (FIG. 9G) that could be used in the circuitry of FIGS. 6I and 8 and shown schematically.
Figure 9F:
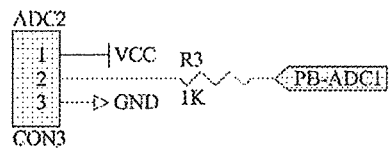
Figure 9G:
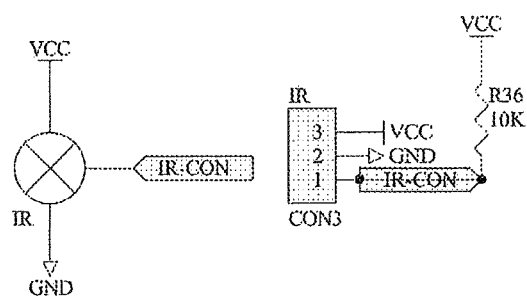

FIG. 9C is a schematic of CPU 101. It implements the LED driving regimen with its programming. CPU module 101 may be controlled and/or programmed via DMX module or the ISP interface. The control module 101 may also allow limited control for speed (ADC1) and flame size (ADC2), see FIGS. 9E-F. The control module can sense when a human being is near utilizing infrared body induction, see FIG. 9G. This can be used to turn the device 10 on when sensing someone's present, or off when not detecting someone's presence.

As can be appreciated, control circuitry can be programmed to operate timing, sequence, intensity, or other operating parameters of individual LED sources. This could include simulation of flame size and speed. In other words, the speed of sequencing of on and off of certain LEDs to simulate the speed of lapping flames could be sped up or slowed down. Also, there could be selectivity as to which LEDs are turned off and on relative from bottom to top to affect at least the appearance or simulation of height of flame for a given array of LEDs. As can be further appreciated, this can be programmed into a light engine on a one-time basis. Alternatively, by techniques known in the art, it can be changed by reprogramming. There could also be several different flame effects preprogrammed into a light engine and some sort of selection ability to choose between them from time to time. Furthermore, there could be added some adjustable control (manual or wireless) that would allow a user to tweak operating parameters such as flame height and speed. This would give the user control of preferred aesthetic operation of the light engine.

Control module 101 is an 8-bit microcontroller. Control module 101 has the following features: A Nested interrupt controller with 32 interrupts. Up to 37 external interrupts on 6 vectors. 2.times. 16-bit general purpose timers, with 2+3 CAPCOM channels (IC, OC or PWM). 16-bit, 4 CAPCOM channels, 3 complementary outputs, dead-time insertion and flexible synchronization. 8-bit basic timer with 8-bit prescaler. Auto wake-up timer. Window and independent watchdog timers. UART with clock output for synchronous operation, Smartcard, IrDA, LIN. SPI interface up to 8 Mbit/s. I2C interface up to 400 Kbit/s. 10-bit, .+−0.1 LSB ADC with up to 10 multiplexed channels, scan mode and analog watchdog I/Os. Up to 38 I/Os on a 48-pin package including 16 high sink outputs. Highly robust I/O design, immune against current injection.

Driver module(s) 104 (FIG. 9D) would take output from CPU 101 drive the LEDs according to a pre-programmed regimen in CPY 101. Such drivers generate the needed driving power to the whole array of LEDs according to instructions of CPU 101. As will be appreciated, drivers 104 are pulse-width-modulated drivers. This allows quite precise control of brightness of LEDs. This technique is well-known.

g) LEDs

Figure 10:
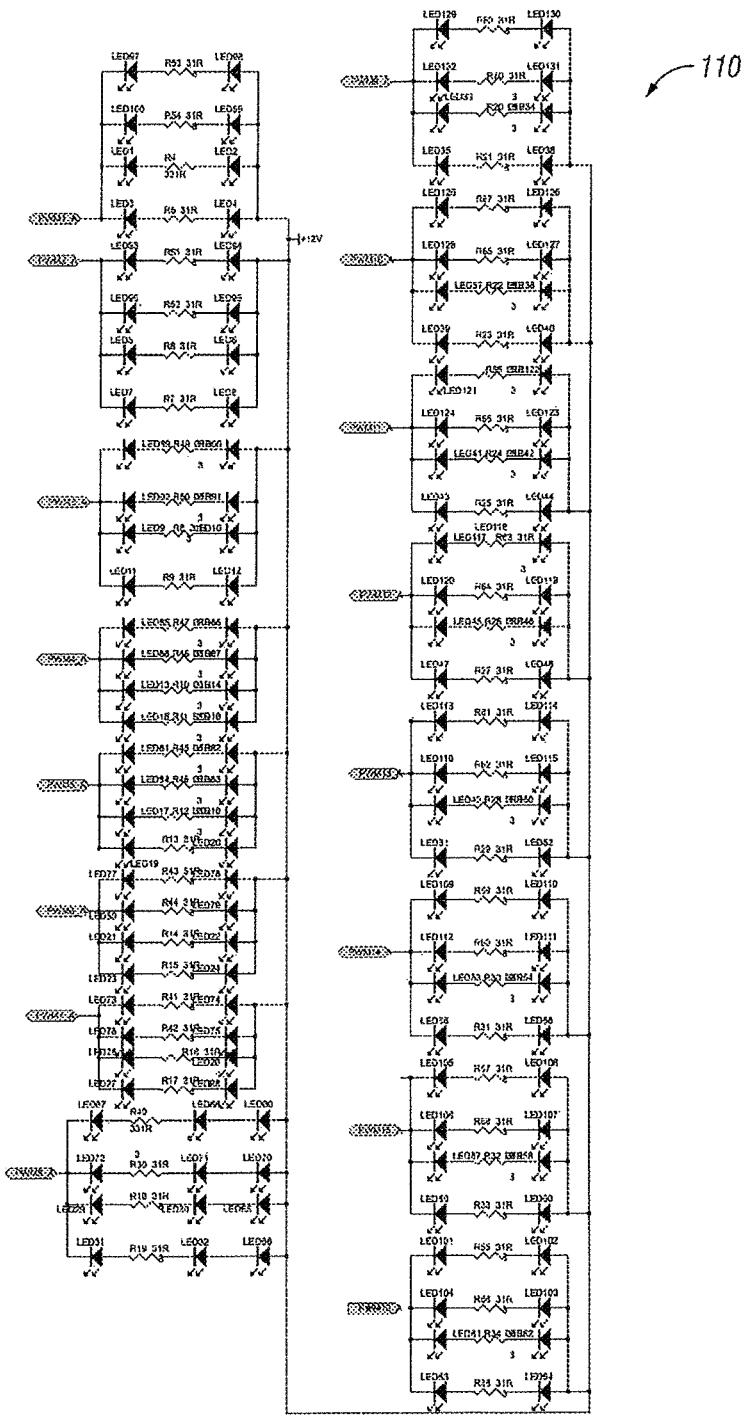
FIG. 10 is an electrical schematic of one example of circuitry of an array of plural LEDs such as could be used with the circuit components of FIGS. 9A-G.

FIGS. 10 and 11 illustrate how plural LEDs can be produced for light engine 10.

FIG. 10 illustrates an electrical schematic 110 for one example of an array of 132 LEDs and how they could be controlled in sub-sets by CPU 101 (see PWM inputs related to CPU 101). Of course, the number of LEDs could be higher or lower according to need or desire.

FIG. 11 is a plan projection of a printed thin layer conductive circuit of the type that could be used to surface print the circuit 110 of FIG. 10 onto a flexible circuit board (here show in plan view), that could bent into cylindrical carrier 14. As can be appreciated, in some cases a single flexible circuit board could carry the circuit and LEDs for the entire 360 degrees array. In other cases two or more flexible circuit boards could each carry a part of the overall circuit and LEDs, and the two or more flexible boards shaped into a cylinder. Still further a multi-plane or multi-facet non-flexible circuit board or substrate could be formed into the 3D form factor desired and include the printed circuit.

As can be appreciated, the precise number of LEDs, their placement, and the electrical components and circuitry related to them, can vary according to need or desire.

It is to be appreciated that the circuitry allows both pulse width modulation of driving electrical power to be adjusted to each LED and in concert or in coordination with other LEDs.

FIG. 12 provides details about the types and characteristics of LEDs that can be used in the embodiment of light engine 10. Such characteristics are well-known to those of skill in the art. It is to be understood, however, that any or all of those characteristics may be varied according to the designer's need or desire. Such LEDs are available commercially from a number of sources.

As can be appreciated by those skilled in the art, the designer could select from a variety of options regarding the light sources. For example, LEDs come in a variety of different form factors, packages, mounting tape techniques, power usage, size, light output distribution, and color or color temperature. All LEDs for a given light engine might be the same in all operating characteristics. On the other hand, the designer could select differences between LEDs in the same light engine. In one example, LEDs of different color temperatures could be placed at different positions to try to enhance simulation of actual flames. Actual flames tend to have different color at different portions at different times. For example, different color temperature LEDs could be at the very top of the LED array for the tips of the lapping flames of the simulated flame whereas perhaps different or deeper yellows, oranges, or reds could be distributed lower down. And, of course, if not simulating a flame effect, any color temperature LEDs might be selected according to the designer's choice for an aesthetic effect.

C. Method of Operation

As can be seen from the foregoing, light engine 10 is a self-contained, replaceable light source assembly. It can project light from the three dimensional carrier 14 through lens or cover 12 in all radial directions. Combinations of LEDs can be turned on at certain times. The speed of on/off of the combinations, which LEDs are turned off and on, and intensity or brightness can be adjusted through programming of CPU 101.

FIG. 13A illustrate one specific example of a lighting regimen for light engine 10. FIG. 13A is based on a flexible circuit board with subsets of LEDs arranged as shown. Each subset is designated by a number between 1 and 16. For examples there are three subsets "1", each having three LEDs (each shown by a small circle with cross hairs). Each of subsets "1" is spaced along the top of the circuit board. In comparison, three subsets "16", each with two LEDs, are spaced apart along the bottom of the circuit board. The chart below shows the timing diagram that can be used for one cycle of LED operation. Once the sequence of Chart 1 is completed, it would repeat for as long as light engine 10 is operating.

TABLE 1

| Sequence in Time | LED subset/status of operation |
|---|---|
| 1 | 14/FB; 15/FB/16/FB, 11/LB |
| 2 | 11/FB; 12/FB; 13/FB |
| 3 | 8/FB; 9/FB; 10/FB |
| 4 | 8/off; 9/off; 10/off; 5/FB; 6/FB; 7/FB |
| 5 | 5/off; 3/FB; 4/FB |
| 6 | 11/off; 6/off; 1/Fb; 4/FB |
| 7 | 1/off; 3/off; 4/off; 7/off; 11/FB |
| 8 | 12/off; 13/off/8/FB |
| 9 | 8/off; 5/FB/9/FB; 10/FB |
| 10 | 9/off; 10/off/2/FB; 6/fb; 7/FB |
| 11 | 2/off; 5/off; 7/off; 3/FB |
| 12 | 11/off; 3/off/6/FB; 13/FB |
| 13 | 12/off; 11/off; 13/FB |
| 14 | 8/off; 10/off; 12/FB |
| 15 | 8/off; 10/off/ 12/FB |
| 16 | 13/off/9/off; 6/FB/2/FB |
| 17 | 2/off; 5/off; 3/FB; 13/FB |
| 18 | 11/off; 13/off; 1/FB |
| 19 | 1/off; 3/off/12/FB; 11/FB; 13/FB |

Key: "FB" means the LEDs are at full instructed PWM brightness; "LB" means PWM non-full or low brightness; and "off" means completely off By referencing Table 1 above in combination with FIG. 13A and FIGS. 13 B-C, a graphic approximation of how one timing and sequence for simulated flame effect can be created is illustrated. Assuming an LED arrangement such as FIG. 13A (shown in plan view and not in its final three-dimensional shape), and assuming subsets of the 99 LEDs shown in FIG. 13A are given the numbers 1 through 16 on that figure; where three subsets of three LEDs each are separated into groups at 1, and other sets are distributed at 2 through 16 moving down numbers. FIG. 13B then shows, top to bottom, timing of on and off of subsets of LEDs and state of intensity by different colors according to Table 1 above. FIG. 13 C illustrates each sequence 1 through 19 individually and one-at-a-time. By looking quickly through each sequence 1-19 in FIG. 13 C in series, one gets a general understanding of this algorithm of LED operation for simulation of flame effect.

In particular note how sequence 1 (FIG. 13C) starts by illuminating the bottom two rows at different intensities. Succeeding sequence states 2, 3, 4, 5 and 6 basically sequentially turn on succeeding vertical subsets upwards to the top. Thereafter, there is a jumping around of vertical levels that are illuminated or not (sequences 8-19), with only one sequence illuminating the topmost sets of LEDs 1. After sequences 1 through 19 (which occur rapidly), it repeats. It basically presents a pseudo-random firing of different LEDs in a kind of jumping or lapping simulation. The different intensities enhance this pseudo-randomness and stereoscopic type appearance of three-dimensional depth of the flame effect even though in some embodiments the LEDs output is constrained to the exterior of the three-dimensional shape. In other words, even though one cannot see LEDs on the other side of the shape, there is still a perception of three-dimensional depth of the output from one viewing direction. As will be mentioned later, the substrate could itself be transparent or translucent and allow some see-through to light output on opposite sides of the three-dimensional shape. But this is not required.

Table 2 indicates lighting period (length of lamp being on) of each lamp in a single cycle:

TABLE 2

|  | Longest period | Shortest period |
| --- | --- | --- |
| Top-most end | 1.44 ms | 320 ms |
| Bottom-most end | 1.44 ms | 560 µs |

As can be appreciated, this timing sequence coordinates on/off of certain LEDs all around light engine 10. As indicated at Table 1, this can simulate a flame by simulating not only intensities varying over time but also the flame jumping in height over time.

All output signals listed above are PWM output signals. PWM control digitally saves costs and power consumption. Spaces between LEDS can be increased or decreased proportionally, or more or less LEDs can be used per given area. Color temperature of LEDs in this embodiment can be within 3 color temperature ranges, depending on demands of end-users or according to a designer's wishes: 180K-2000K (redder); 2000K-2200K (red-yellow); and 2200K-2400K (yellower). Light emitted form LEDs is scattered or refracted in order to irradiate softly, achieving the flame effect. However, these parameters can differ according to needs or desires.

As can be seen by the foregoing, PWM control regulates energy flow to the LEDs to control brightness as well as when they are on or off. Each repeating cycle of the timing sequence of Table 1 generally turns "on" several subsets of LEDs near the bottom for a brief period, and then sequentially turns "on" and "off" subsets higher and higher until Sequence step 6 in Table 1 has the top-most subsets all on at full brightness, as well as a few subsets (subsets "4") immediately below at full brightness them off while turning LEDs. The "on" subsets jumps back down towards the middle (see Sequence steps 7-15), and then builds back to the top (steps 16-18) before dropping way to bottom (step 190). This building up, then falling back, building up, and then falling way back, in repeating cycles, simulates the jumping of real flames, including the licking or lapping of upper flame tips.

At the relatively short time durations of each cycle, the observer would get the perception of jumping flames. And this would be from any available radial viewing direction.

It will be appreciated by those skilled in the art that the exact timing sequence could vary, including by the designer's desire and need. The sequence can be programmed into CPU 101 by conventional techniques. Upon installation of light engine 10 to an electrical socket, and electrical power to light engine by an on-off switch to the socket, CPU 101 would automatically begin the cycling of the sequence of Table 1 and continue as long as power is provided to the socket.

One example of a regime for driving the LEDs is shown at FIGS. 22A-DD and 23A-DD. As discussed earlier, a light engine similar to that of light engine 10 of FIGS. 1A-D is used. It has a flexible circuit board shaped in a cylinder with the LED layout similar to FIG. 13A. There is a top level of LED groupings spaced apart for flame tip effect (like LED groups 1 of FIG. 13A). There are five levels below that: LEDS 2 and 3; LEDs 5 and 6; LEDs 8 and 9; LEDs 11 and 12; and LEDs 14 and 15. In this case, the sequence, order, and intensity of driving of the different LEDs is illustrated in the time-lapse color photos.

As indicated above, light engine is capable of re-programming. Not only could a different timing sequence be installed, the speed of each cycle and the number of levels of LEDs operated could be changed. This would allow a faster or slower flame jumping and a taller or shorter flame.

D. Options and Alternatives

As mentioned, the invention can take many forms and embodiments. Variations obvious to those skilled in the art will be included with the invention, which is not limited by the embodiments discussed herein.

1. Different Forms of Light Engines

For example, light engine 10 can take different form factors. As mentioned previously, different populations, arrangement, and types of light sources are possible.

Different driving regimes are possible. The light engine can carry on-board a shroud, cover, or lens that is translucent, or it can be transparent, or a combination. It does not necessarily have to have a shroud, cover, lens, or the like.

a) Different Types of Light Fixtures

Figure 14:
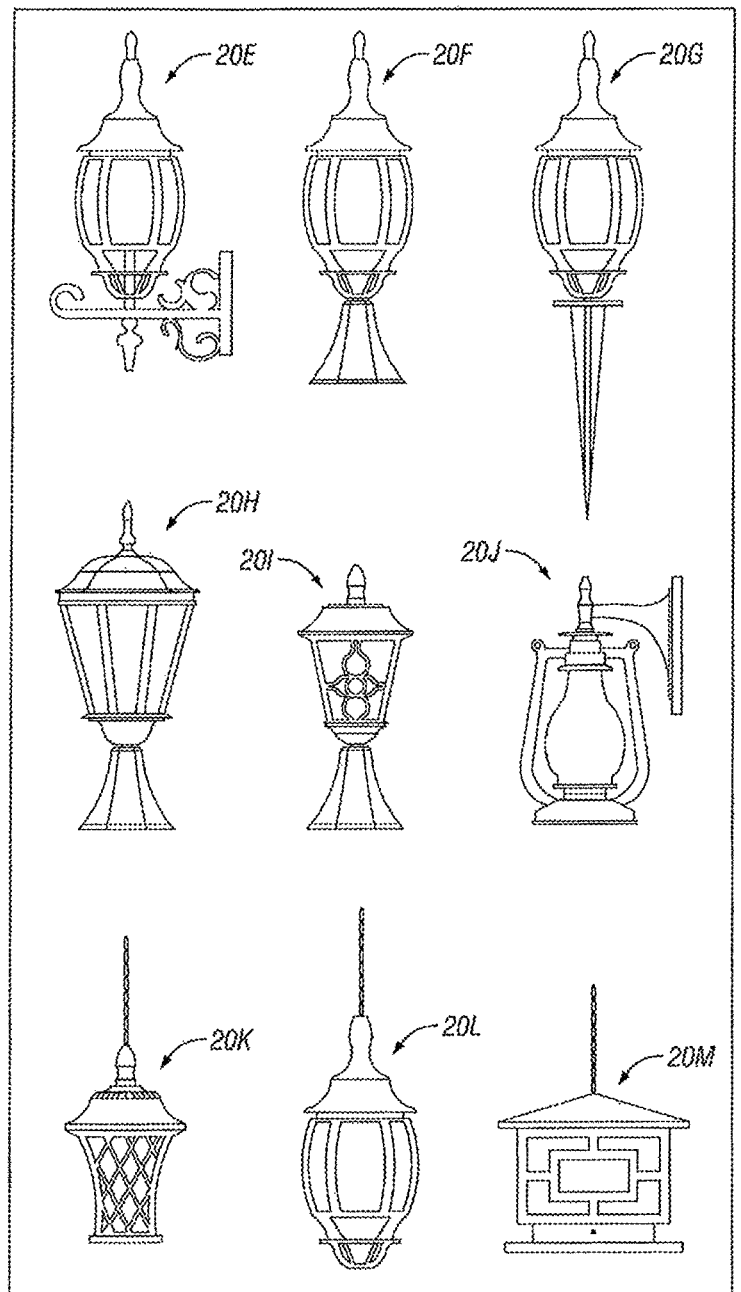
FIG. 14 is a set of additional possible examples of lighting fixtures in which the light engine of FIG. 1A could be used, each shown in simplified side elevation.

FIG. 14 gives additional non-limiting examples of light fixtures with which light engine 10 could be used. They include fixtures supported on their bottom or base (such as could be column, bollard, or post-mounted); fixtures supported on their side (such as for wall or post mounting), and fixtures supported or hanging from their top (such as pendant lights or chandeliers). Some may not allow viewing from all directions, or even 360 degrees in the horizontal plane (e.g. a wall-mounted light). But the light engine or LED arrangement is such that it has 3D effect and enhances simulation of flame effect for available viewing angles.

b) Alternative Bulb Form with Screw on Top Cap

Figure 15:
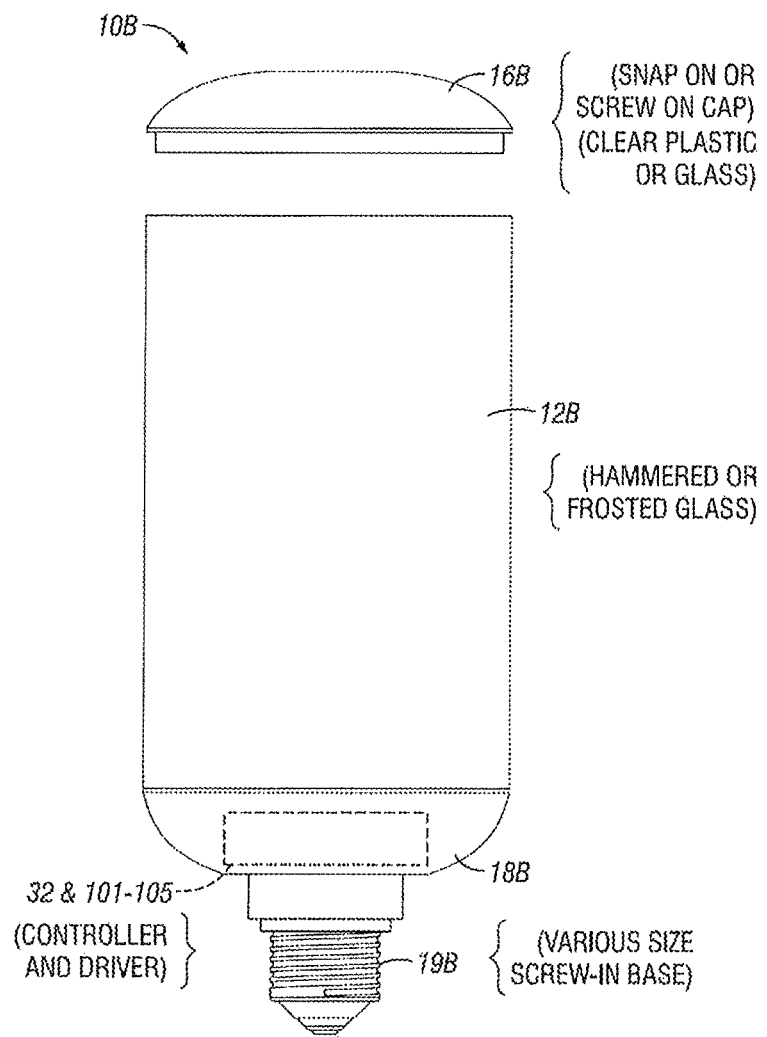
FIG. 15 is a side elevation, partially exploded view of an alternative embodiment of a light engine according to the present invention.

FIG. 15 shows an alternative light engine 10B. It could include a base 19 like light engine 10. Base 19B could be of various sizes. The electronic circuitry could be mounted in lower cover 18B instead of near the opposite end. Cover 12B could be like cover 12 of light engine 10. It could be clear plastic or glass hammered or frosted glass. In this embodiment top cover 16B could also be clear plastic, glass hammered, or frosted glass. It could snap in or screw into the top of cover 12B. Other variations are, of course, possible.

c) Flame-Shaped Bulb

Figure 16:
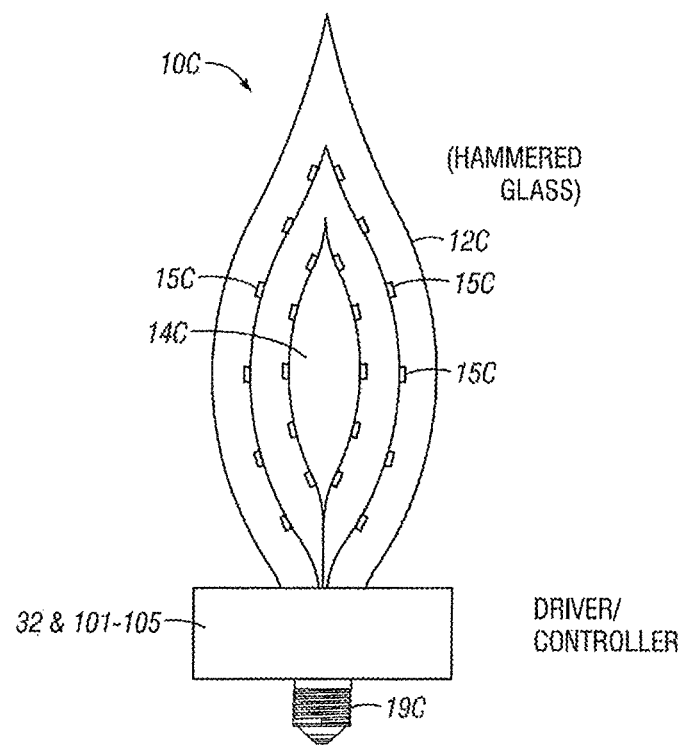
FIG. 16 is a side elevation view of a still further alternative embodiment of a light engine according to the present invention.

FIG. 16 shows another form factor for the light engine. This example 10C has a screw-in base 19C and base 18C with driver and controller. Its carrier 14C is three dimensional but follows in a complementary an exterior hammered glass envelope 12C that is roughly shaped like a flame. Plural LEDs 15C could be distributed either on a similar three dimensional shape to the outer glass envelope. Alternatively, the LEDs could be mounted along radial extending fins of the carrier. This would still result in a three dimensional distribution of LEDs inside the glass envelope.

d) Double-Cylinder LED Carriers

Figure 17A:
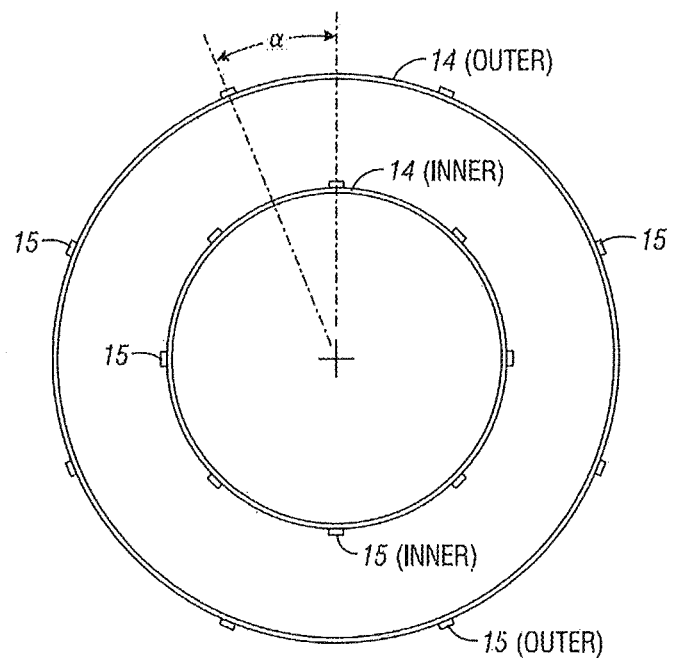
FIGS. 17A and B are top plan assembled views and perspective exploded views, respectively, for an alternative double-cylinder embodiment for LEDs and LED carriers, here plural such combinations, for a single light engine according to another alternative embodiment of the present invention.
Figure 17B:
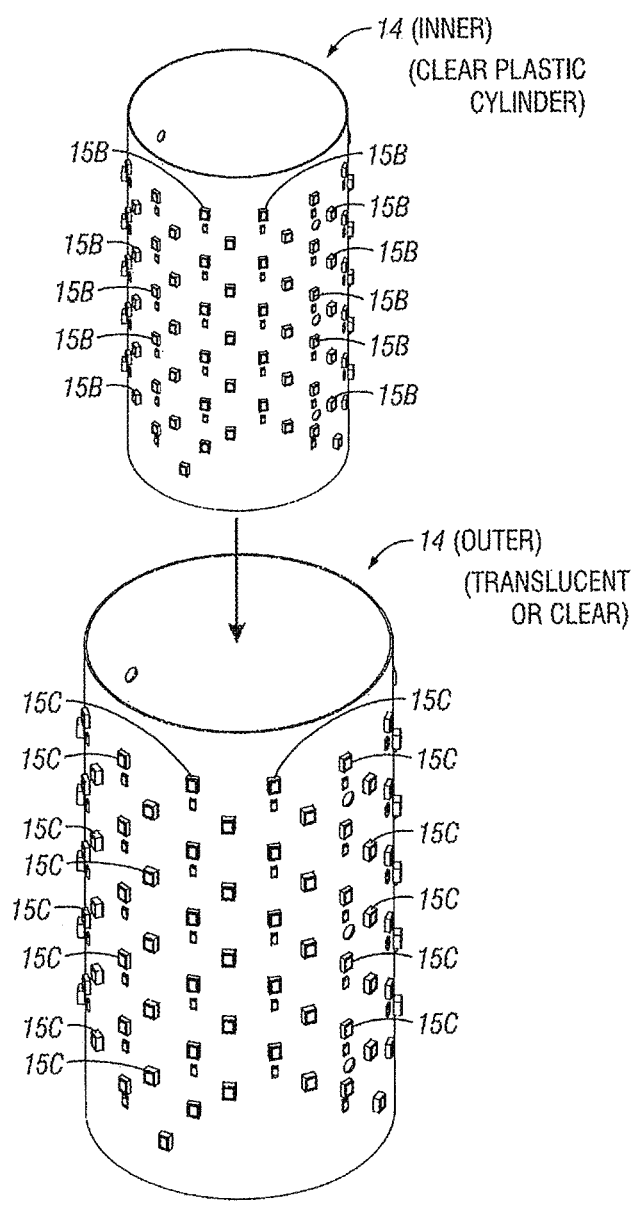

FIGS. 17A and B show another possible alternative. Instead of one carrier 14 on which plural LEDs 15 are distributed, a set of concentric carriers 14A and B, each having their own plurality of distributed LEDs 15A and B, could be mounted inside the light engine. As can be appreciated, at least carrier 14 (outer) could be made of a material which is at least partially light transmissive. The inside carrier 15 (inner) could be also. This could therefore add further perception of three dimensional depth of the simulated flame by having light originating at different distances from the longitudinal axis of the light engine and outward. The viewer would see not only LEDs 14 (outer), but 15 (inner).

As noted in FIGS. 17A and B, instead of the staggered LEDs such as shown in FIG. 6A, the LEDs could be arranged in uniform rows and columns around each cylinder. The rotation of each cylinder could be adjusted according to need or desire. But, of course, the staggering or other distribution patterns are possible.

2. Other Polyhedron Forms (Stars, Domes, Cones, Etc.)

Figure 18A:
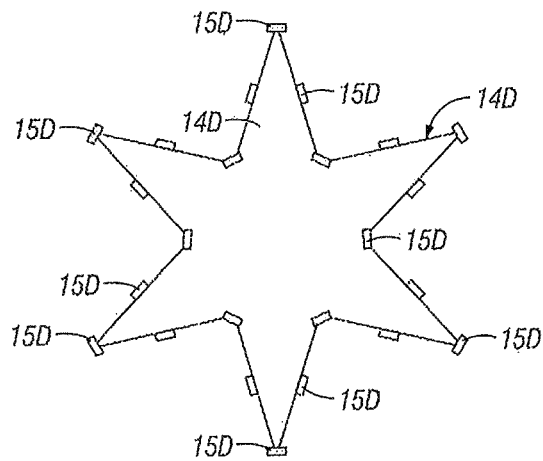
FIGS. 18A and B are top plan and perspective views of a still further star-shaped alternative embodiment for a carrier and plural LEDs according to the invention.
Figure 18B:
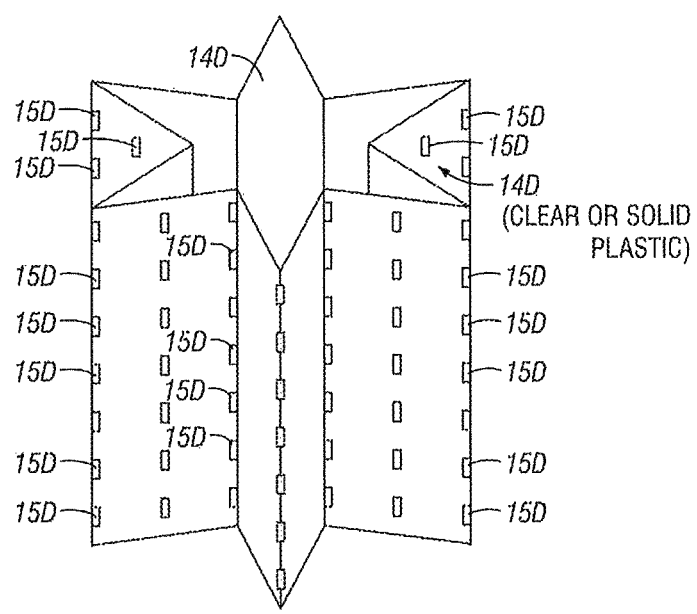

FIGS. 18A and B illustrate another form factor for carrier 14. In this example, carrier 14D has a star shape cross-sectional perimeter. It can be symmetric or does not have to be symmetric. LEDs could be distributed out at the long perimeter vertical edges, and/or along recessed vertical edges, and/or along intermediate portions between those inner and outer edges. Again, they could be placed in a linear pattern or otherwise. Carrier 14D could be clear or solid plastic formed into the star configuration. The LEDs could be placed on peaks and valleys or also on side panels.

Conforming translucent shrouds can cover each of the 3D shapes. Again, a translucent shroud can enhance the flame effect by diffusing light output of the individual LEDs to create an appearance of more of the ball or volume of light or luminance. The jumping around in various intensities, including in the embodiment described above relative to FIGS. 13 A-C, include the simulation of the ball of light jumping up and down and periodically spiking at flame tips. The designer can select between optical characteristics of such a shroud according to need or desire.

Figure 19:
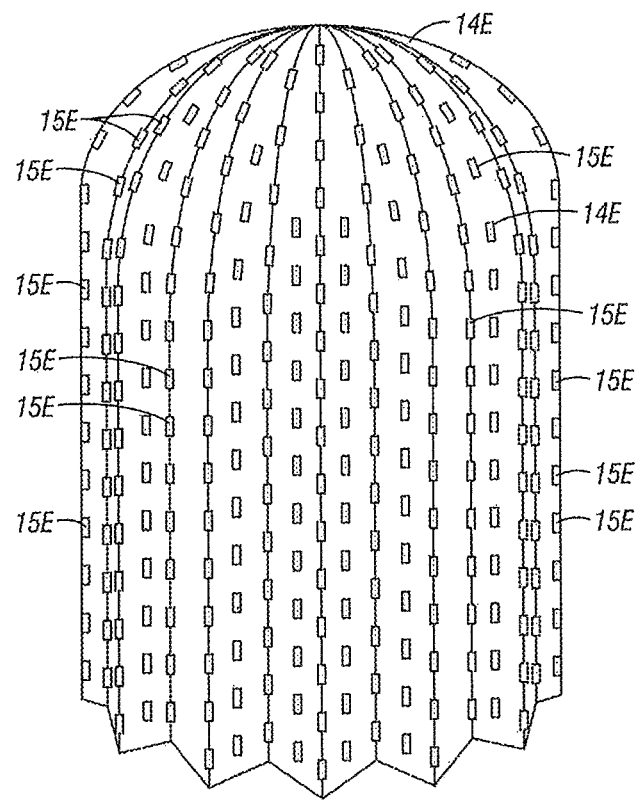
FIG. 19 is a perspective view of another possible dome-shaped embodiment of the carrier and LEDs according to the present invention.

FIG. 19 shows a still further variation for the carrier 14. In this case, carrier 14E has peaks and valleys like that of embodiment 14D. However, this "star dome" shape has many more radial projections and a domed top. Again, this form factor can be operated as shown. Alternatively, a translucent shroud could be placed at or near (essentially over) the LEDs and substrate.

Figure 20:
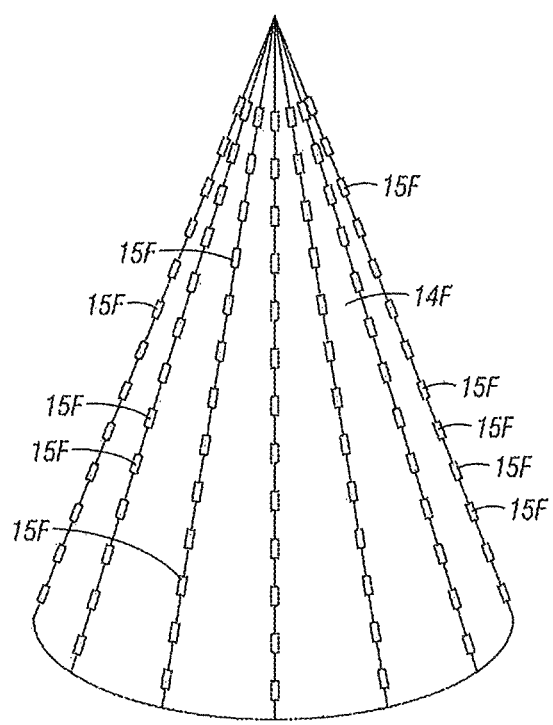
FIG. 20 is another potential alternative cone-shaped embodiment for carrier and LEDs according to the present invention.

FIG. 20 shows a still further optional embodiment. A cone 14E for the carrier can have LEDs 15E distributed as shown.

3. Fire Place Fire Simulator

Figure 21A:
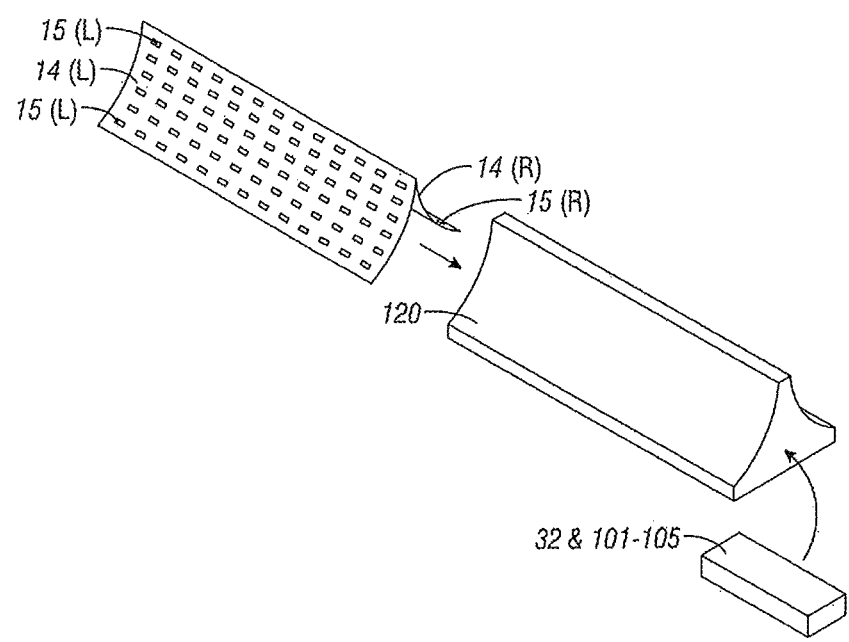
FIG. 21A is a reduced scale exploded perspective view of another exemplary embodiment according to aspects of the invention; here a triangle-in-cross section elongated form over which two curved flexible circuit boards, each carrying an array of LEDs, could be placed for use in simulating a fireplace fire.
Figure 21B:
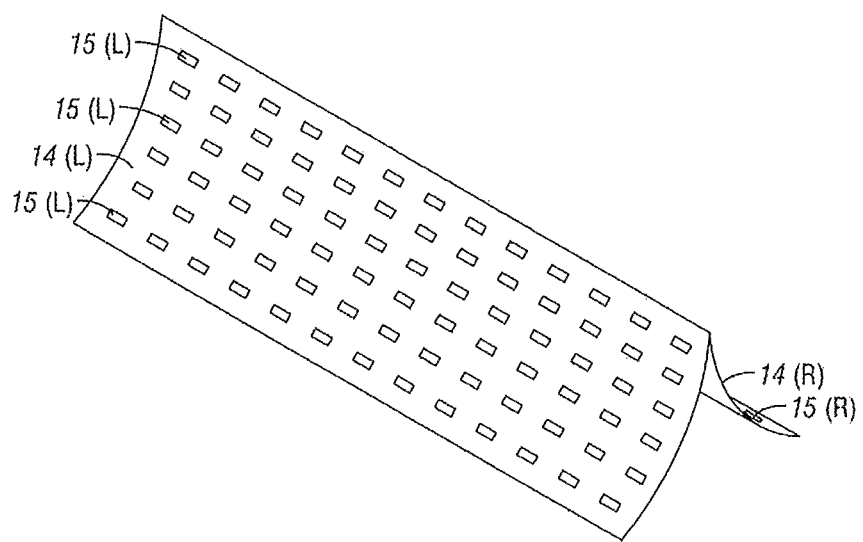
FIG. 21B is just the 3D shape circuit boards of FIG. 21A in isolation.

FIGS. 21A and B illustrate a still further optional embodiment of the invention. A three-dimensional form or base 120 is elongated in the horizontal direction and somewhat triangular in cross-section. Circuit boards 14L and 14R, each carrying an array of LEDs, can be mounted on opposite sides of base 120. Necessary components analogous to transformer 32, and control circuitry 34 (e.g. CPU 101, power management 102/103, PWM driver(s) 104, and possibly others) could be located inside base 120 in total or partially.

According to similar operational principles discussed above, the LEDs 15L and 15R on both boards 14L and 14R could be operated to simulate a jumping flame all along the base 102. This still has a 3D effect in that viewers from almost any viewing direction would see plural LED surfaces. It also can follow an analogous timing sequence top to bottom for together simulating flames of a fire in a fireplace.

A translucent shroud may be placed over the LEDs in an analogous way to the other embodiments.

As can be appreciated, and as mentioned earlier, the operation sequence of the individual light sources in a light engine can be programmed according to need or desire. This can include different patterns, different speed, different heights, and potentially different colors. In one example, the substrate could be populated with LEDs of different operating characteristics. One of them could be different colors. The program could take advantage of the different colors to enhance simulation of the subtle variety of colors of actual flames. Alternatively, programming might change which color of LED is turned on at different times in the same sequence steps. In other words, some LEDs of one color can be turned on at a first step in a first cycle. LEDs of a different color at that same step in a second cycle.

The determination of whether a shroud is used or not is within the discretion of the designer. Again, it has been found that a translucent shroud can enhance simulation of a flame appearance.

Another potential option is to install several independent sets of LEDs on the same substrate. Each set could be distributed around the three dimensional substrate shape. Either by a separate timing circuit or by appropriate driving of the different sets from the same control circuit, the same light engine could operate simultaneously two or more circuits of LEDs. This could also enhance simulation of a flame by further giving the pseudorandom effect by now multiple separately timed circuits operating concurrently on the same light engine. As indicated in some of the figures, alternatively separate circuits could be operated in a nested relationship spatially and have transparent or translucent substrates so that when operated concurrently, the user sees the light output sequencing of all the plural nested sets of LEDs. An example is shown at FIGS. 17A and B. And, of course, multiple sets of separate LED circuits and three-dimensional substrates can be positioned essentially as modules adjacent each other instead of on one substrate. This could allow building of light engines of various lengths, heights, or widths by adding or subtracting such modules. For example, in the fireplace usable embodiment of FIGS. 21A and B, the single substrate shown in those figures could instead be split up into plural sections that are mounted on top of the three-dimensional triangular form factor base or housing. Or, alternatively, there could be plural devices that could be positioned end to end to extend the length of the overall device. There could be structure that allows interlocking or removable fixation of the modules which could include such things as adhesive, hook and loop fasteners, interference fit male and female connectors or hardware such as screws, bolts or the like.

Still further, there could be more than one timing device per light engine. The user could select between the two or the different devices could operate different LEDs. The different timing devices or circuits could operate different sets of LEDs as previously described. Different sets could vary also in their spacing from one another, their color, their timing, their intensity, or other operating parameters.

As has been mentioned, an option would be to utilize infrared remote control technology with such things as a DMX protocol to allow remote control of on-off of a light engine. It could also be used to change between states. One example is steady state on for all LEDs so that it functions as a constant on porch light for example, but then switch to the timing for simulated flame to simulate a gaslight.

As can be appreciated, a light engine such as FIGS. 1A-D could be retrofit into many if not all existing types of threaded sockets. This could allow the light engine to be retrofitted into any of a variety of existing fixtures and work off of normal household current.

On the other hand, any of the light engines could simply have either connection points for an electrical cord to be plugged in to provide electrical power. Alternatively, the light engine could have its own power cord with terminal plug. Still further, the light engine could be hardwired and permanently connected to the power grid by wiring. Still further, one optional embodiment would have either on board or connection to a battery source. Examples would be AA batteries, 18V rechargeable, or even solar rechargeable by including a connection to a solar photovoltaic panel or panels.

As can be further appreciated, by appropriate manufacturing techniques, the light engine can be ruggedized. For example, it could be made of materials that are sealable against at least fluids and have appropriate power connection such that the light engine could be placed underwater. This could give aesthetic effect to such things as swimming pools, artificial or real ponds, fountains, or other underwater applications. The materials and their assembly could also be ruggedized in the sense of being sealed against environmental conditions such as rain, sleet, snow, dirt, dust, and debris. The materials could also be selected to have good lifespan relative to environmental conditions such as the extremes of outdoor temperature, humidity, wind, and the like.

As will be appreciated, and as shown by the non-limiting examples in the figures, the form factor for the light engine and/or shroud can vary. Another example would be in the form of recessed lights, in the form of simulated torches on poles, or almost any other form factor. This would include customized form factors according to need or desire.

a) Other

As will be appreciated by those skilled in the art, other changes or modifications are possible to implement the invention. Variations obvious to those skilled in the art will be included within the invention, which is defined by the following claims.

The invention claimed is:

1. A lighting device, comprising:
   a translucent outer shroud;
   at least one carrier inside the translucent outer shroud; the at least one carrier having upper and lower ends and a single longitudinal axis; a lower region of the at least one carrier being relatively near the lower end; an upper region of the at least one carrier being relatively distant the lower end; a mid region of the at least one carrier being between the lower region and the upper region;
   a plurality of LEDs coupled to the at least one carrier such that lower LEDs are in the lower region, mid LEDs are in the mid region, and upper LEDs are in the upper region; the lower LEDs, the mid LEDs, and the upper LEDs collectively defining the plurality of LEDs; at least two of the lower LEDs being spaced perpendicularly to the longitudinal axis at distances different from one another; at least two of the mid LEDs being spaced perpendicularly to the longitudinal axis at distances different from one another; at least two of the upper LEDs being spaced perpendicularly to the longitudinal axis at distances different from one another; at least one of the lower LEDs and at least one of the mid LEDs being spaced perpendicularly to the longitudinal axis at the same distance as one another; at least one of the lower LEDs and at least one of the upper LEDs being spaced perpendicularly to the longitudinal axis at the same distance as one another; at least one of the mid LEDs and at least one of the upper LEDs being spaced perpendicularly to the longitudinal axis at the same distance as one another; and
   a controller in communication with the plurality of LEDs; wherein, to simulate a flame, the controller:
      actuates at least some of the lower LEDs to simulate combustion at a bottom of a flame;
      actuates at least some of the mid LEDs to simulate a rise in flame height; and
      actuates at least some of the upper LEDs to simulate a flickering flame tip.

2. The lighting device of claim 1, wherein the at least one carrier is two carriers.

3. The lighting device of claim 1, wherein the at least one carrier is a pair of concentric cylinders.

4. The lighting device of claim 1, further comprising a manual switch in communication with the controller to cause the controller to adjust at least one item selected from the group consisting of: simulated flame height and simulated flame speed.

5. The lighting device of claim 1, further comprising a remote control in communication with the controller to cause the controller to adjust at least one item selected from the group consisting of: simulated flame height and simulated flame speed.

6. The lighting device of claim 1, wherein:
   to provide light without a flame effect, the controller actuates at least some of the lower LEDs, the mid LEDs, and the upper LEDs at a constant level.

7. The lighting device of claim 1, wherein the upper LEDs have a color temperature that is different from a color temperature of the lower LEDs.

8. The lighting device of claim 1, further comprising a conductive threaded base for delivering electricity to the plurality of LEDs.

9. A lighting device, comprising:
   a translucent outer shroud;
   at least one carrier inside the translucent outer shroud; the at least one carrier having upper and lower ends and a longitudinal center axis; a lower region of the at least one carrier being relatively near the lower end; an upper region of the at least one carrier being relatively distant the lower end; a mid region of the at least one carrier being between the lower region and the upper region;

a plurality of LEDs coupled to the at least one carrier such that lower LEDs are in the lower region, mid LEDs are in the mid region, and upper LEDs are in the upper region; the lower LEDs, the mid LEDs, and the upper LEDs collectively defining the plurality of LEDs; the plurality of LEDs being coupled to the at least one carrier in at least first, second, and third rows; each of the first, second, and third rows being generally parallel to the longitudinal center axis; the first row having at least one of the lower LEDs, at least one of the mid LEDs, and at least one of the upper LEDs; the second row having at least one of the lower LEDs, at least one of the mid LEDs, and at least one of the upper LEDs; the third row having at least one of the lower LEDs, at least one of the mid LEDs, and at least one of the upper LEDs; the LEDs in the first row each emitting light in a first angular direction relative to the longitudinal center axis; the LEDs in the second row each emitting light in a second angular direction relative to the longitudinal center axis; the LEDs in the third row each emitting light in a third angular direction relative to the longitudinal center axis; the first angular direction relative to the longitudinal center axis being different from the second angular direction relative to the longitudinal center axis; the first angular direction relative to the longitudinal center axis being different from the third angular direction relative to the longitudinal center axis; the second angular direction relative to the longitudinal center axis being different from the third angular direction relative to the longitudinal center axis; and a controller in communication with the plurality of LEDs; wherein, to simulate a flame, the controller:
actuates at least some of the lower LEDs in the first, second, and third rows to simulate combustion at a bottom of a flame;
actuates at least some of the mid LEDs in the first, second, and third rows to simulate a rise in flame height; and
actuates at least some of the upper LEDs in the first, second, and third rows to simulate a flickering flame tip.

10. The lighting device of claim 9, wherein the at least one carrier includes a cylindrical carrier.

11. The lighting device of claim 9, further comprising a manual switch in communication with the controller to cause the controller to adjust at least one item selected from the group consisting of: simulated flame height and simulated flame speed.

12. The lighting device of claim 9, further comprising a remote control in communication with the controller to cause the controller to adjust at least one item selected from the group consisting of: simulated flame height and simulated flame speed.

13. The lighting device of claim 9, wherein:
to provide light without a flame effect, the controller actuates at least some of the lower LEDs, the mid LEDs, and the upper LEDs at a constant level.

14. The lighting device of claim 9, wherein the upper LEDs have a color temperature that is different from a color temperature of the lower LEDs.

15. The lighting device of claim 9, further comprising a conductive threaded base for delivering electricity to the plurality of LEDs.

16. A lighting device, comprising:
a translucent outer shroud;
at least one carrier inside the translucent outer shroud; the at least one carrier having upper and lower ends and a longitudinal center axis; an imaginary plane passing through the longitudinal center axis separating a first side of the at least one carrier from a second side of the at least one carrier; a lower region of the at least one carrier being relatively near the lower end; an upper region of the at least one carrier being relatively distant the lower end; a mid region of the at least one carrier being between the lower region and the upper region;
a plurality of LEDs coupled to the at least one carrier such that lower LEDs are in the lower region, mid LEDs are in the mid region, and upper LEDs are in the upper region; the lower LEDs, the mid LEDs, and the upper LEDs collectively defining the plurality of LEDs; the plurality of LEDs being coupled to the at least one carrier in at least first and second rows; the first row being on the first side; the second row being on the second side; the first and second rows being generally parallel to the longitudinal center axis; the first row having at least one of the lower LEDs, at least one of the mid LEDs, and at least one of the upper LEDs; the second row having at least one of the lower LEDs, at least one of the mid LEDs, and at least one of the upper LEDs; the LEDs in the first row each emitting light in a first angular direction relative to the longitudinal center axis; the LEDs in the second row each emitting light in a second angular direction relative to the longitudinal center axis; the first angular direction relative to the longitudinal center axis being opposite the second angular direction relative to the longitudinal center axis; and
a controller in communication with the plurality of LEDs; wherein, to simulate a flame, the controller:
actuates at least some of the lower LEDs in the first row and at least some of the lower LEDs in the second row to simulate combustion at a bottom of a flame;
actuates at least some of the mid LEDs in the first row and at least some of the mid LEDs in the second row to simulate a rise in flame height; and
actuates at least some of the upper LEDs in the first row and at least some of the upper LEDs in the second row to simulate a flickering flame tip.

17. The lighting device of claim 16, wherein the at least one carrier includes a cylindrical carrier.

18. The lighting device of claim 16, further comprising a manual switch in communication with the controller to cause the controller to adjust at least one item selected from the group consisting of: simulated flame height and simulated flame speed.

19. The lighting device of claim 16, further comprising a remote control in communication with the controller to cause the controller to adjust at least one item selected from the group consisting of: simulated flame height and simulated flame speed.

20. The lighting device of claim 16, wherein:
to provide light without a flame effect, the controller actuates at least some of the lower LEDs in the first row, the lower LEDs in the second row, the mid LEDs in the first row, the mid LEDs in the second row, the upper LEDs in the first row, and the upper LEDs in the second row at a constant level.

21. The lighting device of claim 16, wherein the upper LEDs have a color temperature that is different from a color temperature of the lower LEDs.

22. The lighting device of claim 16, further comprising a conductive threaded base for delivering electricity to the plurality of LEDs.

\* \* \* \* \*